(12) United States Patent
Ishiga et al.

(10) Patent No.: US 6,836,572 B2
(45) Date of Patent: Dec. 28, 2004

(54) INTERPOLATION PROCESSING APPARATUS AND RECORDING MEDIUM HAVING INTERPOLATION PROCESSING PROGRAM RECORDED THEREIN

(75) Inventors: Kenichi Ishiga, Kawasaki (JP); Ken Utagawa, Yokohama (JP)

(73) Assignee: Nikon Corporation, Tokyo (JP)

( * ) Notice: Subject to any disclaimer, the term of this patent is extended or adjusted under 35 U.S.C. 154(b) by 653 days.

(21) Appl. No.: 09/725,286

(22) Filed: Nov. 29, 2000

(65) Prior Publication Data

US 2001/0005429 A1 Jun. 28, 2001

Related U.S. Application Data

(63) Continuation-in-part of application No. PCT/JP99/02887, filed on May 31, 1999.

(30) Foreign Application Priority Data

| Jun. 1, 1998 | (JP) | 10-151278 |
| Sep. 30, 1998 | (JP) | 10-277166 |
| May 25, 1999 | (JP) | 11-145473 |
| Jun. 21, 2000 | (JP) | 2000-186367 |

(51) Int. Cl.$^7$ .............................................. G06K 9/32
(52) U.S. Cl. ....................................... 382/300; 382/162
(58) Field of Search ................................ 382/162, 165, 382/300; 348/272, 273

(56) References Cited

U.S. PATENT DOCUMENTS

| 5,373,322 A | 12/1994 | Laroche et al. |
| 5,382,976 A | 1/1995 | Hibbard |
| 5,506,619 A | 4/1996 | Adams, Jr. et al. |
| 5,552,827 A | 9/1996 | Maenaka et al. |
| 5,629,734 A | 5/1997 | Hamilton, Jr. et al. |
| 5,652,621 A | 7/1997 | Adams, Jr. et al. |
| 5,805,217 A | 9/1998 | Lu et al. |
| 5,937,085 A | * 8/1999 | Ishida .......................... 382/300 |

FOREIGN PATENT DOCUMENTS

| JP | A-7-59098 | 3/1995 |
| JP | A-7-236147 | 9/1995 |
| JP | 10-108209 | 4/1998 |
| JP | 10294948 | 11/1998 |
| JP | 11-177994 | 7/1999 |
| JP | A 11-177995 | 7/1999 |
| JP | A 11-177997 | 7/1999 |
| JP | 11-275373 | 10/1999 |

* cited by examiner

*Primary Examiner*—Phuoc Tran
(74) *Attorney, Agent, or Firm*—Oliff & Berridge, PLC

(57) ABSTRACT

An interpolation processing apparatus that performs interpolation to obtain color information corresponding to a first color component of a pixel, in which the first color component is missing, of an image-capturing sensor having a plurality of pixels which are arranged in a two-dimensional array and output color information corresponding to different color components, which are first~nth (n>2) color components, each of the plurality of pixels outputting color information corresponding to a single color component, includes: a similarity degree calculation unit that calculates each of similarity degrees along, at least, two directions relative to an interpolation target pixel to undergo interpolation processing by using a "different-color similarity component obtained by using color information corresponding to different color components" calculated with a "similarity degree element constituted of color information from three or fewer pixels", based upon color information at a plurality of pixels selected from the interpolation target pixel and pixels near the interpolation target pixel; a similarity judgment unit that makes a judgment on degrees of similarity along the individual directions based upon the similarity degrees; and an interpolation quantity calculation unit that calculates an interpolation quantity for the interpolation target pixel based upon results of the judgment made by the similarity judgment unit.

61 Claims, 31 Drawing Sheets

FIG. 2

| | X=1 | X=2 | X=3 | X=4 | X=5 | X=6 | X=7 | | X=X_max |
|---|---|---|---|---|---|---|---|---|---|
| Y=1 | G(1,1) | G'(2,1) | G(3,1) | G'(4,1) | G(5,1) | G'(6,1) | G(7,1) | ... | G'(X_max,1) |
| Y=2 | G'(1,2) | G(2,2) | G'(3,2) | G(4,2) | G'(5,2) | G(6,2) | G'(7,2) | . | . |
| Y=3 | G(1,3) | G'(2,3) | G(3,3) | G'(4,3) | G(5,3) | G'(6,3) | G(7,3) | . | . |
| Y=4 | G'(1,4) | G(2,4) | G'(3,4) | G(4,4) | G'(5,4) | G(6,4) | G'(7,4) | . | . |
| Y=5 | G(1,5) | G'(2,5) | G(3,5) | G'(4,5) | G(5,5) | G'(6,5) | G(7,5) | . | . |
| ... | | | | | | | | | |
| Y=Y_max | G'(1,Y_max) | . | . | . | . | . | . | . | G'(X_max,Y_max) |

FIG. 5A

|     | i-1 | i  | i+1 |
|-----|-----|----|-----|
| j-1 |     | G  |     |
| j   | G   | RB | G   |
| j+1 |     | G  |     |

FIRST SIMILARITY COMPONENTS

FIG. 5B

|     | i-2 | i-1 | i  | i+1 | i+2 |
|-----|-----|-----|----|-----|-----|
| j-2 |     |     | RB |     |     |
| j-1 |     |     | G  |     |     |
| j   | RB  | G   | RB | G   | RB  |
| j+1 |     |     | G  |     |     |
| j+2 |     |     | RB |     |     |

FIRST SIMILARITY COMPONENTS

FIG. 5C

|     | i-1 | i | i+1 |
|-----|-----|---|-----|
| j-1 | BR  | G | BR  |
| j   | G   |   | G   |
| j+1 | BR  | G | BR  |

SECOND SIMILARITY COMPONENTS

FIG. 5D

|     | i-1 | i | i+1 |
|-----|-----|---|-----|
| j-1 |     | G |     |
| j   | G   |   | G   |
| j+1 |     | G |     |

THIRD SIMILARITY COMPONENTS

FIG. 5E

|     | i-1 | i | i+1 |
|-----|-----|---|-----|
| j-1 | BR  |   | BR  |
| j   |     |   |     |
| j+1 | BR  |   | BR  |

FOURTH SIMILARITY COMPONENTS

FIG. 5F

|     | i-2 | i-1 | i  | i+1 | i+2 |
|-----|-----|-----|----|-----|-----|
| j-2 |     |     | RB |     |     |
| j-1 |     |     |    |     |     |
| j   | RB  |     | RB |     | RB  |
| j+1 |     |     |    |     |     |
| j+2 |     |     | RB |     |     |

FIFTH SIMILARITY COMPONENTS

BLACK-AND-WHITE NYQUIST STRIPES

BLACK-AND-WHITE SIMENS' STAR

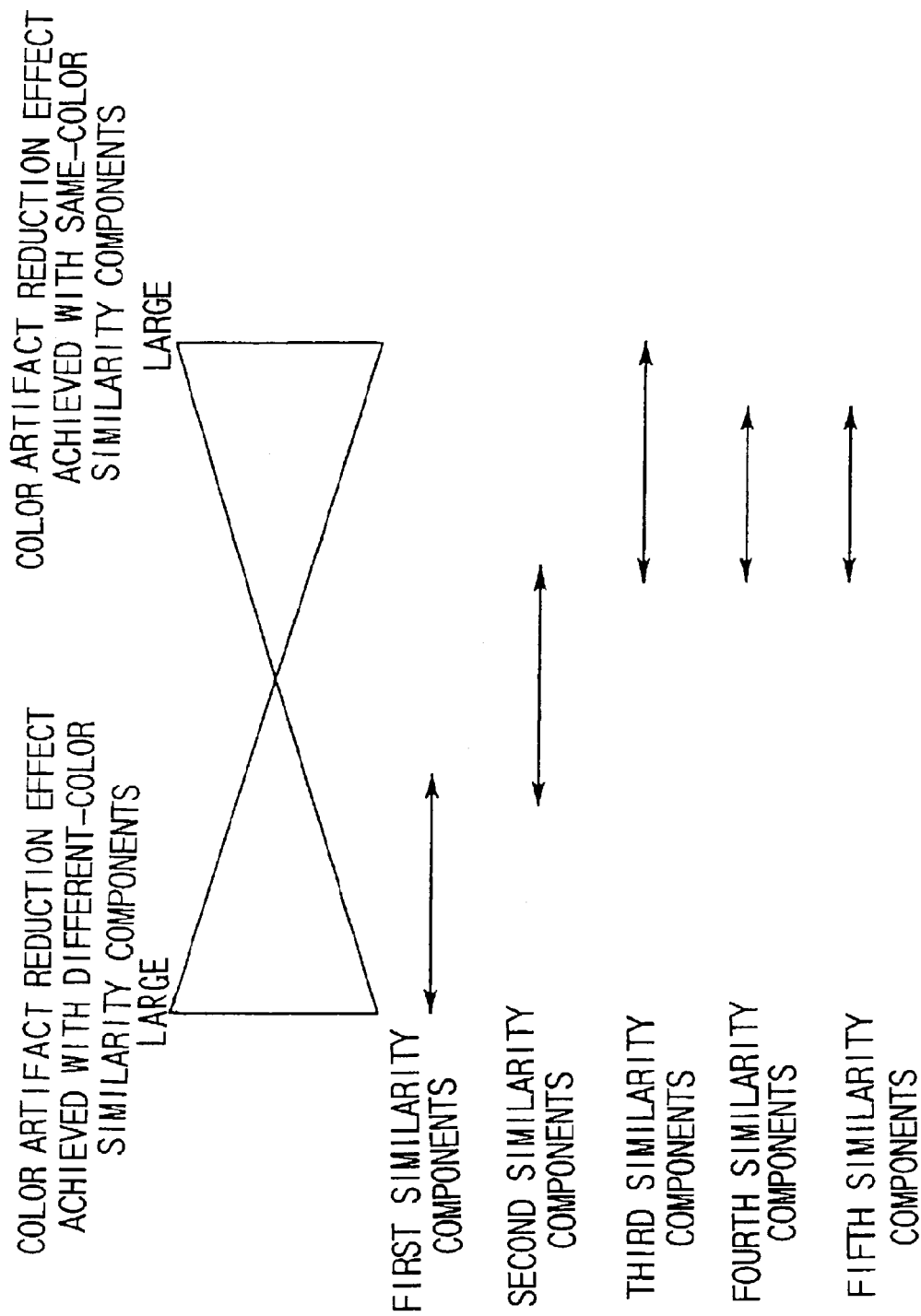

FIG. 8A  FIRST SIMILARITY COMPONENTS

FIG. 8B  SECOND SIMILARITY COMPONENTS

FIG. 9A THIRD SIMILARITY COMPONENTS

FIG. 9B FOURTH SIMILARITY COMPONENTS

FIG. 10

FIFTH SIMILARITY COMPONENTS

FIG.11A

| (200,200,200) | (10,10,10) | (200,200,200) | (10,10,10) | (200,200,200) |
|---|---|---|---|---|
| (200,200,200) | (10,10,10) | (200,200,200) | (10,10,10) | (200,200,200) |
| (200,200,200) | (10,10,10) | (200,200,200) | (10,10,10) | (200,200,200) |
| (200,200,200) | (10,10,10) | (200,200,200) | (10,10,10) | (200,200,200) |
| (200,200,200) | (10,10,10) | (200,200,200) | (10,10,10) | (200,200,200) |

COLOR INFORMATION VALUES (R,G,B) IN ORIGINAL IMAGE

FIG.11B

|   | i−2 | i−1 | i | i+1 | i+2 |
|---|---|---|---|---|---|
| j−2 | RB | G | RB | G | RB |
| j−1 | G | BR | G | BR | G |
| j | RB | G | RB | G | RB |
| j+1 | G | BR | G | BR | G |
| j+2 | RB | G | RB | G | RB |

=

|   | i−2 | i−1 | i | i+1 | i+2 |
|---|---|---|---|---|---|
| j−2 | 200 | 10 | 200 | 10 | 200 |
| j−1 | 200 | 10 | 200 | 10 | 200 |
| j | 200 | 10 | 200 | 10 | 200 |
| j+1 | 200 | 10 | 200 | 10 | 200 |
| j+2 | 200 | 10 | 200 | 10 | 200 |

COLOR INFORMATION VALUES STORED IN IMAGE BUFFER MEMORY

FIG.11C

|   | VERTICAL DIRECTION | HORIZONTAL DIRECTION | DIRECTION MANIFESTING PRONOUNCED SIMILARITY |
|---|---|---|---|
| FIRST SIMILARITY COMPONENTS | 0 | 190 | VERTICAL DIRECTION |
| SECOND SIMILARITY COMPONENTS | 0 | 190 | VERTICAL DIRECTION |
| THIRD SIMILARITY COMPONENTS | 0 | 0 | NOT KNOWN |
| FOURTH SIMILARITY COMPONENTS | 0 | 0 | NOT KNOWN |
| FIFTH SIMILARITY COMPONENTS | 0 | 0 | NOT KNOWN |

RESULTS OF CALCULATION OF VARIOUS SIMILARITY COMPONENTS

FIG.12A

| (0,120,120) | (0,200,200) | (0,110,110) | (0,10,10) | (0,100,100) |
|---|---|---|---|---|
| (0,120,120) | (0,200,200) | (0,110,110) | (0,10,10) | (0,100,100) |
| (0,120,120) | (0,200,200) | (0,110,110) | (0,10,10) | (0,100,100) |
| (0,120,120) | (0,200,200) | (0,110,110) | (0,10,10) | (0,100,100) |
| (0,120,120) | (0,200,200) | (0,110,110) | (0,10,10) | (0,100,100) |

COLOR INFORMATION VALUES (R,G,B) IN ORIGINAL IMAGE

FIG.12B

|   | i-2 | i-1 | i | i+1 | i+2 |
|---|---|---|---|---|---|
| j-2 | RB | G | RB | G | RB |
| j-1 | G | BR | G | BR | G |
| j | RB | G | RB | G | RB |
| j+1 | G | BR | G | BR | G |
| j+2 | RB | G | RB | G | RB |

|   | i-2 | i-1 | i | i+1 | i+2 |
|---|---|---|---|---|---|
| j-2 | 0 | 200 | 0 | 10 | 0 |
| j-1 | 120 | 200 | 110 | 10 | 100 |
| j | 0 | 200 | 0 | 10 | 0 |
| j+1 | 120 | 200 | 110 | 10 | 100 |
| j+2 | 0 | 200 | 0 | 10 | 0 |

COLOR INFORMATION VALUES STORED IN IMAGE BUFFER MEMORY

FIG.12C

|   | VERTICAL DIRECTION | HORIZONTAL DIRECTION | DIRECTION MANIFESTING PRONOUNCED SIMILARITY |
|---|---|---|---|
| FIRST SIMILARITY COMPONENTS | 110 | 105 | HORIZONTAL DIRECTION |
| SECOND SIMILARITY COMPONENTS | 0 | 95 | VERTICAL DIRECTION |
| THIRD SIMILARITY COMPONENTS | 0 | 190 | VERTICAL DIRECTION |
| FOURTH SIMILARITY COMPONENTS | 0 | 190 | VERTICAL DIRECTION |
| FIFTH SIMILARITY COMPONENTS | 0 | 0 | NOT KNOWN |

RESULTS OF CALCULATION OF VARIOUS SIMILARITY COMPONENTS

FIG. 22A

STRUCTURE OF IMAGE-CAPTURING SENSOR

| G | R | G | R | G | R | G | R | G | R |
|---|---|---|---|---|---|---|---|---|---|
| B | G | B | G | B | G | B | G | B | G |
| G | R | G | R | G | R | G | R | G | R |
| B | G | B | G | B | G | B | G | B | G |
| G | R | G | R | G | R | G | R | G | R |
| B | G | B | G | B | G | B | G | B | G |
| G | R | G | R | G | R | G | R | G | R |
| B | G | B | G | B | G | B | G | B | G |
| G | R | G | R | G | R | G | R | G | R |

FIG. 22B

| G |   | G |   | G |   | G |   | G |   |
|---|---|---|---|---|---|---|---|---|---|
|   | G |   | G |   | G |   | G |   | G |
| G |   | G |   | G |   | G |   | G |   |
|   | G |   | G |   | G |   | G |   | G |
| G |   | G |   | G |   | G |   | G |   |
|   | G |   | G |   | G |   | G |   | G |
| G |   | G |   | G |   | G |   | G |   |
|   | G |   | G |   | G |   | G |   | G |
| G |   | G |   | G |   | G |   | G |   |

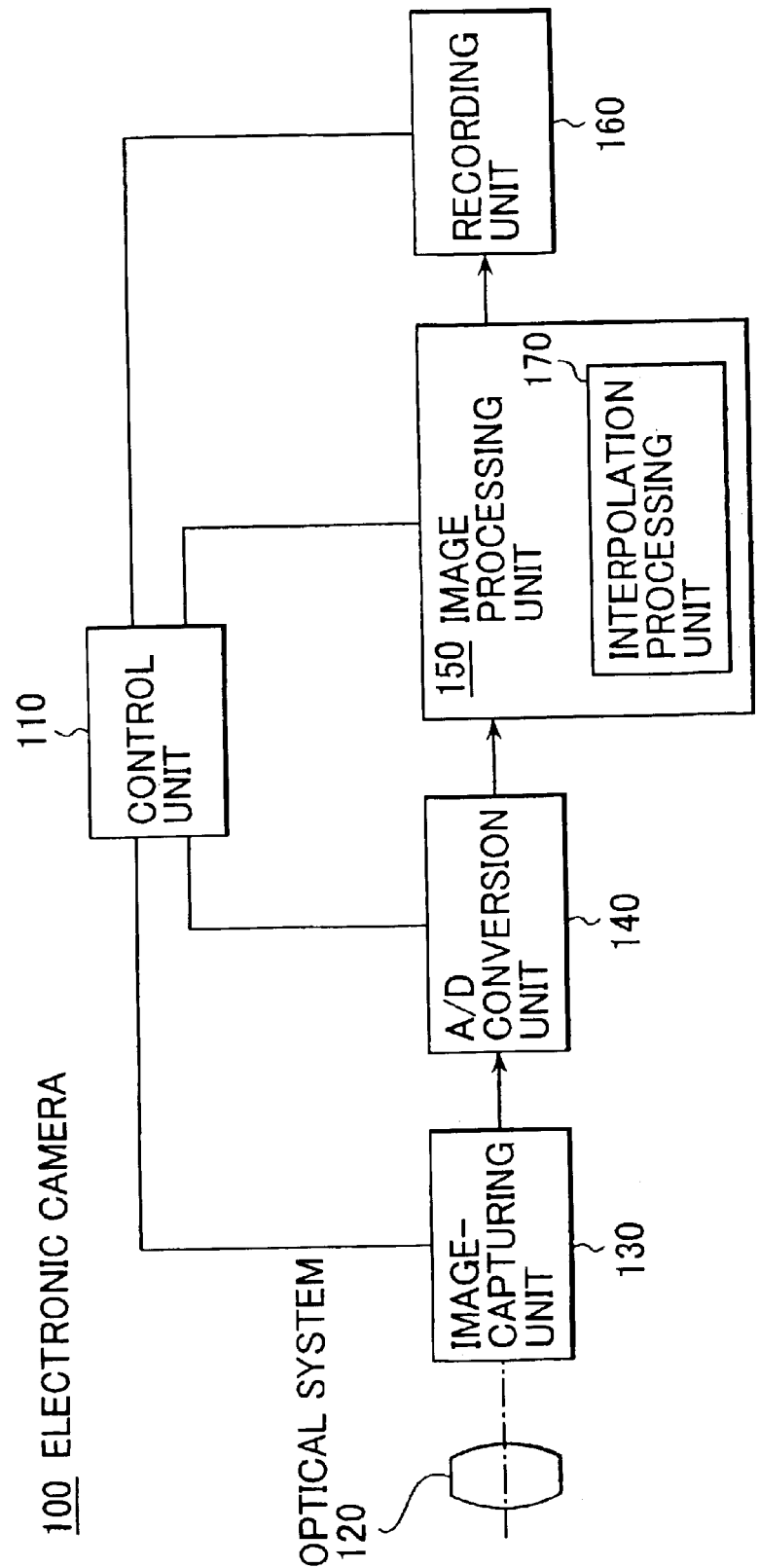

FIG.24A

| COORDINATES[i,j] | i-3 | i-2 | i-1 | i | i+1 | i+2 | i+3 |
|---|---|---|---|---|---|---|---|
| j-3 | B | G | B | G | B | G | B |
| j-2 | G | R | G | R | G | R | G |
| j-1 | B | G | B | G | B | G | B |
| j | G | R | G | R | G | R | G |
| j+1 | B | G | B | G | B | G | B |
| j+2 | G | R | G | R | G | R | G |
| j+3 | B | G | B | G | B | G | B |

FIG.24B

| COORDINATES[i,j] | i-3 | i-2 | i-1 | i | i+1 | i+2 | i+3 |
|---|---|---|---|---|---|---|---|
| j-3 | R | G | R | G | R | G | R |
| j-2 | G | B | G | B | G | B | G |
| j-1 | R | G | R | G | R | G | R |
| j | G | B | G | B | G | B | G |
| j+1 | R | G | R | G | R | G | R |
| j+2 | G | B | G | B | G | B | G |
| j+3 | R | G | R | G | R | G | R |

FIG.26A

|   |   |   |
|---|---|---|
| 1 |   | 1 |
|   | 4 |   |
| 1 |   | 1 |

× 1/8

WEIGHTED ADDITION OF
SIMILARITY COMPONENTS
IN METHOD 1

FIG.26B

|   |   |   |   |   |
|---|---|---|---|---|
|   |   | 1 |   |   |
|   | 2 |   | 2 |   |
| 1 |   | 4 |   | 1 |
|   | 2 |   | 2 |   |
|   |   | 1 |   |   |

× 1/16

WEIGHTED ADDITION OF
SIMILARITY COMPONENTS
IN METHOD 2

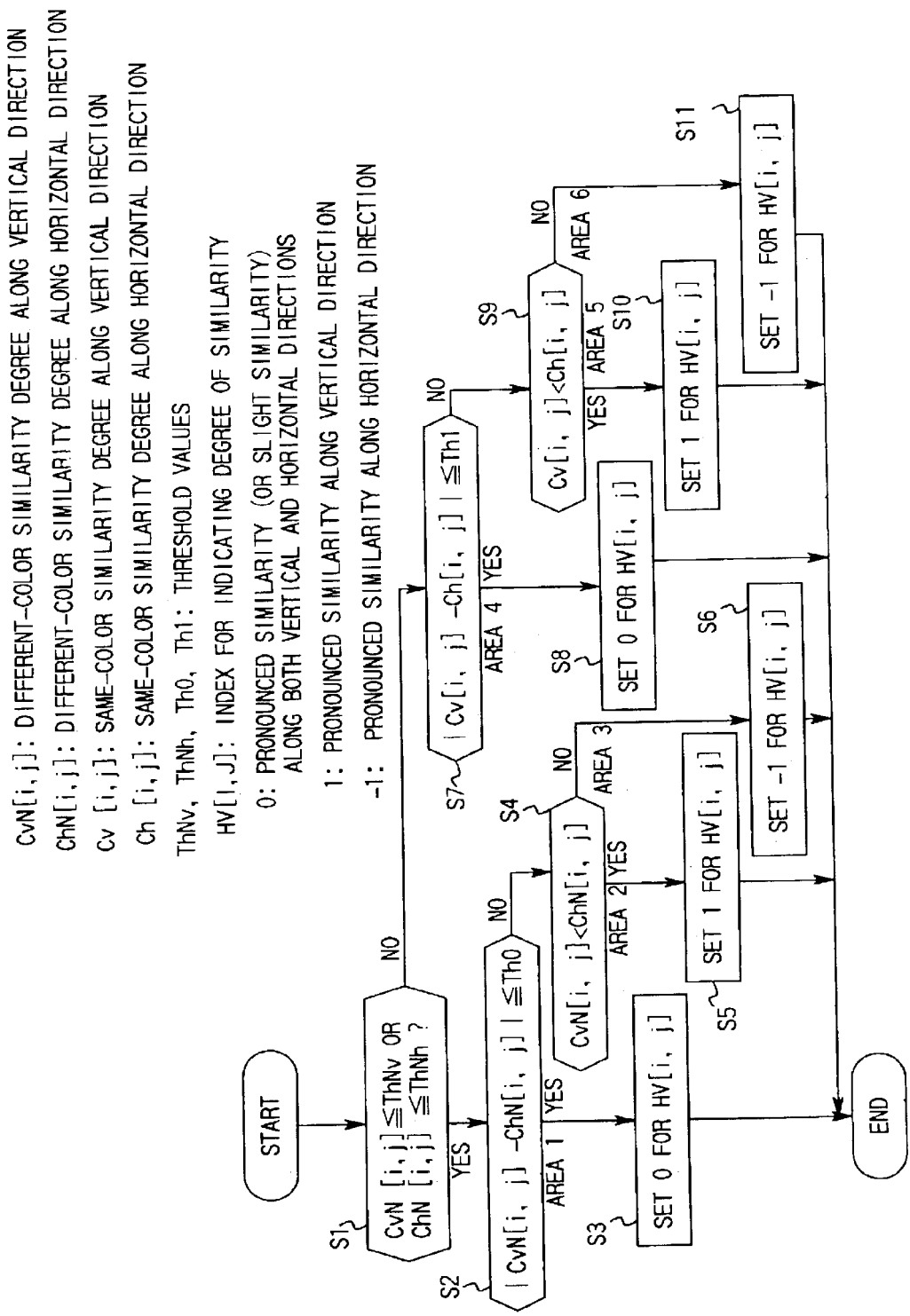

FIG.28A

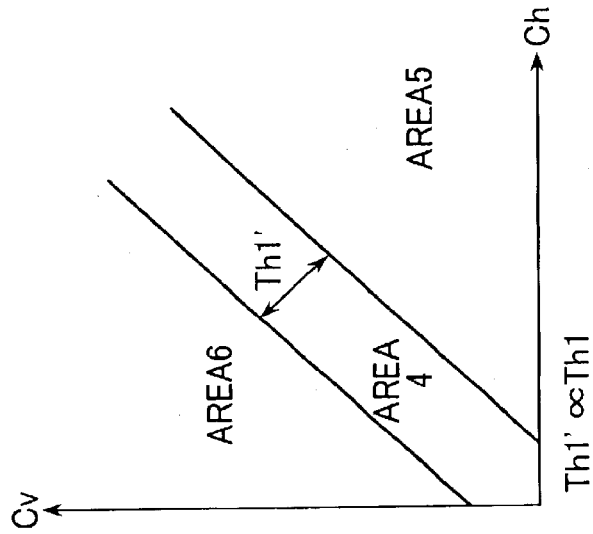

AREA1: PRONOUNCED SIMILARITY ALONG BOTH VERTICAL AND HORIZONTAL DIRECTIONS IN ACHROMATIC IMAGE AREA

AREA2: PRONOUNCED SIMILARITY ALONG VERTICAL DIRECTION IN ACHROMATIC IMAGE AREA

AREA3: PRONOUNCED SIMILARITY ALONG HORIZONTAL DIRECTION IN ACHROMATIC IMAGE AREA

FIG.28B

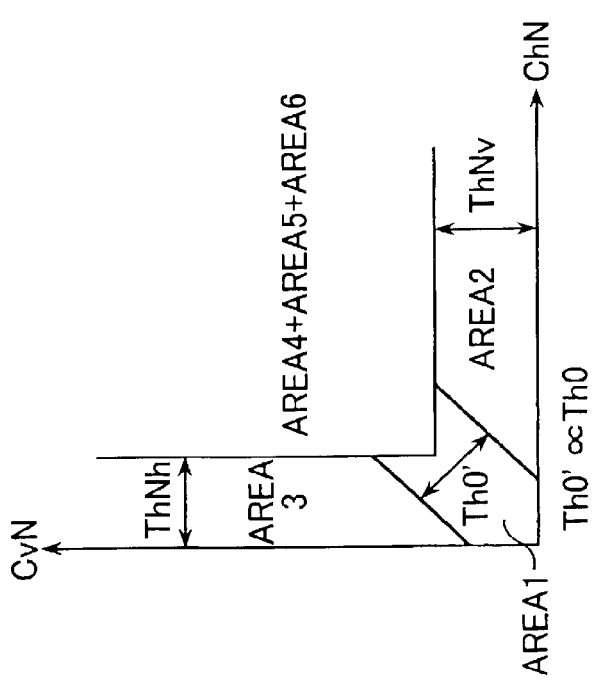

AREA4: PRONOUNCED SIMILARITY (SLIGHT SIMILARITY) ALONG BOTH VERTICAL AND HORIZONTAL DIRECTIONS IN CHROMATIC IMAGE AREA

AREA5: PRONOUNCED SIMILARITY ALONG VERTICAL DIRECTION IN CHROMATIC IMAGE AREA

AREA6: PRONOUNCED SIMILARITY ALONG HORIZONTAL DIRECTION IN CHROMATIC IMAGE AREA

US 6,836,572 B2

INTERPOLATION PROCESSING APPARATUS AND RECORDING MEDIUM HAVING INTERPOLATION PROCESSING PROGRAM RECORDED THEREIN

This is a continuation-in-part of PCT Application No. PCT/JP99/02887 filed May 31, 1999.

INCORPORATION BY REFERENCE

The disclosures of the following applications are herein incorporated by reference:

Japanese Patent Application No. 10-151278 filed Jun. 1, 1998

Japanese Patent Application No. 10-277166 filed Sep. 30, 1998

Japanese Patent Application No. 11-145473 filed May 25, 1999

Japanese Patent Application No. 2000-186367 filed Jun. 21, 2000

PCT Application No. PCT/JP99/02887 filed May 31, 1999

BACKGROUND OF THE INVENTION

1. Field of the Invention

The present invention relates to an interpolation processing apparatus that implements interpolation processing for obtaining an interpolation quantity which is equivalent to color information corresponding to a first color component for each vacancy in an image generated by an image-capturing sensor having a plurality of lattice points and a plurality of vacancies in a two-dimensional array with the lattice points each outputting color information corresponding to the first color component and the vacancies each outputting color information corresponding to a second color component or a third color component without outputting color information corresponding to the first color component, and it also relates to a recording medium for recording an interpolation processing program utilized to execute the interpolation processing on a computer.

2. Description of the Related Art

Some electronic still cameras utilize a single image-capturing sensor to generate image signals of a color image. Such an image-capturing sensor may be constituted by arranging color filters in three colors, i.e., R, G and B (red, green and blue) in a Bayer array, as illustrated in FIG. 22A. With regard to the green color (G), the image-capturing sensor can be regarded as being composed of lattice points each constituted of a pixel that outputs green color and vacancies each constituted of a pixel which does not output green color, as shown in FIG. 22B.

In this type of electronic still camera, it is necessary to implement interpolation processing in order to obtain green color information at each vacancy. For this application, an interpolation processing method in which an interpolation quantity is calculated by judging the direction along which a vacancy undergoing the interpolation processing (hereafter referred to as an interpolation target vacancy) manifests a high degree of spatial similarity and using the color information at lattice points adjacent to the interpolation target vacancy along the direction has been proposed in the prior art.

U.S. Pat. Nos. 5,629,734 and 5,652,621 each disclose a technology for calculating similarity degrees along a plurality of directions to be used when judging the direction manifesting a pronounced similarity.

For instance, if color information is provided around the interpolation target vacancy expressed as "A1, G2, A3, G4, A5" (with A1, A3 and A5 each representing color information corresponding to the same-color component as that at the interpolation target vacancy and G2 and G4 each representing color information at a lattice point), a similarity degree C of the interpolation target vacancy along the direction in which the lattice point outputting G2 and the lattice point outputting G4 is set is calculated through the following expression C-1 in the technology disclosed in U.S. Pat. No. 5,629,734, whereas the similarity degree C is calculated through expression C-2 in the technology disclosed in U.S. Pat. No. 5,652,621.

$$C=|-A1+2A3-A5|+|G2-G4| \qquad \text{expression C-1}$$

$$C=|-A1+2A3-A5|+|G2-G4|+|-G2+2(A3+\text{bias})-G4| \qquad \text{expression C-2}$$

with "bias" in expression C-2 representing a value satisfying $$\text{bias}=(\text{bias}'+A1-G1)/2 \qquad \text{expression C-3,}$$

in which "bias'" represents the bias used to calculate the similarity degree of A1 and G1 indicates the interpolation quantity ascertained through the interpolation processing implemented on A1.

In the technology disclosed in U.S. Pat. No. 5,629,734, the results obtained by comparing color information corresponding to a single color component at every other pixel (hereafter referred to as same-color similarity components: correspond to $|-A1+2A3-A5|$ and $|G2-G4|$ in expression C-1) are added and the sum is used as the similarity degree of the interpolation target vacancy. Thus, since similarity degree in an image which changes in smaller increments than the intervals (equivalent to twice the intervals between individual pixels) over which the same-color information is provided (an image with a high spatial frequency) cannot be accurately calculated through the technology disclosed in U.S. Pat. No. 5,629,734, the judgment with regard to the direction manifesting a pronounced similarity cannot be made with a high degree of accuracy, thereby presenting a high likelihood of color artifacs (or false color).

Through the technology disclosed in U.S. Pat. No. 5,652, 621, on the other hand, in which the similarity degree is calculated through expression C-2 which incorporates the results of a comparison of color information at adjacent pixels (hereafter referred to as a "different-color similarity component": correspond to $|-G2+2(A3+\text{bias})-G4|$ in expression C-2) with the same-color similarity components (correspond to $|-A1+2A3-A5|$ and $|G2-G4|$ in expression C-2), the occurrence of color artifacts can be reduced in an image with a high spatial frequency.

However, since the results of a comparison of color information corresponding to only two colors set on a single straight line (color information corresponding to the same-color component as that at the interpolation target vacancy and color information at a lattice point) are used as a different-color similarity component in the technology disclosed in U.S. Pat. No. 5,652,621, the similarity degree cannot be calculated with accuracy in an area where the color tone changes (an image in which the ratio of the color information corresponding to the three colors changes) as in a border area in a natural image and the influence of the different-color similarity components manifests to a greater degree than the influence of the same-color similarity components even when the same-color similarity components are calculated accurately, which presents difficulty in judging the direction along which a pronounced similarity manifests with accuracy, resulting in a high likelihood of occurrence of color artifacts.

In other words, when interpolating an image which includes an image area with a high spatial frequency and an image area where the color tone changes through either of the technologies disclosed in the U.S. patent specifications mentioned above, the similarity degrees in the two image areas in the image cannot be calculated accurately, resulting in the color artifacts occurring in either image area becoming conspicuous to disrupt the harmony of the entire image.

In addition, since the different-color similarity component is calculated by using G1 (interpolation quantity at A1) and bias' (bias at A1) in the technology disclosed in U.S. Pat. No. 5,652,621, once a similarity component is calculated erroneously, the error affects similarity components to be calculated subsequently, which presents a concern that the range over which color artifacts occur may expand.

In other words, in the worst scenario, by implementing interpolation processing through the technology disclosed in U.S. Pat. No. 5,652,621, the quality of the image may even become worse.

SUMMARY OF THE INVENTION

Accordingly, an object of the present invention is to provide an interpolation processing apparatus capable of calculating an interpolation quantity with a high degree of accuracy by accurately judging the direction along which the interpolation target vacancy manifests a pronounced similarity. Another object of the present invention is to provide a recording medium in which an interpolation processing program for calculating an interpolation quantity with a high degree of accuracy by accurately judging the direction along which the interpolation target vacancy manifests a pronounced similarity is recorded.

In order to attain the above object, an interpolation processing apparatus that performs interpolation processing on an image generated by an image-capturing sensor constituted by two-dimensionally arraying a plurality of lattice points each of which outputs color information corresponding to a first color component and a plurality of vacancies each of which outputs color information corresponding to a second color component or a third color component instead of outputting color information corresponding to the first color component, to determine an interpolation quantity equivalent to color information corresponding to the first color component for a vacancy, comprises: a similarity degree calculation unit that calculates two types of similarity components along each of a plurality of directions, which are a "similarity component obtained by using color information corresponding to the first color component and color information corresponding to the second color component" and a "similarity component obtained by using color information corresponding to the first color component and color information corresponding to the third color component", for an interpolation target vacancy to undergo the interpolation processing based upon color information corresponding to the first through third color components output from the interpolation target vacancy and lattice points and vacancies near the interpolation target vacancy, and then calculates similarity degrees based upon the two types of similarity components; a similarity judgment unit that makes a judgment with respect to a direction manifesting pronounced similarity for the interpolation target vacancy based upon the similarity degrees along the plurality of directions calculated by the similarity degree calculation unit; and an interpolation quantity calculation unit that calculates the interpolation quantity for the interpolation target vacancy in conformance to results of the judgment made by the similarity judgment unit.

In this interpolation processing apparatus, it is preferred that, the similarity degree calculation unit calculates at least three types of similarity components along each of the plurality of directions, including at least one type of similarity component among a "similarity component obtained by using color information corresponding to the first color component alone", a "similarity component obtained by using color information corresponding to the second color component alone" and "a "similarity component obtained by using color information corresponding to the third color component alone", and calculates the similarity degrees based upon the at least three types of similarity components.

Also, it is preferred that the similarity degree calculation unit calculates the similarity degrees for the interpolation target vacancy along the plurality of directions by combining a plurality of types of similarity components obtained along each of the plurality of directions through weighted addition of similarity components performed along each direction.

Also, it is preferred that the similarity degree calculation unit calculates the similarity degrees for the interpolation target vacancy by using a similarity component calculated on a vacancy located near the interpolation target vacancy.

Also, it is preferred that the similarity judgment unit makes a decision as to whether or not a difference between similarity degrees along individual directions exceeds a specific threshold value and judges that roughly equal similarity degrees manifest along the directions if the difference does not exceed the threshold value.

Also, it is preferred that when the similarity judgment unit judges that one of the plurality of directions manifests pronounced similarity, the interpolation quantity calculation unit calculates an average of values indicated by color information from two lattice points set along the direction manifesting pronounced similarity as the interpolation quantity, whereas when the similarity judgment unit judges that similarity degrees manifested along the plurality of directions are close to each other, the interpolation quantity calculation unit ascertains an interpolation quantity through another method without calculating an average of values indicated by color information from two lattice points set along one of the plurality of directions.

An interpolation processing apparatus that performs interpolation processing on an image generated by an image-capturing sensor constituted by two-dimensionally arraying a plurality of lattice points each of which outputs color information corresponding to a first color component and a plurality of vacancies each of which outputs color information corresponding to a second color component or a third color component instead of outputting color information corresponding to the first color component, to determine an interpolation quantity equivalent to color information corresponding to the first color component for a vacancy, comprises: a similarity degree calculation unit that calculates at least two types of similarity components along each of a plurality of directions including (a) a "similarity component obtained by using color information at a vacancy that outputs color information corresponding to a color component different from a color component of the interpolation target vacancy and color information corresponding to the first color component" and (b) at least one type of similarity component among a "similarity component obtained by using color information corresponding to the first color component alone", a "similarity component obtained by using color information corresponding to the second color component alone" and a "similarity component obtained by using color information corresponding to the third color component alone", for an interpolation target vacancy to undergo the interpolation processing, based upon color information corresponding to the first through third color components output from the interpolation target vacancy and lattice points and vacancies near the interpolation target vacancy, and then calculates similarity degrees based upon the at least two types of similarity components; a similarity judgment unit that makes a judgment with respect to a direction manifesting pronounced similarity for the interpolation target vacancy based upon the similarity degrees along the plurality of directions calculated by the similarity degree calculation unit; and an interpolation quantity calculation unit that calculates an interpolation quantity for the interpolation target vacancy in conformance to results of the judgment made by the similarity judgment unit.

An interpolation processing apparatus that performs interpolation processing on an image generated by an image-capturing sensor constituted by two-dimensionally arraying a plurality of lattice points each of which outputs color information corresponding to a first color component and a plurality of vacancies each of which outputs color information corresponding to a second color component or a third color component instead of outputting color information corresponding to the first color component, to determine an interpolation quantity equivalent to color information corresponding to the first color component for a vacancy, comprises: a similarity degree calculation unit that calculates similarity degrees along a plurality of directions for an interpolation target vacancy to undergo the interpolation processing; a similarity judgment unit that makes a judgment with respect to a direction manifesting pronounced similarity for the interpolation target vacancy based upon the similarity degrees along the plurality of directions calculated by the similarity degree calculation unit; and an interpolation quantity calculation unit that calculates an interpolation quantity for the interpolation target vacancy in conformance to results of the judgment made by the similarity judgment unit. And the similarity degree calculation unit calculates at least two types of similarity components along each of the plurality of directions including (a) a "similarity component obtained by using color information output from the interpolation target vacancy and color information corresponding to the first color component" and (b) at least one type of similarity component among a "similarity component obtained by using color information corresponding to the first color component alone", a "similarity component obtained by using color information corresponding to the second color component alone" and a "similarity component obtained by using color information corresponding to the third color component alone", based upon color information corresponding to the first through third color components output from the interpolation target vacancy and lattice points and vacancies near the interpolation target vacancy, and then calculates similarity degrees based upon the at least two types of similarity components; and the "similarity component obtained by using color information from the interpolation target vacancy and color information corresponding to the first color component" is calculated through "a1|G1−A2|+a2|G3−A2" in which G1 and G3 represent color information at two lattice points set on a single straight line with the interpolation target vacancy located in between, A2 represents the color information at the interpolation target vacancy and a1 and a2 each represent a constant with at least either a1 or a2 not equal to 0.

An interpolation processing apparatus that performs interpolation processing on an image generated by an image-capturing sensor constituted by two-dimensionally arraying a plurality of lattice points each of which outputs color information corresponding to a first color component and a plurality of vacancies each of which outputs color information corresponding to a second color component or a third color component instead of outputting color information corresponding to the first color component, to determine an interpolation quantity equivalent to color information corresponding to the first color component for a vacancy, comprises: a similarity degree calculation unit that calculates at least two types of similarity degrees among a "similarity degree obtained by using color information corresponding to the first color component and color information corresponding to the second color component", a "similarity degree obtained by using color information corresponding to the first color component and color information corresponding to the third color component", a "similarity degree obtained by using color information corresponding to the first color component alone", a "similarity degree obtained by using color information corresponding to the second color component alone" and a "similarity degree obtained by using color information corresponding to the third color component alone" as similarity degrees along a plurality of directions manifesting at an interpolation target vacancy, based upon color information corresponding to the first through third color components output from the interpolation to undergo the interpolation processing and lattice points and vacancies near the interpolation target vacancy; a similarity judgment unit that makes a judgment with respect to a direction manifesting pronounced similarity relative to the interpolation target vacancy by comparing, along each direction, similarity degrees of a single type among a plurality of types of similarity degrees along the plurality of directions calculated for the interpolation target vacancy by the similarity degree calculation unit, determining a direction manifesting pronounced similarity for each type of similarity degree and ascertaining a direction being in a majority of directions manifesting pronounced similarity; and an interpolation quantity calculation unit that calculates an interpolation quantity for the interpolation target vacancy in conformance to results of the judgment made by the similarity judgment unit.

An interpolation processing apparatus that performs interpolation processing on an image generated by an image-capturing sensor constituted by two-dimensionally arraying a plurality of lattice points each of which outputs color information corresponding to a first color component and a plurality of vacancies each of which outputs color information corresponding to a second color component or a third color component instead of outputting color information corresponding to the first color component, to determine an interpolation quantity equivalent to color information corresponding to the first color component for a vacancy, comprises: a similarity degree calculation unit that calculates at least one type of similarity component among two types of similarity components, which are a "similarity component obtained by using color information from an interpolation target vacancy and color information corresponding to the first color component" and a "similarity component obtained by using color information corresponding to the first color component alone" as similarity components along a plurality of directions for the interpolation target vacancy based upon color information output from the interpolation target vacancy undergoing the interpolation processing and lattice points and vacancies near the interpolation target vacancy, and calculates similarity degrees along a plurality of directions for the interpolation target vacancy based upon the at least one type of similarity component; a similarity judgment unit that makes a judgment with respect to a direction manifesting pronounced similarity for the interpolation target vacancy based upon the similarity degrees along the plurality of directions calculated by the similarity degree calculation unit; and an interpolation quantity calculation unit that calculates an interpolation quantity for the interpolation target vacancy in conformance to results of the judgment made by the similarity judgment unit. And the similarity degree calculation unit extracts characteristics of an image over an area surrounding the interpolation target vacancy and calculates one type of similarity component selected in conformance to the characteristics among the two types of similarity components as the similarity degree, or calculates the similarity degree by calculating the two types of similarity components and performing weighted addition of the calculated two types of similarity components while adjusting a weighting ratio in correspondence to the characteristics.

In this interpolation processing apparatus, it is preferred that the similarity degree calculation unit calculates the "similarity degrees obtained by using color information from the interpolation target vacancy and color information corresponding to the first color component" when the characteristics of the image in the area around the interpolation target vacancy indicate that sets of color information from a plurality of lattice points set along a first direction among two directions intersecting at a right angle at the interpolation target vacancy are highly similar, that sets of color information from a plurality of lattice points set along a second direction among the two directions are highly similar and that the color information from lattice points set along the first direction is greatly different from the color information from lattice points set along the second direction.

An interpolation processing apparatus that performs interpolation processing on an image generated by an image-capturing sensor constituted by two-dimensionally arraying a plurality of lattice points each of which outputs color information corresponding to a first color component and a plurality of vacancies each of which outputs color information corresponding to a second color component or a third color component instead of outputting color information corresponding to the first color component, to determine an interpolation quantity equivalent to color information corresponding to the first color component for a vacancy, comprises: a similarity degree calculation unit that calculates at least one type of similarity component among two types of similarity components, which are a "similarity component obtained by using color information from an interpolation target vacancy and color information corresponding to the first color component" and a "similarity component obtained by using color information corresponding to the first color component alone" as similarity components along a plurality of directions for the interpolation target vacancy based upon color information output from the interpolation target vacancy undergoing the interpolation processing and lattice points and vacancies near the interpolation target vacancy, and calculates similarity degrees along a plurality of directions for the interpolation target vacancy based upon the at least one type of similarity component; a similarity judgment unit that makes a judgment with respect to a direction manifesting pronounced similarity for the interpolation target vacancy based upon the similarity degrees along the plurality of directions calculated by the similarity degree calculation unit; an interpolation quantity calculation unit that calculates an interpolation quantity for the interpolation target vacancy in conformance to results of the judgment made by the similarity judgment unit; and an interface unit that receives a first instruction indicating which of the two types of similarity components is to be calculated or a second instruction indicating a weighting rate to be used when performing weighted addition of the two types of similarity components. And the similarity degree calculation unit calculates one type of similarity component as indicated by the first instruction as the similarity degree when the first instruction has been received at the interface unit, and calculates the similarity degrees through weighted addition of the two types of similarity components implemented in response to the second instruction when the second instruction has been received at the interface unit.

A recording medium has an interpolation processing program recorded therein for enabling a computer to execute interpolation processing on an image generated by an image-capturing sensor constituted by two dimensionally arraying a plurality of lattice points each of which outputs color information corresponding to a first color component and a plurality of vacancies each of which outputs color information corresponding to a second color component or a third color component instead of outputting color information corresponding to the first color component, to determine an interpolation quantity equivalent to color information corresponding to the first color component for a vacancy. The interpolation processing program comprises: a similarity degree calculation step in which two types of similarity components along each of a plurality of directions, which are a "similarity component obtained by using color information corresponding to the first color component and color information corresponding to the second color component" and a "similarity component obtained by using color information corresponding to the first color component and color information corresponding to the third color component", are calculated for an interpolation target vacancy to undergo the interpolation processing based upon color information corresponding to the first through third color components output from the interpolation target vacancy and lattice points and vacancies near the interpolation target vacancy, and then similarity degrees are calculated based upon the two types of similarity components; a similarity judgment step in which a judgment is made with respect to a direction manifesting pronounced similarity for the interpolation target vacancy based upon the similarity degrees along the plurality of directions calculated in the similarity degree calculation step; and an interpolation quantity calculation step in which an interpolation quantity for the interpolation target vacancy is calculated in conformance to results of the judgment made in the similarity judgment step.

A recording medium has an interpolation processing program recorded therein for enabling a computer to execute interpolation processing on an image generated by an image-capturing sensor constituted by two-dimensionally arraying a plurality of lattice points each of which outputs color information corresponding to a first color component and a plurality of vacancies each of which outputs color information corresponding to a second color component or a third color component instead of outputting color information corresponding to the first color component, to determine an interpolation quantity equivalent to color information corresponding to the first color component for a vacancy. The interpolation processing program comprises: a similarity degree calculation step in which at least two types of similarity components along each of a plurality of directions including (a) a "similarity component obtained by using color information at a vacancy that outputs color information corresponding to a color component different from a color component of the interpolation target vacancy and color information corresponding to the first color component" and (b) at least one type of similarity component among a "similarity component obtained by using color information corresponding to the first color component alone", a "similarity component obtained by using color information corresponding to the second color component alone" and a "similarity component obtained by using color information corresponding to the third color component alone", are calculated for an interpolation target vacancy to undergo the interpolation processing, based upon color information corresponding to the first through third color components output from the interpolation target vacancy and lattice points and vacancies near the interpolation target vacancy, and then similarity degrees are calculated based upon the at least two types of similarity components; a similarity judgment step in which a judgment is made with respect to a direction manifesting pronounced similarity for the interpolation target vacancy based upon the similarity degrees along the plurality of directions calculated by the similarity degree calculation step; and an interpolation quantity calculation step in which an interpolation quantity for the interpolation target vacancy is calculated in conformance to results of the judgment made in the similarity judgment step.

A recording medium has an interpolation processing program recorded therein for enabling a computer to execute interpolation processing on an image generated by an image-capturing sensor constituted by two-dimensionally arraying a plurality of lattice points each of which outputs color information corresponding to a first color component and a plurality of vacancies each of which outputs color information corresponding to a second color component or a third color component instead of outputting color information corresponding to the first color component, to determine an interpolation quantity equivalent to color information corresponding to the first color component for a vacancy. The interpolation processing program comprises: a similarity degree calculation step in which similarity degrees along a plurality of directions are calculated for a interpolation target vacancy to undergo the interpolation processing; a similarity judgment step in which a judgment is made with respect to a direction manifesting pronounced similarity for the interpolation target vacancy based upon the similarity degrees along the plurality of directions calculated by the similarity degree calculation step; and an interpolation quantity calculation step in which an interpolation quantity for the interpolation target vacancy is calculated in conformance to results of the judgment made in the similarity judgment step. And in the similarity degree calculation step at least two types of similarity components are calculated along the plurality of directions including (a) a "similarity component obtained by using color information output from the interpolation target vacancy and color information corresponding to the first color component" (b) at least one type of similarity component among a "similarity component obtained by using color information corresponding to the first color component alone", a "similarity component obtained by using color information corresponding to the second color component alone" and a "similarity component obtained by using color information corresponding to the third color component a one", based upon color information corresponding to the first through third color components output from the interpolation target vacancy and lattice points and vacancies near the interpolation target vacancy, and then the similarity degrees are calculated based upon the at least two types of similarity components; and the "similarity component obtained by using color information from the interpolation target vacancy and color information corresponding to the first color component" calculated through "a1|G1−A2|+a2|G3−A2|" in which G1 and G3 represent color information at two lattice points set on a single straight line with the interpolation target vacancy located in between, A2 represents color information at the interpolation target vacancy and a1 and a2 each represent a constant with at least either a1 or a2 not equal to 0.

A recording medium has an interpolation processing program recorded therein for enabling a computer to execute interpolation processing on an image generated by an image-capturing sensor constituted by two-dimensionally arraying a plurality of lattice points each of which outputs color information corresponding to a first color component and a plurality of vacancies each of which outputs color information corresponding to a second color component or a third color component instead of outputting color information corresponding to the first color component, to determine an interpolation quantity equivalent to color information corresponding to the first color component for a vacancy. The interpolation processing program comprises: a similarity degree calculation step in which at least two types of similarity degrees among a "similarity degree obtained by using color information corresponding to the first color component and color information corresponding to the second color component", a "similarity degree obtained by using color information corresponding to the first color component and color information corresponding to the third color component", a "similarity degree obtained by using color information corresponding to the first color component alone", a "similarity degree obtained by using color information corresponding to the second color component alone" and a "similarity degree obtained by using color information corresponding to the third color component alone" are calculated as similarity degrees along a plurality of directions manifesting at an interpolation target vacancy based upon color information corresponding to the first through third color components output from the interpolation target vacancy to undergo the interpolation processing and lattice points and vacancies near the interpolation target vacancy; a similarity judgment step in which a judgment is made with respect to a direction manifesting pronounced similarity relative to the interpolation target vacancy by comparing, along each direction, similarity degrees of a single type among a plurality of types of similarity degrees calculated along the plurality of directions for the interpolation target vacancy in the similarity degree calculation step, determining a direction manifesting pronounced similarity for each type of similarity degree and ascertaining a direction being in a majority of directions manifesting pronounced similarity; and an interpolation quantity calculation step in which an interpolation quantity for the interpolation target vacancy is calculated in conformance to results of judgment made in the similarity judgment step.

A recording medium has an interpolation processing program recorded therein for enabling a computer to execute interpolation processing on an image generated by an image-capturing sensor constituted by two-dimensionally arraying a plurality of lattice points each of which outputs color information corresponding to a first color component and a plurality of vacancies each of which outputs color information corresponding to a second color component or a third color component instead of outputting color information corresponding to the first color component, to determine an interpolation quantity equivalent to color information corresponding to the first color component for a vacancy. The interpolation processing program comprises: a similarity degree calculation step in which at least one type of similarity components among two types of similarity components, which are a "similarity component obtained by using color information from an interpolation target vacancy and color information corresponding to the first color component" and a "similarity component obtained by using color information corresponding to the first color component alone" is calculated as similarity component along a plurality of directions for the interpolation target vacancy based upon color information output from the interpolation target vacancy undergoing the interpolation processing and lattice points and vacancies set near the interpolation target vacancy, and similarity degrees along a plurality of directions for the interpolation target vacancy are calculated based upon the at least one type of similarity components; a similarity judgment step in which a judgment is made with respect to a direction manifesting pronounced similarity for the interpolation target vacancy is judged based upon the similarity degrees along the plurality of directions calculated in the similarity degree calculation step; and an interpolation quantity calculation step in which an interpolation quantity for the interpolation target vacancy is calculated in conformance to results of the judgment made in the similarity judgment step. In the similarity degree calculation step, characteristics of an image over an area surrounding the interpolation target vacancy is extracted, and one type of similarity component selected in conformance to the characteristics among the two types of similarity components is calculated as the similarity degrees, or the similarity degrees are calculated by calculating two types of similarity degrees and performing weighted addition of the two types of similarity components while adjusting a weighting ratio in correspondence to the characteristics.

A recording medium has an interpolation processing program recorded therein for enabling a computer to execute interpolation processing on an image generated by an image-capturing sensor constituted by two-dimensionally arraying a plurality of lattice points each of which outputs color information corresponding to a first color component and a plurality of vacancies each of which outputs color information corresponding to a second color component or a third color component instead of outputting color information corresponding to the first color component, to determine an interpolation quantity equivalent to color information corresponding to the first color component for a vacancy. The interpolation processing program comprises: a similarity degree calculation step in which at least one type of similarity components among two types of similarity components, which are a "similarity component obtained by using color information from an interpolation target vacancy and color information corresponding to the first color component" and a "similarity component obtained by using color information corresponding to the first color component alone" is calculated as similarity component along a plurality of directions for the interpolation target vacancy based upon color information output from the interpolation target vacancy undergoing the interpolation processing and lattice points and vacancies set near the interpolation target vacancy, and similarity degrees along a plurality of directions for the interpolation target vacancy are calculated based upon the at least one type of similarity components; a similarity judgment step in which a judgment is made with respect to a direction manifesting pronounced similarity for the interpolation target vacancy is judged based upon the similarity degrees along the plurality of directions calculated in the similarity degree calculation step; an interpolation quantity calculation step in which an interpolation quantity for the interpolation target vacancy is calculated in conformance to results of the judgment made in the similarity judgment step; and an interface step in which a first instruction indicating which of the two types of similarity components is to be calculated is received or a second instruction indicating a weighting rate to be used when performing weighted addition of the two types of similarity components is received. And in the similarity degree calculation step, one type of similarity component is calculated as indicated by the first instruction as the similarity degrees when the first instruction has been received in the interface step, and the similarity degrees are calculated through weighted addition of the two types of similarity components implemented in response to the second instruction when the second instruction has been received in the interface step.

An interpolation processing apparatus that performs interpolation to obtain color information corresponding to a first color component of a pixel, in which the first color component is missing, of an image-capturing sensor having a plurality of pixels which are arranged in a two-dimensional array and output color information corresponding to different color components which are first~third color components, each of the plurality of pixels outputting color information corresponding to a single color component, comprises: a similarity degree calculation unit that calculates each of similarity degrees along, at least, two directions relative to an interpolation target pixel to undergo interpolation processing by using a "different-color similarity component obtained by using color information corresponding to different color components" calculated with a "similarity degree element constituted of color information from three or fewer pixels", based upon color is information at a plurality of pixels selected from the interpolation target pixel and pixels near the interpolation target pixel; a similarity judgment unit that makes a judgment on degrees of similarity along the individual directions based upon the similarity degrees; and an interpolation quantity calculation unit that calculates an interpolation quantity for the interpolation target pixel based upon results of the judgment made by the similarity judgment unit.

In this interpolation processing apparatus, it is preferred that the similarity degree calculation unit calculates a "same-color similarity component obtained by using color information corresponding to a single color component" for each of one or more color components and calculates the each of similarity degrees by using the same-color similarity component together with the different-color similarity component.

Also, it is preferred that the similarity degree calculation unit calculates the similarity degrees manifesting at the interpolation target pixel by incorporating similarity components calculated for pixels located around the interpolation target pixel as well as the similarity components calculated for the interpolation target pixel.

An interpolation processing apparatus that performs interpolation to obtain color information corresponding to a first color component of a pixel, in which the first color component is missing, of an image-capturing sensor having a plurality of pixels which are arranged in a two-dimensional array and output color information corresponding to different color components which are first~third color components, each of the plurality of pixels outputting color information corresponding to a single color component, comprises: a similarity degree calculation unit that calculates each of similarity degrees along at least two directions relative to an interpolation target pixel to undergo interpolation processing by using color information corresponding to three different color components and a "similarity degree element constituted of color information from three or fewer pixels", based upon color information to a plurality of pixels selected from the interpolation target pixel and pixels near the interpolation target pixel; a similarity judgment unit that makes a judgment on degrees of similarity along the individual directions based upon the similarity degrees; and an interpolation quantity calculation unit that calculates an interpolation quantity for the interpolation target pixel based upon results of the judgment made by the similarity judgment unit.

An interpolation processing apparatus that performs is interpolation to obtain color information corresponding to a first color component of a pixel, in which the first color component is missing, of an image-capturing sensor having a plurality of pixels which are arranged in a two-dimensional array and output color information corresponding to different color components which are first~third color components, each of the plurality of pixels outputting color information corresponding to a single color component, comprises: a similarity degree calculation unit that calculates each of similarity degrees along at least two directions relative to an interpolation target pixel to undergo interpolation processing by using color information corresponding to three different components and a "different-color similarity component obtained by using color information corresponding to two different color components", based upon color information at a plurality of pixels selected from the interpolation target pixel and pixels near the interpolation target pixel; a similarity judgment unit that makes a judgment on degrees of similarity along the individual directions based upon the similarity degrees; and an interpolation quantity calculation unit that calculates an interpolation quantity for the interpolation target pixel based upon results of the judgment made by the similarity judgment unit.

An interpolation processing apparatus that performs interpolation to obtain color information corresponding to a first color component of a pixel, in which the first color component is missing, of an image-capturing sensor having a plurality of pixels which are arranged in a two-dimensional array and output color information corresponding to different color components which are first~third color components, each of the plurality of pixels outputting color information corresponding to a single color component, comprises: a similarity degree calculation unit that calculates each of similarity degrees along, at least, two directions relative to an interpolation target pixel to undergo interpolation processing based upon color information at a plurality of pixels selected from the interpolation target pixel and pixels near the interpolation target pixel, by calculating a "same-color similarity component obtained by using color information corresponding to a single color component" for each of three color components, by calculating a "different-color similarity component obtained by using color information corresponding to different color components" and by utilizing the similarity components in combination with each other; a similarity judgment unit that makes a judgment on degrees of similarity along the individual directions based upon the similarity degrees; and an interpolation quantity calculation unit that calculates an interpolation quantity for the interpolation target pixel based upon results of the judgment made by the similarity judgment unit.

An interpolation processing apparatus that performs interpolation to obtain color information corresponding to a first color component of a pixel, in which the first color component is missing, of an image-capturing sensor having a plurality of pixels which are arranged in a two-dimensional array and output color information corresponding to different color components which are first~third color components, each of the plurality of pixels outputting color information corresponding to a single color component, comprises: a similarity degree calculation unit that calculates each of similarity degrees along, at least, two directions relative to an interpolation target pixel to undergo interpolation processing based upon color information at a plurality of pixels selected from the interpolation target pixel and pixels near the interpolation target pixel, by calculating a "different-color similarity component obtained by using color information corresponding to different color components" for each of three color components, by calculating a "same-color similarity component obtained by using color information corresponding to a single color component" for each of two or more color components and by utilizing the similarity components in combination with each other; a similarity judgment unit that makes a judgment on degrees of similarity along the individual directions based upon the similarity degrees; and an interpolation quantity calculation unit that calculates an interpolation quantity for the interpolation target pixel based upon results of the judgment made by the similarity judgment unit.

An interpolation processing apparatus that performs interpolation to obtain color information corresponding to a first color component of a pixel, in which the first color component is missing, of an image-capturing sensor having a plurality of pixels which are arranged in a two-dimensional array and output color information corresponding to different color components which are first~third color components, each of the plurality of pixels outputting color information corresponding to a single color component, comprises: a similarity degree calculation unit that calculates each of similarity degrees along, at least, two directions relative to an interpolation target pixel to undergo interpolation processing based upon color information at a plurality of pixels selected from the interpolation target pixel and pixels near the interpolation target pixel, by using a "different-color similarity component obtained by using color information corresponding to two different color components" and a "same-color similarity component obtained by using color information corresponding to a single color component calculated with a similarity degree element constituted of color information from two pixels"; a similarity judgment unit that makes a judgment on degrees of similarity along the individual directions based upon the similarity degrees; and an interpolation quantity calculation unit that calculates an interpolation quantity for the interpolation target pixel based upon results of the judgment made by the similarity judgment unit.

An interpolation processing apparatus that performs interpolation to obtain color information corresponding to a first color component of a pixel, in which the first color component is missing, of an image-capturing sensor having a plurality of pixels which are arranged in a two-dimensional array and output color information corresponding to different color components which are first~third color components, each of the plurality of pixels outputting color information corresponding to a single color component, comprises: a similarity degree calculation unit that calculates each of similarity degrees along, at least, two directions relative to an interpolation target pixel to undergo interpolation processing based upon color information at a plurality of pixels selected from the interpolation target pixel and pixels near the interpolation target pixel, by calculating a "same-color similarity component obtained by using color information corresponding to a single color component calculated with a similarity degree element constituted of color information from two pixels" for each of two or more color components, and by performing weighted addition of the same-color similarity components; a similarity judgment unit that makes a judgment on degrees of similarity along the individual directions based upon the similarity degrees; and an interpolation quantity calculation unit that calculates an interpolation quantity for the interpolation target pixel based upon results of the judgment made by the similarity judgment unit.

An interpolation processing apparatus that performs interpolation to obtain color information corresponding to a first color component of a pixel, in which the first color component is missing, of an image-capturing sensor having a plurality of pixels which are arranged in a two-dimensional array and output color information corresponding to different color components which are first~third color components, each of the plurality of pixels outputting color information corresponding to a single color component, comprises: a similarity degree calculation unit that calculates each of similarity degrees along, at least, two directions relative to an interpolation target pixel to undergo interpolation processing based upon color information at a plurality of pixels selected from the interpolation target pixel and pixels near the interpolation target pixel, by using a "different-color similarity component obtained by using color information corresponding to a color component different from the color component of the interpolation target pixel and the first color component and color information corresponding to the first color component"; a similarity judgment unit that makes a judgment on degrees of similarity along the individual direction, based upon the similarity degrees; and an interpolation quantity calculation unit that calculates an interpolation quantity for the interpolation target pixel based upon results of the judgment made by the similarity judgment unit.

An interpolation processing apparatus that performs interpolation to obtain color information corresponding to a first color component of a pixel, in which the first color component is missing, of an image-capturing sensor having a plurality of pixels which are arranged in a two-dimensional array and output color information corresponding to different color components which are first~third color components, each of the plurality of pixels outputting color information corresponding to a single color component, comprises a similarity degree calculation unit that calculates each of similarity degrees along, at least, two directions relative to an interpolation target pixel to undergo interpolation processing based upon color information at a plurality of pixels selected from the interpolation target pixel and pixels near the interpolation target pixel, for each of two types of similarity degrees, which are a "similarity degree containing a different-color similarity component obtained by using color information corresponding to different color components" and a "similarity degree containing a same-color similarity component obtained by using color information corresponding to a single color component", by switching to either type of similarity degrees or switching weighting ratios to be used in weighted addition of the similarity degrees in correspondence to characteristics of an image over an area surrounding the interpolation target pixel; a similarity judgment unit that makes a judgment on degrees of similarity along the individual directions based upon the similarity degrees; and an interpolation quantity calculation unit that calculates an interpolation quantity for the interpolation target pixel based upon results of the judgment made by the similarity judgment unit.

A recording medium has an interpolation processing program for performing interpolation to obtain color information corresponding to a first color component for a pixel, in which the first color component is missing, of an image-capturing sensor having a plurality of pixels which are arranged in a two dimensional array and output color information corresponding to different color components which are first~third color components, each of the plurality of pixels outputting color information corresponding to a single color component. The interpolation processing program comprises: a similarity degree calculation step in which each of similarity degrees along, at least, two directions relative to an interpolation target pixel to undergo interpolation processing is calculated by using a "different-color similarity component obtained by using color information corresponding to different color components" calculated with a "similarity degree element constituted of color information from three or fewer pixels", based upon color information at a plurality of pixels selected from the interpolation target pixel and pixels near the interpolation target pixel; a similarity judgment step in which a judgment is made on degrees of similarity along the individual directions based upon the similarity degrees; and an interpolation quantity calculation step in which an interpolation quantity for the interpolation target pixel is calculated based upon results of the judgment made in the similarity judgment step.

An interpolation processing apparatus that performs interpolation to obtain color information corresponding to a first color component of a pixel, in which the first color component is missing, of an image-capturing sensor having a plurality of pixels which are arranged in a two-dimensional array and output color information corresponding to different color components, which are first~nth (n≧2) color components, each of the plurality of pixels outputting color information corresponding to a single color component, comprises: a similarity degree calculation unit that calculates each of similarity degrees along, at least, two directions relative to an interpolation target pixel to undergo interpolation processing by using a "different-color similarity component obtained by using color information corresponding to different color components" calculated with a "similarity degree element constituted of color information from three or fewer pixels", based upon color information at a plurality of pixels selected from the interpolation target pixel and pixels near the interpolation target pixel; a similarity judgment unit that makes a judgment on degrees of similarity along the individual directions based upon the similarity degrees; and an interpolation quantity calculation unit that calculates an interpolation quantity for the interpolation target pixel based upon results of the judgment made by the similarity judgment unit.

In this interpolation processing apparatus, it is preferred that the similarity degree calculation unit calculates a "same-color similarity component obtained by using color information corresponding to a single color component" for each of one or more color components and calculates the each of similarity degrees by using the same-color similarity component together with the different-color similarity component.

An interpolation processing apparatus that performs interpolation to obtain color information corresponding to a first color component of a pixel, in which the first color component is missing, of an image-capturing sensor having a plurality of pixels which are arranged in a two-dimensional array and output color information corresponding to different color components, which are first~nth (n≧3) color components, each of the plurality of pixels outputting color information corresponding to a single color component, comprises: a similarity degree calculation unit that calculates each of similarity degrees along at least two directions relative to an interpolation target pixel to undergo interpolation processing by using color information corresponding to three or more different color components and a "similarity degree element constituted of color information from three or fewer pixels", based upon color information at a plurality of pixels selected from the interpolation target pixel and pixels near the interpolation target pixel; a similarity judgment unit that makes a judgment on degrees of similarity along the individual direction based upon the similarity degrees; and an interpolation quantity calculation unit that calculates an interpolation quantity for the interpolation target pixel based upon results of the judgment made by the similarity judgment unit.

An interpolation processing apparatus that performs interpolation to obtain color information corresponding to a first color component of a pixel, in which the first color component is missing, of an image-capturing sensor having a plurality of pixels which are arranged in a two-dimensional array and output color information corresponding to different color components, which are first~nth (n≧3) color components, each of the plurality of pixels outputting color information corresponding to a single color component, comprises a similarity degree calculation unit that calculates each of similarity degrees along at least two directions relative to an interpolation target pixel to undergo interpolation processing by using color information corresponding to three or more different components and a "different-color similarity component obtained by using color information corresponding to two different color components", based upon color information at a plurality of pixels selected from the interpolation target pixel and pixels near the interpolation target pixel; a similarity judgment unit that makes a judgment on degrees of similarity along the individual directions based upon the similarity degrees; and an interpolation quantity calculation unit that calculates an interpolation quantity for the interpolation target pixel based upon results of the judgment made by the similarity judgment unit.

An interpolation processing apparatus that performs interpolation to obtain color information corresponding to a first color component of a pixel, in which the first color component is missing, of an image-capturing sensor having a plurality of pixels which are arranged in a two-dimensional array and output color information corresponding to different color components, which are first~nth (n≧3) color components, each of the plurality of pixels outputting color information corresponding to a single color component, comprises; a similarity degree calculation unit that calculates each of similarity degrees along, at least, two directions relative to an interpolation target pixel to undergo interpolation processing based upon color information at a plurality of pixels selected from the interpolation target pixel and pixels near the interpolation target pixel, by calculating a "same-color similarity component obtained by using color information corresponding to a single color component" for each of three or more color components, by calculating a "different-color similarity component obtained by using color information corresponding to different color components" and by utilizing the similarity components in combination with each other; a similarity judgment unit that makes a judgment on degrees of similarity along the individual direction based upon the similarity degrees; and an interpolation quantity calculation unit that calculates an interpolation quantity for the interpolation target pixel based upon results of the judgment made by the similarity judgment unit.

An interpolation processing apparatus that performs interpolation to obtain color information corresponding to a first color component of a pixel, in which the first color component is missing, of an image-capturing sensor having a plurality of pixels which are arranged in a two-dimensional array and output color information corresponding to different color components, which are first~nth (n≧3) color components, each of the plurality of pixels outputting color information corresponding to a single color component, comprises: a similarity degree calculation unit that calculates each of similarity degrees along, at least, two directions relative to an interpolation target pixel to undergo interpolation processing based upon color information at a plurality of pixels selected from the interpolation target pixel and pixels near the interpolation target pixel, by calculating a "different-color similarity component obtained by using color information corresponding to different color components" for each of three or more color components, by calculating a "same-color similarity component obtained by using color information corresponding to a single color component" for each of two or more color components and by utilizing the similarity color components in combination with each other; a similarity judgment unit that makes a judgment on degrees of similarity along the individual direction based upon the similarity degrees; and an interpolation quantity calculation unit that calculates an interpolation quantity for the interpolation target pixel based upon results of the judgment made by the similarity judgment unit.

An interpolation processing apparatus that performs interpolation to obtain color information corresponding to a first color component of a pixel, in which the first color component is missing, of an image-capturing sensor having a plurality of pixels which are arranged in a two-dimensional array and output color information corresponding to different color components, which are first~nth (n≧2) color components, each of the plurality of pixels outputting color information corresponding to a single color component, comprises: a similarity degree calculation unit that calculates each of similarity degrees along, at least, two directions relative to an interpolation target pixel to undergo interpolation processing based upon color information at a plurality of pixels selected from the interpolation target pixel and pixels near the interpolation target pixel, by using a "different-color similarity component obtained by using color information corresponding to two different color components" and a "same-color similarity component obtained by using color information corresponding to a single color component calculated with a similarity degree element constituted of color information from two pixels"; a similarity judgment unit that makes a judgment on degrees of similarity along the individual directions based upon the similarity degrees; and an interpolation quantity calculation unit that calculates an interpolation quantity for the interpolation target pixel based upon results of the judgment made by the similarity judgment unit.

An interpolation processing apparatus that performs interpolation to obtain color information corresponding to a first color component of a pixel, in which the first color component is missing, of an image-capturing sensor having a plurality of pixels which are arranged in a two-dimensional array and output color information corresponding to different color components, which are first~nth (n≧2) color components, each of the plurality of pixels outputting color information corresponding to a single color component, comprises: a similarity degree calculation unit that calculates each of similarity degrees along, at least, two directions relative to an interpolation target pixel to undergo interpolation processing based upon color information at a plurality of pixels selected from the interpolation target pixel and pixels near the interpolation target pixel, by calculating a "same-color similarity component obtained by using color information corresponding to a single color component calculated with a similarity degree element constituted of color information from two pixels" for each of two or more color components, and by performing weighted addition of the same-color similarity component; a similarity judgment unit that makes a judgment on degrees of similarity along the individual directions based upon the similarity degrees; and an interpolation quantity calculation unit that calculates an interpolation quantity for the interpolation target pixel based upon results of the judgment made by the similarity judgment unit.

An interpolation processing apparatus that performs interpolation to obtain color information corresponding to a first color component of a pixel, in which the first color component is missing, of an image-capturing sensor having a plurality of pixels which are arranged in a two-dimensional array and output color information corresponding to different color components, which are first~nth ($n \geq 3$) color components, each of the plurality of pixels outputting color information corresponding to a single color component, comprises: a similarity degree calculation unit that calculates each of similarity degrees along, at least, two directions relative to an interpolation target pixel to undergo interpolation processing based upon color information at a plurality of pixels selected from the interpolation target pixel and pixels near the interpolation target pixel, by using a "different-color similarity component obtained by using color information corresponding to a color component different from the color component of the interpolation target pixel and the first color component and color information corresponding to the first color component"; a similarity judgment unit that makes a judgment on degrees of similarity along the individual direction based upon the similarity degrees; and an interpolation quantity calculation unit that calculates an interpolation quantity for the interpolation target pixel based upon results of the judgment made by the similarity judgment unit.

An interpolation processing apparatus that performs interpolation to obtain color information corresponding to a first color component of a pixel, in which the first color component is missing, of an image-capturing sensor having a plurality of pixels which are arranged in a two-dimensional array and output color information corresponding to different color components, which are first~nth ($n \geq 2$) color components, each of the plurality of pixels outputting color information corresponding to a single color component, comprises: a similarity degree calculation unit that calculates each of similarity degrees along, at least, two directions relative to an interpolation target pixel to undergo interpolation processing based upon color information at a plurality of pixels selected from the interpolation target pixel and pixels near the interpolation target pixel, for each of two types of similarity degrees, which are a "different-color similarity degree containing a different-color similarity component obtained by using color information corresponding to different color components" and a "same-color similarity degree containing a same-color similarity component obtained by using color information corresponding to a single color component", by switching to either type of similarity degrees or switching weighting ratios to be used in weighted addition of the similarity degrees in correspondence to characteristics of an image over a local area containing the interpolation target pixel; a similarity judgment unit that makes a judgment on degrees of similarity along the individual directions based upon the similarity degrees; and an interpolation quantity calculation unit that calculates an interpolation quantity for the interpolation target pixel based upon results of the judgment made by the similarity judgment unit.

In this interpolation processing apparatus, it is preferred that the similarity degree calculation unit calculates the similarity degrees manifesting at the interpolation target pixel by incorporating similarity components calculated for pixels located around the interpolation target pixel as well as the similarity components calculated for the interpolation target pixel.

Also, it is preferred that the similarity degree calculation unit uses information related to color as characteristics of the image in the local area containing the interpolation target pixel. In this case, it is preferred that when the plurality of pixels that output color information corresponding to the first~nth ($n \geq 2$) color components different from each other output color information corresponding to the first~the third color components different from each other and the first color component achieves a higher spatial frequency compared to the second color component and the third color component, the similarity degree calculation unit calculates, as the different-color similarity degrees, similarity degrees each containing at least one of (1) a different-color similarity component obtained by using color information corresponding to the first color component and color information corresponding to the second color information, and (2) a different-color similarity component obtained by using color information corresponding to the first color component and color information corresponding to the third color component, and calculates, as the same-color similarity degrees, similarity degrees each containing at least one of (1) a same-color similarity component obtained by using color information corresponding to the first color component alone, (2) a same-color similarity component obtained by using color information corresponding to the second color component alone, and (3) the same-color similarity component obtained by using color information corresponding to the third color component alone. Or, it is preferred that the similarity degree calculation unit makes a decision as to whether the image over the local area is an achromatic image or a chromatic image in reference to the information related to color, and if the image in the local area is achromatic, the similarity degree calculation unit selects the different-color similarity degree as similarity degrees along a plurality of directions relative to the interpolation target pixel or sets a weighting coefficient for the different-color similarity degree to be used in weighted addition of the different-color similarity degree and the same-color similarity degree higher than a weighting coefficient for the same-color similarity degree, whereas if the image in the local area is chromatic, the similarity degree calculation unit selects the same-color similarity degree as similarity degrees along the plurality of directions relative to the interpolation target pixel or sets the weighting coefficient for the same-color similarity degree to be used in weighted addition of the different-color similarity degree and the same-color similarity degree higher than the weighting coefficient for the different-color similarity degree. Or, it is preferred that the similarity degree calculation unit uses the different-color similarity degree as the information related to color, and furthermore it is preferred that wherein if the different-color similarity degrees indicate pronounced similarity along at least, one direction, the similarity degree calculation unit determines the image over the local area to be an achromatic image, and the similarity degree calculation unit determines the image in the local area to be a chromatic image otherwise. Or, it is preferred that the similarity degree calculation unit uses, as the similarity degrees along a plurality of directions relative to the interpolation target pixel, similarity degrees along a plurality of directions calculated for pixel around the interpolation target pixel as well as for the interpolation target pixel.

Also, it is preferred that the similarity degree calculation unit calculates the different-color similarity degree by using color information from pixels present over shorter intervals compared to pixels that output the color information used to calculate the same-color similarity degree.

Also, it is preferred that the similarity degree calculation unit determines that essentially equal degrees of similarity manifest along a plurality of directions if differences of similarity degrees along the plurality of directions are smaller than a specific threshold value.

A recording medium has an interpolation processing program for performing interpolation to obtain color information corresponding to a first color component of a pixel, in which the first color component is missing, of an image-capturing sensor having a plurality of pixels which are arranged in a two-dimensional array and output color information corresponding to different color components, which are first~nth (n≧2) color components, each of the plurality of pixels outputting color information corresponding to a single color component. The interpolation processing program comprises: a similarity degree calculation step in which each of similarity degrees along, at least, two directions relative to an interpolation target pixel to undergo interpolation processing is calculated by using a "different-color similarity component obtained by using color information corresponding to different color components" calculated with a "similarity degree element constituted of color information from three or fewer pixels", based upon color information at a plurality of pixels selected from the interpolation target pixel and pixels near the interpolation target pixel; a similarity judgment step in which a judgment is made on degrees of similarity along the individual directions based upon the similarity degrees; and an interpolation quantity calculation step in which an interpolation quantity for the interpolation target pixel is calculated based upon results of the judgment made in the similarity judgment step.

A recording medium has an interpolation processing program for performing interpolation to obtain color information corresponding to a first color component of a pixel, in which the first color component is missing, of an image-capturing sensor having a plurality of pixels which are arranged in a two-dimensional array and output color information corresponding to different color components, which are first~nth (n≧3) color components, each of the plurality of pixels outputting color information corresponding to a single color component. The interpolation processing program comprises: a similarity degree calculation step in which each of similarity degrees along at least two directions relative to an interpolation target pixel to undergo interpolation processing is calculated by using color information corresponding to three or more different color components and a "similarity degree element constituted of color information from three or fewer pixels", based upon color information at a plurality of pixels selected from the interpolation target pixel and pixels near the interpolation target pixel; a similarity judgment step in which a judgment is made on degrees of similarity along the individual directions based upon the similarity degrees; and an interpolation quantity calculation step in which an interpolation quantity for the interpolation target pixel is calculated based upon results of the judgment made in the similarity judgment step.

A recording medium has an interpolation processing program for performing interpolation to obtain color information corresponding to a first color component of a pixel, in which the first color component is missing, of an image-capturing sensor having a plurality of pixels which are arranged in a two-dimensional array and output color information corresponding to different color components, which are first~nth (n≧3) color components, each of the plurality of pixels outputting color information corresponding to a single color component. The interpolation processing program comprises: a similarity degree calculation step in which each of similarity degrees along at least two directions relative to an interpolation target pixel to undergo interpolation processing is calculated by using color information corresponding to three or more different components and a "different-color similarity component obtained by using color information corresponding to two different color components", based upon color information at a plurality of pixels selected from the interpolation target pixel and pixels near the interpolation target pixel; similarity judgment step in which a judgment is made on degrees of similarity along the individual directions based upon the similarity degrees; and an interpolation quantity calculation step in which an interpolation quantity for the interpolation target pixel is calculated based upon results of the judgment made in the similarity judgment step.

A recording medium has an interpolation processing program for performing interpolation to obtain color information corresponding to a first color component of a pixel, in which the first color component is missing, of an image-capturing sensor having a plurality of pixels which are arranged in a two-dimensional array and output color information corresponding to different color components, which are first~nth (n≧3) color components, each of the plurality of pixels outputting color information corresponding to a single color component. The interpolation processing program comprises: a similarity degree calculation step in which each of similarity degrees along, at least, two directions relative to an interpolation target pixel to undergo interpolation processing is calculated based upon color information at a plurality of pixels selected from the interpolation target pixel and pixels near the interpolation target pixel, by calculating a "same-color similarity component obtained by using color information corresponding to a single color component" for each of three or more color components, by calculating a "different-color similarity component obtained by using color information corresponding to different color components" and by utilizing the similarity components in combination with each other; a similarity judgment step in which a judgment is made on degrees of similarity along the individual directions based upon the similarity degrees; and an interpolation quantity calculation step in which an interpolation quantity for the interpolation target pixel is calculated based upon results of the judgment made in the similarity judgment step.

A recording medium has an interpolation processing program for performing interpolation to obtain color information corresponding to a first color component of a pixel, in which the first color component is missing, of an image-capturing sensor having a plurality of pixels which are arranged in a two-dimensional array and output color information corresponding to different color components, which are first~nth (n≧3) color components, each of the plurality of pixels outputting color information corresponding to a single color component. The interpolation processing program comprises: a similarity degree calculation step in which each of similarity degrees along, at least, two directions relative to an interpolation target pixel to undergo interpolation processing is calculated based upon color information at a plurality of pixels selected from the interpolation target pixel and pixels near the interpolation target pixel, by calculating a "different-color similarity component obtained by using color information corresponding to different color components" for each of three or more color components, by calculating a "same-color similarity component obtained by using color information corresponding to a single color component" for each of two or more color components and by utilizing the similarity color components in combination with each other; a similarity judgment step in which a judgment is made on degrees of similarity along the individual directions based upon the similarity degrees; and an interpolation quantity calculation step in which an interpolation quantity for the interpolation target pixel is calculated based upon results of the judgment made in the similarity judgment step.

A recording medium has an interpolation processing program for performing interpolation to obtain color information corresponding to a first color component of a pixel, in which the first color component is missing, of an image-capturing sensor having a plurality of pixels which are arranged in a two-dimensional array and output color information corresponding to different color components, which are first~nth (n≧2) color components, each of the plurality of pixels outputting color information corresponding to a single color component. The interpolation processing program comprises: a similarity degree calculation step in which each of similarity degrees along, at least, two directions relative to an interpolation target pixel to undergo interpolation processing is calculated based upon color information at a plurality of pixels selected from the interpolation target pixel and pixels near the interpolation target pixel, by using a "different-color similarity component obtained by using color information corresponding to two different color components" and a "same-color similarity component obtained by using color information corresponding to a single color component calculated with a similarity degree element constituted of color information from two pixels"; a similarity judgment step in which a judgment is made on degrees of similarity along the individual directions based upon the similarity degrees; and an interpolation quantity calculation step in which an interpolation quantity for the interpolation target pixel is calculated based upon result of the judgment made in the similarity judgment step.

A recording medium has an interpolation processing program for performing interpolation to obtain color information corresponding to a first color component of a pixel, in which the first color component is missing, of an image-capturing sensor having a plurality of pixels which are arranged in a two-dimensional array and output color information corresponding to different color components, which are first~nth (n≧2) color components, each of the plurality of pixels outputting color information corresponding to a single color component. The interpolation processing program comprises a similarity degree calculation step in which each of similarity degrees along, at least, two directions relative to an interpolation target pixel to undergo interpolation processing is calculated based upon color information at a plurality of pixels selected from the interpolation target pixel and pixels near the interpolation target pixel, by calculating a "same-color similarity component obtained by using color information corresponding to a single color component calculated with is a similarity degree element constituted of color information from two pixels" for each of two or more color components, and by performing weighted addition of the same-color similarity components; a similarity judgment step in which a judgment is made on degrees of similarity along the individual directions based upon the similarity degrees; and an interpolation quantity calculation step in which an interpolation quantity for the interpolation target pixel is calculated based upon results of the judgment made in the similarity judgment step.

A recording medium has an interpolation processing program for performing interpolation to obtain color information corresponding to a first color component of a pixel, in which the first color component is missing, of an image-capturing sensor having a plurality of pixels which are arranged in a two-dimensional array and output color information corresponding to different color components, which are first~nth (n≧3) color components, each of the plurality of pixels outputting color information corresponding to a single color component. The interpolation processing program comprises: a similarity degree calculation step in which each of similarity degrees along, at least, two directions relative to an interpolation target pixel to undergo interpolation processing is calculated based upon color information at a plurality of pixels selected from the interpolation target pixel and pixels near the interpolation target pixel, by using a "different-color similarity component obtained by using color information corresponding to a color component different from the color component of the interpolation target pixel and the first color component and color information corresponding to the first color component"; a similarity judgment step in which a judgment is made on degrees of similarity along the individual directions based upon the similarity degrees; and an interpolation quantity calculation step in which an interpolation quantity for the interpolation target pixel is calculated based upon results of the judgment made in the similarity judgment step.

A recording medium has an interpolation processing program for performing interpolation to obtain color information corresponding to a first color component of a pixel, in which the first color component is missing, of an image-capturing sensor having a plurality of pixels which are arranged in a two-dimensional array and output color information corresponding to different color components, which are first~nth (n≧2) color components, each of the plurality of pixels outputting color information corresponding to a single color component. The interpolation processing program comprises: a similarity degree calculation step in which each of similarity degrees along, at least, two directions relative to an interpolation target pixel to undergo interpolation processing is calculated based upon color information at a plurality of pixels selected from the interpolation target pixel and pixels near the interpolation target pixel, for each of two types of similarity degrees, which are a "different-color similarity degree containing a different-color similarity component obtained by using color information corresponding to different color components" and a "same-color similarity degree containing a same-color similarity component obtained by using color information corresponding to a single color component", by switching to either type of similarity degrees or switching weighting ratios to be used in weighted addition of the similarity degrees in correspondence to characteristics of an image over a local area containing the interpolation target pixel; a similarity judgment step in which a judgment is made on degrees of similarity along the individual directions based upon the similarity degrees; and an interpolation quantity calculation step in which an interpolation quantity for the interpolation target pixel is calculated based upon results of the judgment made in the similarity judgment step.

BRIEF DESCRIPTION OF THE DRAWINGS

FIG. 2 shows color information at lattice points and interpolation quantities at vacancies;

FIGS. 5A~5F present color information used to calculate first through fifth similarity components;

FIG. 7 is a conceptual diagram of the color artifact reduction effect achieved by using the first~fifth similarity components;

FIGS. 8A and 8B present an example (part 1) in which color information in the surrounding area is used to calculate similarity components along the vertical direction;

FIGS. 9A and 9B present the example (part 2) in which color information in the surrounding area is used to calculate similarity components along the vertical direction;

FIG. 10 present the example (part 3) in which color information in the surrounding area is used to calculate similarity components along the vertical direction;

FIGS. 11A~11C illustrate the calculation of similarity components in black-and-white Nyquist stripes;

FIGS. 12A~12C illustrate the calculation of similarity components in cyan vertical stripes;

FIGS. 22A and 22B illustrate the structure of the image-capturing sensor;

FIG. 23 is a functional block diagram of the electronic camera corresponding to twelfth and thirteenth embodiments;

FIGS. 24A and 24B illustrate the arrays of image data color components in the twelfth and thirteenth embodiments;

FIGS. 26A and 26B illustrate methods of weighted addition of similarity components;

FIG. 27 is a detailed flow chart of the processing implemented to judge degrees of similarity;

FIGS. 28A and 28B illustrate the relationship between similarity degrees and similarity;

DESCRIPTION OF THE PREFERRED EMBODIMENTS

The following is a detailed explanation of the preferred embodiments of the present invention, given in reference to the drawings.

It is to be noted that an explanation is given on the embodiments on an example in which the interpolation processing apparatus according to the present invention is adopted in an electronic still camera. In addition, in the individual embodiments to be detailed later, pixels outputting green color information are referred to as lattice points and pixels each outputting either red color information or blue color information are referred to as green color vacancies. In other words, in the interpolation processing in the embodiments to be detailed later, interpolation quantities corresponding to the green color information at these vacancies are calculated. Furthermore, in the individual embodiments, similarity degrees along the vertical direction and the horizontal direction are calculated as the similarity degrees along a plurality of directions to be used in the interpolation processing.

Figure 1:
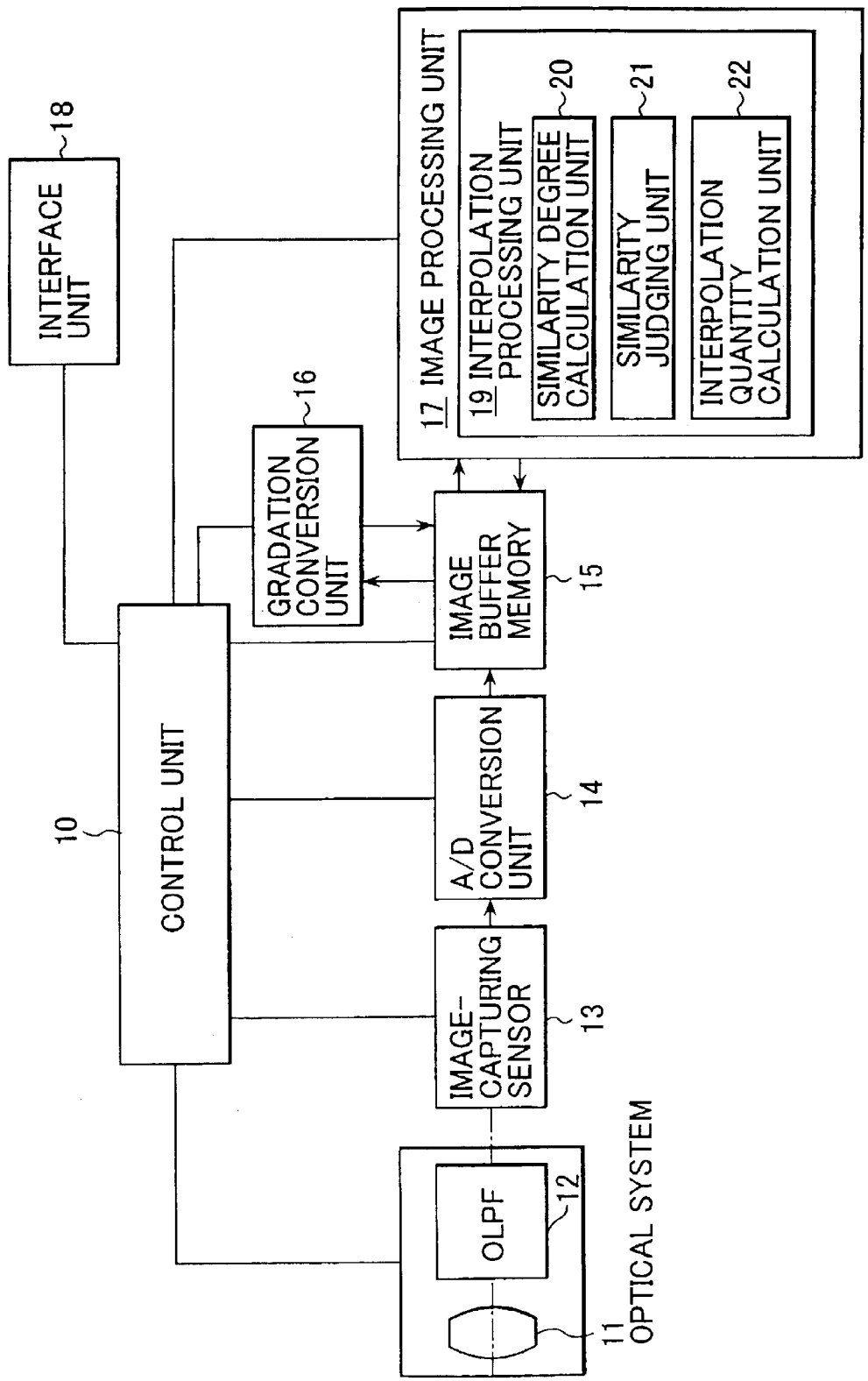
FIG. 1 is a functional block diagram of the electronic still camera corresponding to first through sixth embodiments.

FIG. 1 is a functional block diagram of the electronic still camera corresponding to the first through sixth embodiments.

In FIG. 1, a control unit 10 is connected with an optical system 11, an OLPF (optical low pass filter) 12, an image-capturing sensor 13, an A/D conversion unit 14, an image buffer memory 15, a gradation conversion unit 16, an image processing unit 17 and an interface unit 18.

The image processing unit 17 is provided with an interpolation processing unit 19 which comprises a similarity degree calculation unit 20, a similarity judging unit 21 and an interpolation quantity calculation unit 22.

An optical image obtained at the optical system 11 is filtered at the OLPF 12 and is provided to the image-capturing sensor 13.

It is to be noted that since the present invention is implemented on the premise that optical low pass filtering is implemented to a degree at which images such as black-and-white Nyquist stripes (see FIG. 6A) and the like do not dissipate, the OLPF 12 may be omitted and the optical image obtained at the optical system 11 may be directly provided to the image-capturing sensor 13.

The output of the image-capturing sensor 13 is connected to the A/D conversion unit 14, and the output of the A/D conversion unit 14 is connected to the image buffer memory 15. In addition, the output of the image buffer memory 15 is connected to the gradation conversion unit 16 and the image processing unit 17, with the output of the gradation conversion unit 16 and the output of the image processing unit 17 connected to the image buffer memory 15.

It is to be noted that in the individual embodiments to be detailed later, the image-capturing sensor 13 is constituted by providing color filters in three colors, i.e., R, G and B arranged in a Bayer array, as illustrated in FIG. 22A, with the image buffer memory 15 constituted of three areas corresponding to the three colors.

In addition, the area corresponding to green color in the image buffer memory 15 is constituted of an area in which green color image data generated at the A/D conversion unit 14 or green color image data resulting from gradation conversion (logarithm conversion, γ conversion and the like) performed at the gradation conversion unit 16 are stored as color information at lattice points and an area in which green color image data obtained through the interpolation processing to be explained later are stored as interpolation quantities for vacancies.

In order to facilitate the subsequent explanation, the position of each pixel at the image-capturing sensor 13 is expressed as a coordinate position in a coordinate system constituted of a "horizontal axis X with the rightward direction representing the positive direction" and a "vertical axis Y with the downward direction representing the positive direction". The color information at a lattice point is indicated as G(x,y) and the interpolation quantity at a vacancy is indicated as G'(x,y).

FIG. 2 shows the color information at the lattice points and the interpolation quantities at the vacancies in such a structure In the figure, X_max represents the X component maximum value and Y_max represents the Y component maximum value.

In addition, the coordinates of an interpolation target vacancy is indicated as [i,j] in the embodiments.

Figure 3:
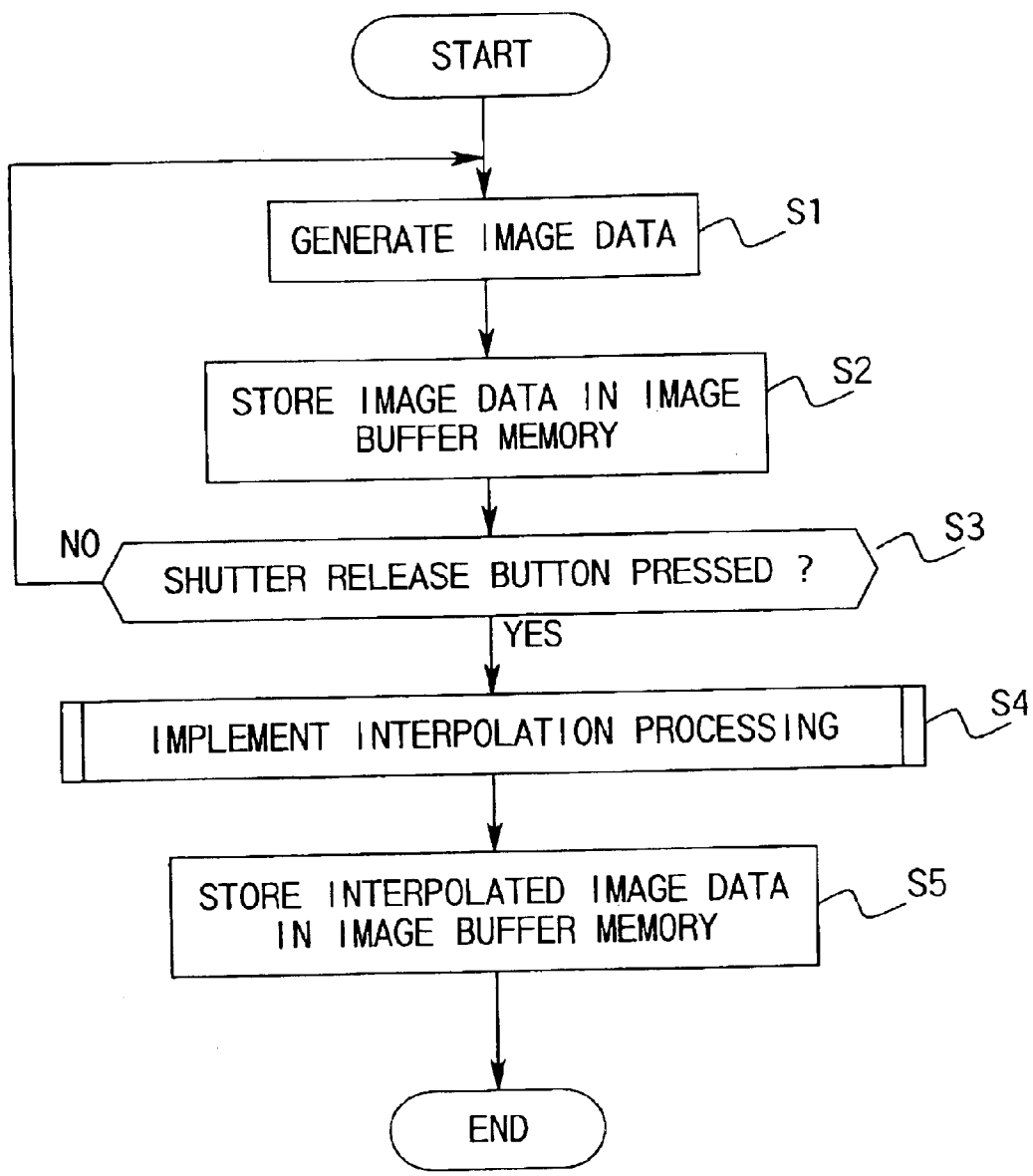
FIG. 3 is a flowchart of the operation performed in the electronic still camera.

FIG. 3 is a flowchart of the operation performed in the electronic still camera.

Figure 4:
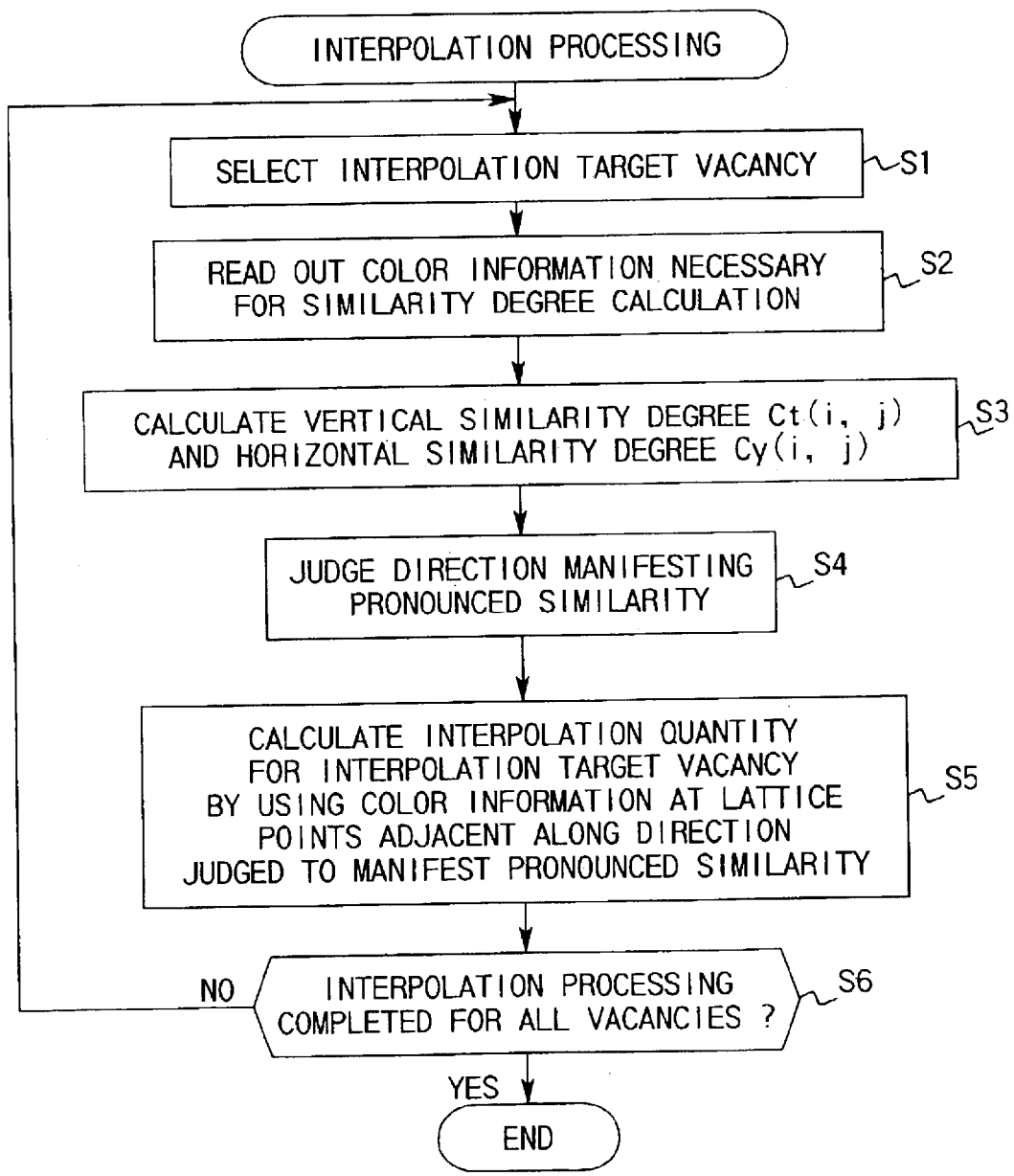
FIG. 4 is a flowchart of the interpolation processing operation performed in the first through fifth embodiments.

FIG. 4 is a flowchart of the interpolation processing operation achieved in the first through fifth embodiments.

FIGS. 5A~5F shows the color information used to calculate first~fifth similarity component (a plurality of types of similarity components) in the first through fifth embodiments.

It is to be noted that in FIGS. 5A~5F RB indicates "R or B" and that BR indicates "B or R." In other words, when RB represents R, BR represents B, whereas when RB represents B, BR represents R.

Now, in order to facilitate the explanation of the first through fifth embodiments, the method through which the similarity degree calculation unit 20 calculates the first through fifth similarity components (a plurality of types of similarity components) is explained. It is to be noted that in the following explanation, the color information at vacancies and lattice points is indicated as RB(i,j) and G(i,j−1) and so forth in correspondence to the individual coordinate positions.

First, a first similarity component $Ct^{(1)}(i,j)$ along the vertical direction and a first similarity component $Cy^{(1)}(i,j)$ along the horizontal direction of the interpolation target vacancy are calculated by using the following expressions t1 and y1, based upon the color information presented in FIG. 5A.

$$Ct^{(1)}(i,j)=a_1^{(1)}Ct^{(1\text{-}1)}(i,j)+a_2^{(1)}Ct^{(1\text{-}2)}(i,j) \quad \text{expression t1}$$

$$Cy^{(1)}(i,j)=b_1^{(1)}Cy^{(1\text{-}1)}(i,j)+b_2^{(1)}Cy^{(1\text{-}2)}(i,j) \quad \text{expression y1}$$

In expressions t1 and y1, $a_1^{(1)}$, $a_2^{(1)}$, $b_1^{(1)}$ and $b_2^{(1)}$ are all constants within a range of 0~1 satisfying $a_1^{(1)}+a_2^{(1)}=b_1^{(1)}+b_2^{(1)}=1$, and under normal circumstances, they are values that satisfy $a_1^{(1)}=b_1^{(1)}$ and $a_2^{(1)}=b_2^{(1)}$. It is recommended that they be set to satisfy $a_1^{(1)}=b_1^{(1)}=1$ and $a_2^{(1)}=b_2^{(1)}=0$ in the embodiments to be detailed later. It is to be noted that they may be values satisfying $a_1^{(1)}=b_1^{(1)}=0$ and $a_2^{(1)}=b_2^{(1)}=1$ or values satisfying $a_1^{(1)}=b_1^{(1)}=a_2^{(1)}=b_2^{(1)}=1/2$, instead.

In addition, in expressions t1 and y1, $Ct^{(1\text{-}1)}(i,j)$ and $Cy^{(1\text{-}1)}(i,j)$ are values respectively satisfying $$Ct^{(1\text{-}1)}(i,j)=t^{(1\text{-}1)}|G(i,j-1)-RB(i,j)|+(1-t^{(1\text{-}1)})|G(i,j+1)-RB(i,j)|$$

$$Cy^{(1\text{-}1)}(i,j)=y^{(1\text{-}1)}|G(i-1,j)-RB(i,j)|+(1-y^{(1\text{-}1)})|G(i+1,j)-RB(i,j)|,$$

with $t^{(1\text{-}1)}$ and $y^{(1\text{-}1)}$ each representing a constant within a range of 0~1.

For instance, when $t^{(1\text{-}1)}=y^{(1\text{-}1)}=1/2$, $$Ct^{(1\text{-}1)}(i,j)=(|G(i,j-1)-RB(i,j)|+|G(i,j+1)-RB(i,j)|)/2$$

$$Cy^{(1\text{-}1)}(i,j)=(|G(i-1,j)-RB(i,j)|+|G(i+1,j)-RB(i,j)|)/2.$$

Also, in expressions t1 and y1, $Ct^{(1\text{-}2)}(i,j)$ and $Cy^{(1\text{-}2)}(i,j)$ are values respectively satisfying $$Ct^{(1\text{-}2)}(i,j)=|(u^{(1\text{-}2)}G(i,j-1)+(1-u^{(1\text{-}2)})G(i,j+1))-RB(i,j)|$$

$$Cy^{(1\text{-}2)}(i,j)=|(v^{(1\text{-}2)}G(i-1,j)+(1-v^{(1\text{-}2)})G(i+1,j))-RB(i,j)|,$$

with $u^{(1\text{-}2)}$ and $v^{(1\text{-}2)}$ each representing a constant within a range of 0~1.

For instance, when $u^{(1\text{-}2)}=v^{(1\text{-}2)}=1/2$, $$Ct^{(1\text{-}2)}(i,j)=|(G(i,j-1)+G(i,j+1))/2-RB(i,j)|$$

$$Cy^{(1\text{-}2)}(i,j)=|(G(i-1,j)+G(i+1,j))/2-RB(i,j)|$$

It is to be noted that the first similarity component $Ct^{(1)}(i,j)$ along the vertical direction and the first similarity component $Cy^{(1)}(i,j)$ along the horizontal direction may be calculated through the following expressions t1-2 and y1-2 based upon the color information presented in FIG. 5B instead of the color information in FIG. 5A.

$$Ct^{(1)}(i,j)=a_1^{(1)}Ct^{(1\text{-}1)}(i,j)+a_2^{(1)}Ct^{(1\text{-}2)}(i,j)+a_3^{(1)}Ct^{(1\text{-}3)}(i,j) \quad \text{expression t1-2}$$

$$Cy^{(1)}(i,j)=b_1^{(1)}Cy^{(1\text{-}1)}(i,j)+b_2^{(1)}Cy^{(1\text{-}2)}(i,j)+b_3^{(1)}Cy^{(1\text{-}3)}(i,j) \quad \text{expressions y1-2}$$

In expressions t1-2 and y1-2, $a_1^{(1)}$, $a_2^{(1)}$, $a_3^{(1)}$, $b_1^{(1)}$, $b_2^{(1)}$ and $b_3^{(1)}$ all constants within a range of 0~1 that satisfy $a_1^{(1)}+a_2^{(1)}+a_3^{(1)}=b_1^{(1)}+b_2^{(1)}+b_3^{(1)}=1$, and under normal circumstances, they are values that satisfy $a_1^{(1)}=b_1^{(1)}$, $a_2^{(1)}=b_2^{(1)}$ and $a_3^{(1)}=b_3^{(1)}$.

In addition, in expressions t1-2 and y1-2, $Ct^{(1\text{-}1)}(i,j)$, $Cy^{(1\text{-}1)}(i,j)$, $Ct^{(1\text{-}2)}(i,j)$ and $Cy^{(1\text{-}2)}(i,j)$ are calculated in a manner similar to that in which the values are calculated through expressions t1 and y1 as explained earlier.

Furthermore, in expressions t1-2 and y1-2, $Ct^{(1\text{-}3)}(i,j)$ and $Cy^{(1\text{-}3)}(i,j)$ are values respectively satisfying $$Ct^{(1\text{-}3)}(i,j)=t^{(1\text{-}3)}|G(i,j-1)-RB(i,j-2)|+(1-t^{(1\text{-}3)})|G(i,j+1)-RB(i,j+2)|$$

$$Cy^{(1\text{-}3)}(i,j)=y^{(1\text{-}3)}|G(i-1,j)-RB(i-2,j)|+(1-y^{(1\text{-}3)})|G(i+1,j)-RB(i+2,j)|,$$

with $t^{(1\text{-}3)}$ and $y^{(1\text{-}3)}$ each representing a constant within a range of 0~1.

Next, a second similarity component $Ct^{(2)}(i,j)$ along the vertical direction and a second similarity component $Cy^{(2)}(i,j)$ along the horizontal direction of the interpolation target vacancy are calculated by using the following expressions t2 and y2, based upon the color information presented in FIG. 5C.

$$Ct^{(2)}(i,j)=a_1^{(2)}Ct^{(2-1)}(i,j)+a_2^{(2)}Ct^{(2-2)}(i,j) \quad \text{expression t2}$$

$$Cy^{(2)}(i,j)=b_1^{(2)}Cy^{(2-1)}(i,j)+b_2^{(2)}Cy^{(2-2)}(i,j) \quad \text{expression y2}$$

In expressions t2 and y2, $a_1^{(2)}$, $a_2^{(2)}$, $b_1^{(2)}$ and $b_2^{(2)}$ are each a constant within a range of 0~1 which satisfies $a_1^{(2)}+a_2^{(2)}=b_1^{(2)}+b_2^{(2)}=1$, and under normal circumstances, they are values that satisfy $a_1^{(2)}=b_1^{(2)}$ and $a_2^{(2)}=b_2^{(2)}$. It is recommended that they be set to satisfy $a_1^{(2)}=b_1^{(2)}=1$ and $a_2^{(2)}=b_2^{(2)}=0$ in the embodiments to be detailed later. It is to be noted that they may be values satisfying $a_1^{(2)}=b_1^{(2)}=0$ and $a_2^{(2)}=b_2^{(2)}=1$ or values satisfying $a_1^{(2)}=b_1^{(2)}=a_2^{(2)}=b_2^{(2)}=1/2$, instead.

In addition, in expressions t2 and y2, $Ct^{(2-1)}(i,j)$ $Cy^{(2-1)}(i,j)$ are values respectively satisfying $$Ct^{(2-1)}(i,j) = t_1^{(2-1)}|BR(i-1,j-1)-G(i-1,j)| +$$
$$t_2^{(2-1)}|BR(i-1,j+1)-G(i-1,j)| +$$
$$t_3^{(2-1)}|BR(i+1,j-1)-G(i+1,j)| +$$
$$t_4^{(2-1)}|BR(i+1,j+1)-G(i+1,j)|$$

$$Cy^{(2-1)}(i,j) = y_1^{(2-1)}|BR(i-1,j-1)-G(i,j-1)| +$$
$$y_2^{(2-1)}|BR(i-1,j+1)-G(i,j-1)| +$$
$$y_3^{(2-1)}|BR(i+1,j-1)-G(i,j+1)| +$$
$$y_4^{(2-1)}|BR(i+1,j+1)-G(i,j+1)|,$$

with $t_1^{(2-1)}$, $t_2^{(2-1)}$, $t_3^{(2-1)}$, $t_4^{(2-1)}$, $y_1^{(2-1)}$, $y_2^{(2-1)}$, $y_3^{(2-1)}$ and $y_4^{(2-1)}$ all representing constants within a range of 0~1, satisfying $t_1^{(2-1)}+t_2^{(2-1)}+t_3^{(2-1)}+t_4^{(2-1)}=y_1^{(2-1)}+y_2^{(2-1)}+y_3^{(2-1)}+y_4^{(2-1)}=1$.

For instance, when $t_1^{(2-1)}=t_2^{(2-1)}=t_3^{(2-1)}=t_4^{(2-1)}=y_1^{(2-1)}=y_2^{(2-1)}=y_3^{(2-1)}=y_4^{(2-1)}=1/4$, $$Ct^{(2-1)}(i,j) = |BR(i-1,j-1)-G(i-1,j)| +$$
$$|BR(i-1,j+1)-G(i-1,j)| +$$
$$|BR(i+1,j-1)-G(i+1,j)| +$$
$$|BR(i+1,j+1)-G(i+1,j)|/4$$

$$Cy^{(2-1)}(i,j) = |BR(i-1,j-1)-G(i,j-1)| +$$
$$|BR(i-1,j+1)-G(i,j-1)| +$$
$$|BR(i+1,j-1)-G(i,j+1)| +$$
$$|BR(i+1,j+1)-G(i,j+1)|/4.$$

Furthermore, in expressions t2 and y2, $Ct^{(2-2)}(i,j)$ $Cy^{(2-2)}(i,j)$ are values respectively satisfying $$Ct^{(2-2)}(i,j) = t^{(2-2)}|u_1^{(2-2)}RB(i-1,j-1) +$$
$$(1-u_1^{(2-2)})BR(i-1,j+1)-G(i-1,j)| +$$
$$(1-t^{(2-2)})|u_2^{(2-2)}RB(i+1,j-1) +$$
$$(1-u_2^{(2-2)})BR(i+1,j+1)-G(i+1,j)|$$

$$Cy^{(2-2)}(i,j) = y^{(2-2)}|v_1^{(2-2)}RB(i-1,j-1) +$$
$$(1-v_1^{(2-2)})BR(i+1,j-1)-G(i,j-1)| +$$
$$(1-y^{(2-2)})|v_2^{(2-2)}RB(i-1,j+1) +$$
$$(1-v_2^{(2-2)})BR(i+1,j+1)-G(i,j+1)|,$$

with $t^{(2-2)}$, $y^{(2-2)}$, $u_1^{(2-2)}$, $u_2^{(2-2)}$, $v_1^{(2-2)}$ and $v_2^{(2-2)}$ each representing a constant within a range of 0~1.

For instance, when $t^{(2-2)}=y^{(2-2)}=u_1^{(2-2)}=u_2^{(2-2)}=v_1^{(2-2)}=v_2^{(2-2)}=1/2$, $$Ct^{(2-2)}(i,j)=(|(BR(i-1,j-1)+BR(i-1,j+1))/2-G(i-1,j)|+|BR(i+1,j-1)+BR(i+1,j+1))/2-G(i+1,j)|)/2$$

$$Cy^{(2-2)}(i,j)=(|(BR(i-1,j-1)+BR(i+1,j-1))/2-G(i,j-1)|+|RB(i-1,j+1)+BR(i+1,j+1))/2-G(i,j+1)|)/2.$$

Next, a third similarity component $Ct^{(3)}(i,j)$ along the vertical direction and a third similarity component $Cy^{(3)}(i,j)$ along the horizontal direction of the interpolation target vacancy are calculated through the following expressions t3 and y3 based upon the color information presented in FIG. 5D.

$$Ct^{(3)}(i,j)=|G(i,j-1)-G(i,j+1)| \quad \text{expression t3}$$

$$Cy^{(3)}(i,j)=|G(i-1,j)-G(i+1,j)| \quad \text{expression y3}$$

A fourth similarity component $Ct^{(4)}(i,j)$ along the vertical direction and a fourth similarity component $Cy^{(4)}(i,j)$ along the horizontal direction of the interpolation target vacancy are calculated through the following expressions t4 and y4 based upon the color information presented in FIG. 5E.

$$Ct^{(4)}(i,j)=t^{(4)}|BR(i-1,j-1)-BR(i-1,j+1)|+(1-t^{(4)})|BR(i+1,j-1)-BR(i+1,j+1)| \quad \text{expression t4}$$

$$Cy^{(4)}(i,j)=y^{(4)}|BR(i-1,j-1)-BR(i+1,j-1)|+(1-y^{(4)})|BR(i-1,j+1)-BR(i+1,j+1)| \quad \text{expression y4}$$

In expressions t4 and y4, $t^{(4)}$ and $y^{(4)}$ each represent a constant within a range of 0~1.

For instance, when $t^{(4)}=y^{(4)}=1/2$, $$Ct^{(4)}(i,j)=(|BR(i-1,j-1)-BR(i-1,j+1)|+|BR(i+1,j-1)-BR(i+1,j+1)|)/2$$

$$Cy^{(4)}(i,j)=(|BR(i-1,j-1)-BR(i+1,j-1)|+|BR(i-1,j+1)-BR(i+1,j+1)|)/2.$$

A fifth similarity component $Ct^{(5)}(i,j)$ along the vertical direction and a fifth similarity component $Cy^{(5)}(i,j)$ along the horizontal direction of the interpolation target vacancy are calculated by using the following expressions t5 and y5, based upon the color information presented in FIG. 5F.

$$Ct^{(5)}(i,j)=a_1^{(5)}Ct^{(5-1)}(i,j)+a_2^{(5)}Ct^{(5-2)}(i,j) \quad \text{expression t5}$$

$$Cy^{(5)}(i,j)=b_1^{(5)}Cy^{(5-1)}(i,j)+b_2^{(5)}Cy^{(5-2)}(i,j) \quad \text{expression y5}$$

In expressions t5 and y5, $a_1^{(5)}$, $a_2^{(5)}$, $b_1^{(5)}$ and $b_2^{(5)}$ are each a constant within a range of 0~1 which satisfies $a_1^{(5)}+a_2^{(5)}=b_1^{(5)}+b_2^{(5)}=1$, and under normal circumstances, they are values that satisfy $a_1^{(5)}=b_1^{(5)}$ and $a_2^{(5)}=b_2^{(5)}$. It is recommended that $a_1^{(5)}=b_1^{(5)}=1$ and $a_2^{(5)}=b_2^{(5)}=0$ be satisfied in the embodiments to be detailed later. It is to be noted that they may be values satisfying $a_1^{(5)}=b_1^{(5)}=0$ and $a_2^{(5)}=b_2^{(5)}=1$ or values satisfying $a_1^{(5)}=b_1^{(5)}=a_1^{(5)}=b_2^{(5)}=1/2$, instead.

In addition, in expressions t5 and y5, $Ct^{(5-1)}(i,j)$ and $Cy^{(5-1)}(i,j)$ are values respectively satisfying $$Ct^{(5-1)}(i,j)=t^{(5-1)}|RB(i,j-2)-RB(i,j)|+(1-t^{(5-1)})|RB(i,j+2)-RB(i,j)|$$

$$Cy^{(5-1)}(i,j)=y^{(5-1)}|RB(i-2,j)-RB(i,j)|+(1-y^{(5-1)})|RB(i+2,j)-RB(i,j)|,$$

with $t^{(5-1)}$ and $y^{(5-1)}$ each representing a constant within a range of 0~1.

For instance, when $t^{(5-1)}=y^{(5-1)}=1/2$, $$Ct^{(5-1)}(i,j)=(|RB(i,j-2)-RB(i,j)|+|RB(i,j+2)-RB(i,j)|)/2$$

$$Cy^{(5-1)}(i,j)=(|RB(i-2,j)-RB(i,j)|+|RB(i+2,j)-RB(i,j)|)/2$$

Also, in expressions t5 and y5, $Ct^{(5-2)}(i,j)$ $Cy^{(5-2)}(i,j)$ are values respectively satisfying $$Ct^{(5-2)}(i,j)=|(u^{(5-2)}RB(i,j-2)+(1-u^{(5-2)})RB(i,j+2))-RB(i,j)|$$

$$Cy^{(5-2)}(i,j)=|(v^{(5-2)}RB(i-2,j)+(1-v^{(5-2)})RB(i-2,j))-RB(i,j)|,$$

with $u^{(5-2)}$ and $v^{(5-2)}$ each representing a constant within a range of 0~1.

For instance, when $u^{(5-2)}=v^{(5-2)}=1/2$, $$Ct^{(5-2)}(i,j)=|(RB(i,j-2)+RB(i,j+2))/2-RB(i,j)|$$

$$Cy^{(5-2)}(i,j)=|(RB(i-2,j)+RB(i+2,j))/2-RB(i,j)|$$

Figure 6A:
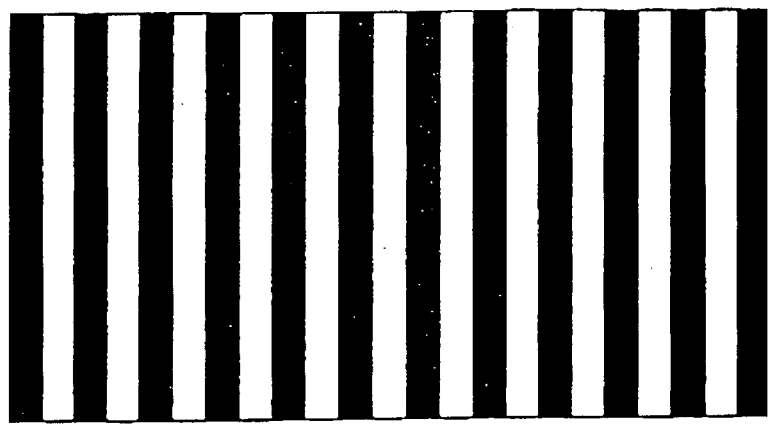
FIGS. 6A and 6B present examples of images.
Figure 6B:
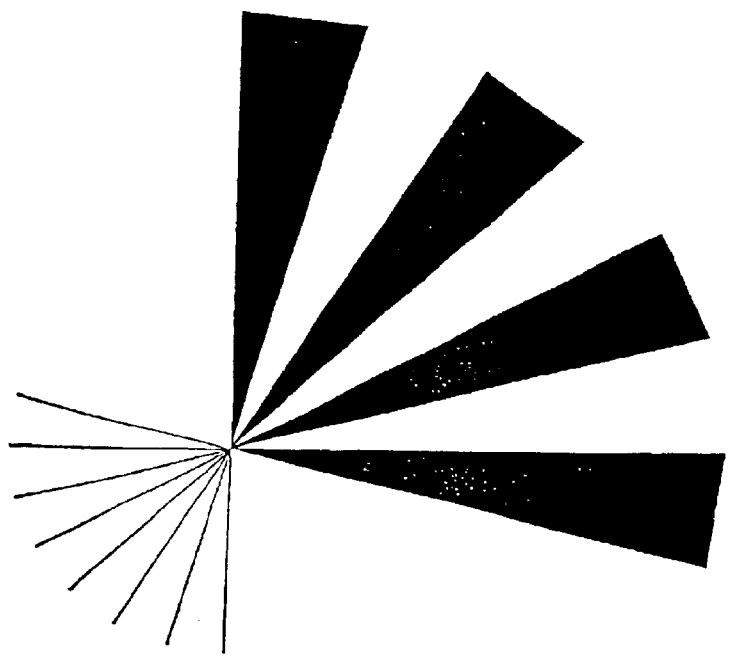

It has been learned through testing that the first similarity components are suited for judging similarity degrees in the black-and-white Nyquist stripes (an image of black-and-white vertical stripes of 1-pixel width) shown in FIG. 6A, the black-and-white stripe image with the stripes extending radially from the center (hereafter referred to as a "black-and-white Siemens' star") shown in FIG. 6B and characters.

In addition, through testing, the second similarity components have been determined to be effective in judging similarity degrees in black-and-white Nyquist stripes, a black-and-white Siemens' star and characters although they are less ideal than the first similarity components, and they have also been determined to be fairly effective in judging similarity degrees in a border area in a natural image such as a person or a leaf.

The third similarity components through the fifth similarity components, which are each calculated by using same-color information, have been confirmed to be effective in judging similarity in a border area in a natural image such as a person or leaf and also effective in judging similarity manifesting in a border area of different types of image areas within an image.

Thus, it has been learned that the relationships as conceptualized in FIG. 7 exist with regard to varying degrees of the color artifact reduction effect achieved through interpolation processing operations each performed by using one type of similarity components along the various types of similarity components (first through fifth similarity components).

It is to be noted that in FIG. 7, the "color artifact reduction effect achieved by using different color similarity components" refers to the color artifact reduction effect achieved by using similarity components obtained using color information corresponding to different color components and that the "color artifact reduction effect achieved by using same-color similarity components" refers to the color artifact reduction effect achieved by using similarity components obtained using color information corresponding to the same-color component.

In addition, the "distance between the interpolation target vacancy and lattice points near the interpolation target vacancy (hereafter referred to as "nearby lattice points")" is shorter than the "distance between the interpolation target vacancy and vacancies outputting color information corresponding to the same-color component as the color information output from the interpolation target vacancy" or the "distance between the interpolation target vacancy and vacancies outputting color information corresponding to a color component other than the color component that the interpolation target vacancy" in FIGS. 5D, 5E and 5F.

In other words, the nearby lattice points are located at positions which are closest to the interpolation target vacancy, and the third similarity components calculated by using the nearby lattice points achieve a higher degree of "color artifact reduction effect based upon same-color similarity components" compared to the fourth similarity components or the fifth similarity components.

As a result, the difference shown in FIG. 7 manifests in the degrees of the "color artifact reduction effect achieved with the same-color similarity components" realized by using the third similarity components through the fifth similarity components.

It is to be noted that while the individual types of similarity components (the first through fifth similarity components) are calculated using the color information presented in FIG. 5 in the embodiments to be detailed later, the following substitution maybe made for the various types of similarity components by using the color information at the vacancies and the lattice points in the surrounding areas shown in FIGS. 8 through 10 (the following explanation does not include a description of the method for calculating the various types of similarity components along the horizontal direction).

For instance, the first similarity component $Ct^{(1)}(i,j)$ in the vertical direction may be calculated by using the color information presented in FIG. 8A, through the following expression instead of expression t1 mentioned earlier.

$$Ct^{(1)}(i,j) = a_1^{(1)}(m_1^{(1)} \cdot Ct^{(1-1)}(i,j) + \qquad \text{expression t1-3}$$
$$m_2^{(1)} \cdot Ct^{(1-1)}(i-1, j-1) +$$
$$m_3^{(1)} \cdot Ct^{(1-1)}(i+1, j-1) +$$
$$m_4^{(1)} \cdot Ct^{(1-1)}(i-1, j+1) +$$
$$m_5^{(1)} \cdot Ct^{(1-1)}(i+1, j+1)) +$$
$$a_2^{(1)}(n_1^{(1)} \cdot Ct^{(1-2)}(i,j) +$$
$$n_2^{(1)} \cdot Ct^{(1-2)}(i-1, j-1) +$$
$$n_3^{(1)} \cdot Ct^{(1-2)}(i+1, j-1) +$$
$$n_4^{(1)} \cdot Ct^{(1-2)}(i-1, j+1) +$$
$$n_5^{(1)} \cdot Ct^{(1-2)}(i+1, j+1)$$

In expression t1-3, at least either $a_1^{(1)}$ or $a_2^{(1)}$ is a value other than 0, $m_1^{(1)}$ is a constant satisfying $0<m_1^{(1)}\leq 1$, $m_2^{(1)}$, $m_3^{(1)}$, $m_4^{(1)}$ and $m_5^{(1)}$ are constants within a range of 0~1 satisfying $m_1^{(1)}+m_2^{(1)}+m_3^{(1)}+m_4^{(1)}+m_5^{(1)}=1$, $n_1^{(1)}$ is a constant satisfying $0<n_1^{(1)}\leq 1$, and $n_2^{(1)}$, $n_3^{(1)}$, $n_4^{(1)}$ and $n_5^{(1)}$ are constants within a range of 0~1 satisfying $n_1^{(1)}+n_2^{(1)}+n_3^{(1)}+n_4^{(1)}+n_5^{(1)}=1$. When calculating $Ct^{(1-1)}(i,j)$, $Ct^{(1-1)}(i-1,j-1)$, $Ct^{(1-1)}(i+1,j-1)$, $Ct^{(1-1)}(i-1,j+1)$ and $Ct^{(1-1)}(i+1,j+1)$, different values may be used for the coefficient $u^{(1-1)}$ in the individual terms, and when calculating $Ct^{(1-2)}(i,j)$, $Ct^{(1-2)}(i-1,j-1)$, $Ct^{(1-2)}(i+1,j-1)$, $Ct^{(1-2)}(i-1,j+1)$ and $Ct^{(1-2)}(i+1,j+1)$, different values may be used for the coefficient $t^{(1-2)}$ in the individual terms.

In addition, the second similarity component $Ct^{(2)}(i,j)$ in the vertical direction may be calculated by using the color information presented in FIG. 8B, through the following expression instead of expression t2 mentioned earlier.

$$Ct^{(2)}(i,j) = a_1^{(2)}(m_1^{(2)} \cdot Ct^{(2-1)}(i,j) + \qquad \text{expression t2-2}$$
$$m_2^{(2)} \cdot Ct^{(2-1)}(i-1, j-1) +$$
$$m_3^{(2)} \cdot Ct^{(2-1)}(i+1, j-1) +$$
$$m_4^{(2)} \cdot Ct^{(2-1)}(i-1, j+1) +$$
$$m_5^{(2)} \cdot Ct^{(2-1)}(i+1, j+1)) +$$
$$a_2^{(2)}(n_1^{(2)} \cdot Ct^{(2-2)}(i,j) +$$

-continued $$n_2^{(2)} \cdot Ct^{(2-2)}(i-1, j-1) +$$
$$n_3^{(2)} \cdot Ct^{(2-2)}(i+1, j-1) +$$
$$n_4^{(2)} \cdot Ct^{(2-2)}(i-1, j+1) +$$
$$n_5^{(2)} \cdot Ct^{(2-2)}(i+1, j+1))$$

In expression t2-2, $m_1^{(2)}$ is a constant satisfying $0<m_1^{(2)} \leq 1$, $m_2^{(2)}$, $m_3^{(2)}$, $m_4^{(2)}$ and $m_5^{(2)}$ are constants within a range of 0~1 satisfying $m_1^{(2)}+m_2^{(2)}+m_3^{(2)}+m_4^{(2)}+m_5^{(2)}=1$, $n_1^{(2)}$ is a constant satisfying $0<n_1^{(2)} \leq 1$, and $n_2^{(2)}$, $n_3^{(2)}$, $n_4^{(2)}$ and $n_5^{(2)}$ are constants within a range of 0~1 satisfying $n_1^{(2)}+n_2^{(2)}+n_3^{(2)}+n_4^{(2)}+n_5^{(2)}=1$. When calculating $Ct^{(2-1)}(i,j)$, $Ct^{(2-1)}(i-1,j-1)$, $Ct^{(2-1)}(i+1,j-1)$, $Ct^{(2-1)}(i-1,j+1)$ and $Ct^{(2-1)}(i+1,j+1)$, different values may be used for the coefficient $u^{(2-1)}$ in the individual terms, and when calculating $Ct^{(2-2)}(i,j)$, $Ct^{(2-2)}(i-1,j-1)$, $Ct^{(2-2)}(i+1,j-1)$, $Ct^{(2-2)}(i-1,j+1)$ and $Ct^{(2-2)}(i+1,j+1)$, different values may be used for the coefficient $t^{(2-2)}$ in the individual terms.

The third similarity component $Ct^{(3)}(i,j)$ along the vertical direction may be calculated by using the color information presented in FIG. 9A and using the values $(Ct^{(3)}(i,j) \sim Ct^{(3)}(i+1,j+1))$ calculated through expression t3 mentioned before for substitution in the right side of the following expression $$Ct^{(3)}(i, j) = m_1^{(3)} Ct^{(3)}(i, j) +$$ 
$$m_2^{(3)} Ct^{(3)}(i-1, j-1) +$$
$$m_3^{(3)} Ct^{(3)}(i+1, j-1) +$$
$$m_4^{(3)} Ct^{(3)}(i-1, j+1) +$$
$$m_5^{(3)} Ct^{(3)}(i+1, j+1)$$

expression t3-2

In expression t3-2, $m_1^{(3)}$ is a constant satisfying $0<m_1^{(3)} \leq 1$, $m_2^{(3)}$, $m_3^{(3)}$, $m_4^{(3)}$ and $m_5^{(3)}$ are constants within a range of 0~1 satisfying $m_1^{(3)}+m_2^{(3)}+m_3^{(3)}+m_4^{(3)}+m_5^{(3)}=1$.

The fourth similarity component $Ct^{(4)}(i,j)$ along the vertical direction may be calculated by using the color information presented in FIG. 9B and using the values $(Ct^{(4)}(i,j) \sim Ct^{(4)}(i+1,j+1))$ calculated through expression t4 mentioned before for substitution in the right side of the following expression $$Ct^{(4)}(i, j) = m_1^{(4)} Ct^{(4)}(i, j) +$$
$$m_2^{(4)} Ct^{(4)}(i-1, j-1) +$$
$$m_3^{(4)} Ct^{(4)}(i+1, j-1) +$$
$$m_4^{(4)} Ct^{(4)}(i-1, j+1) +$$
$$m_5^{(3)} Ct^{(4)}(i+1, j+1)$$

expression t4-2

In expression t4-2, $m_1^{(4)}$ is a constant satisfying $0<m_1^{(4)} \leq 1$, $m_2^{(4)}$, $m_3^{(4)}$, $m_4^{(4)}$ and $m_5^{(4)}$ are constants within a range of 0~1 satisfying $m_1^{(4)}+m_2^{(4)}+m_3^{(4)}+m_4^{(4)}+m_5^{(4)}=1$. When calculating $Ct^{(4-1)}(i,j)$, $Ct^{(4-1)}(i-1,j-1)$, $Ct^{(4-1)}(i+1,j-1)$, $Ct^{(4-1)}(i-1,j+1)$ and $Ct^{(4-1)}(i+1,j+1)$, different values may be used for the coefficient $t^{(4)}$ in the individual terms.

Figure 10:
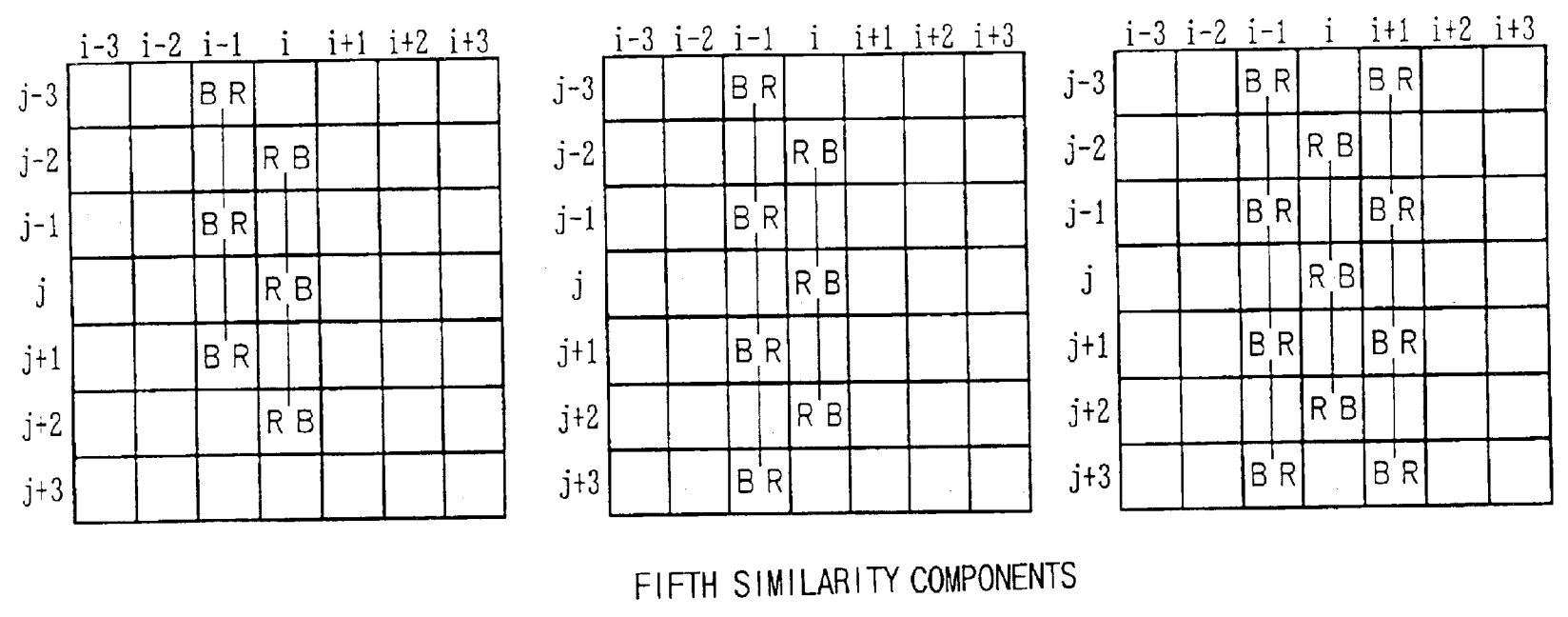

In addition, the fifth similarity component $Ct^{(5)}(i,j)$ in the horizontal direction may be calculated by using the color information presented in FIG. 10, through the following expression instead of expression t5 mentioned earlier.

$$Ct^{(5)}(i, j) = a_1^{(5)}(m_1^{(5)} \cdot Ct^{(5-1)}(i, j) +$$
$$m_2^{(5)} \cdot Ct^{(5-1)}(i-1, j-1) +$$
$$m_3^{(5)} \cdot Ct^{(5-1)}(i+1, j-1) +$$
$$m_4^{(5)} \cdot Ct^{(5-1)}(i-1, j+1) +$$
$$m_5^{(5)} \cdot Ct^{(5-1)}(i+1, j+1)) +$$
$$a_2^{(5)}(n_1^{(2)} \cdot Ct^{(5-2)}(i, j) +$$
$$n_2^{(5)} \cdot Ct^{(5-2)}(i-1, j-1) +$$
$$n_3^{(5)} \cdot Ct^{(5-2)}(i+1, j-1) +$$
$$n_4^{(5)} \cdot Ct^{(5-2)}(i-1, j+1) +$$
$$n_5^{(5)} \cdot Ct^{(5-2)}(i+1, j+1))$$

expression t5-2

In expression t5-2, $m_1^{(5)}$ is a constant satisfying $0<m_1^{(5)} \leq 1$, $m_2^{(5)}$, $m_3^{(5)}$, $m_4^{(5)}$ and $m_5^{(5)}$ are constants within a range of 0~1 satisfying $m_1^{(5)}+m_2^{(5)}+m_3^{(5)}+m_4^{(5)}+m_5^{(5)}=1$, $n_1^{(5)}$ is a constant satisfying $0<n_1^{(5)} \leq 1$, and $n_2^{(5)}$, $n_3^{(5)}$, $n_4^{(5)}$ and $n_5^{(5)}$ are constants within a range of 0~1 satisfying $n_1^{(5)}+n_2^{(5)}+n_3^{(5)}+n_4^{(5)}+n_5^{(5)}=1$. When calculating $Ct^{(5-1)}(i,j)$, $Ct^{(5-1)}(i-1,j-1)$, $Ct^{(5-1)}(i+1,j-1)$, $Ct^{(5-1)}(i-1,j+1)$ and $Ct^{(5-1)}(i+1,j+1)$, different values may be used for the coefficient $u^{(5-1)}$ in the individual terms, and when calculating $Ct^{(5-2)}(i,j)$, $Ct^{(5-2)}(i-1,j-1)$, $Ct^{(5-2)}(i+1,j-1)$, $Ct^{(5-2)}(i-1,j+1)$ and $Ct^{(5-2)}(i+1,j+1)$, different values may be used for the coefficient $t^{(5-2)}$ in the individual terms.

In addition, while the various types of similarity components (the first through fifth similarity components) are each calculated by using one or more of the absolute values of the differences, these similarity degrees may be calculated by using the value of the individual elements to the nth power, e.g., by squaring the absolute value of each of elements.

For purposes of simplification, the first through fifth embodiments are explained in reference to an example in which the results of calculation of the various types of similarity components (the first through fifth similarity components) for black-and-white Nyquist stripes are used and an example in which the results of calculation of various types of similarity components (the first through fifth similarity components) for cyan vertical stripes are used.

When the color information values (R, G, B) shown in FIG. 11A represent an original image of black-and-white Nyquist stripes with each set of color information values corresponding to a pixel and the color information values shown in FIG. 11B are stored in the image buffer memory 15, the results of the calculation of various types of similarity components (the first through fifth similarity components) for the black-and-white Nyquist stripes are as shown in FIG. 11C.

In addition, when the color information values (R, G, B) shown in FIG. 12A represent an original image of cyan vertical stripes with each set of color information values corresponding to a pixel and the color information values shown in FIG. 12B are stored in the image buffer memory 15, the results of the calculation of various styles of similarity components (the first through fifth similarity components) for the cyan vertical stripes are as shown in FIG. 12C.

In both FIGS. 11C and 12C, the first similarity component $Ct^{(1)}(i,j)$ along the vertical direction and the first similarity component $Cy^{(1)}(i,j)$ along the horizontal direction represents the results of calculation performed with $a_1^{(1)}=b_1^{(1)}=1$ and $a_2^{(1)}=b_2^{(1)}=0$ in expressions t1 and y1, the second similarity component $Ct^{(2)}(i,j)$ along the vertical direction and the second similarity component $Cy^{(2)}(i,j)$ along the horizontal direction represent the results of calculation performed with $a_1^{(1)}=b_1^{(1)}=1$ and $a_2^{(2)}=b_2^{(2)}=0$ in expressions t2 and y2, the third similarity component $Ct^{(3)}(i,j)$ along the vertical direction and the third similarity component $Cy^{(3)}(i,j)$ along the horizontal direction represent the results of calculation performed using expressions t3 and y3, the fourth similarity component $Ct^{(4)}(i,j)$ along the vertical direction and the fourth similarity component $Cy^{(4)}(i,j)$ along the horizontal direction represent the results of calculation performed by ensuring that $t^{(4)}$ and $y^{(4)}$ in expressions t4 and y4 satisfy $t^{(4)}=y^{(4)}=1/2$ and the fifth similarity component $Ct^{(5)}(i,j)$ along the vertical direction and the fifth similarity component $Cy^{(5)}(i,j)$ along the horizontal direction represents the results of calculation performed by ensuring that $a_1^{(5)}$, $a_2^{(5)}$, $b_1^{(5)}$ and $b_2^{(5)}$ in expressions t5 and y5 satisfy $a_1^{(5)}=b_1^{(5)}=1$ and $a_2^{(5)}=b_2^{(5)}=0$.

It is to be noted that when the difference between the calculated values along the two directions (the vertical direction and the horizontal direction) is large in the results of calculation of the various similarity components presented in FIGS. 11C and 12C, a higher similarity degree manifests along the direction with the value closer to "0".

Thus, the results presented in FIG. 11C indicate that the first similarity components and the second similarity components are effective for judging the similarity degree manifesting in the black-and-white Nyquist stripes.

The results presented in FIG. 12C indicate that the second similarity components through the fourth similarity components are effective for judging the similarity degree manifesting in the cyan vertical stripes.

(First Embodiment)

The following is an explanation of the operation achieved in the first embodiment, given in reference to FIGS. 1 through 5.

With the main power turned on, the optical image provided via the optical system 11 and the OLPF 12 is formed at the photoelectric conversion surface (not shown) of the image-capturing sensor 13, and a signal charge is generated through photoelectric conversion. In addition, the image-capturing sensor 13 scans the signal charge thus generated to create an image signal which is then provided to the A/D conversion unit 14.

The A/D conversion unit 14 implements A/D conversion on the image signal that has been provided and generates image data (FIG. 3, S1). It is to be noted that the image data in the first embodiment and the subsequent embodiments to be explained later are equivalent to the color information, each set of which corresponds to one of the pixels at the image-capturing sensor 13.

The image data thus generated are separated into three colors, i.e., R, G and B, and are stored in the areas inside the image buffer memory 15, each corresponding to one of the three colors (FIG. 3, S2). It is to be noted that as shown in FIG. 2, the green color image data (the color information at the lattice points) are stored in correspondence to the coordinates positions in the coordinate system mentioned earlier.

The processing described above (generation and storage of image data) is performed repeatedly in conformance to the timing control implemented by the control unit 10.

In addition, the control unit 10 makes a decision via the interface unit 18 as to whether or not a shutter release button (not shown) provided at the casing of the electronic still camera has been pressed (FIG. 3, S3).

If it is decided through this decision-making that the shutter release button has not been pressed, the control unit 10 instructs the processing for image data generation (FIG. 3, S1) and image data storage (FIG. 3, S2) to be performed repeatedly through the timing control mentioned above.

If, on the other hand, it is decided that the shutter release button has been pressed, the control unit 10 issues an instruction to the interpolation processing unit 19 inside the image processing unit 17 to execute the interpolation processing which is to be explained below (FIG. 3, S4).

Namely, in the first embodiment and the subsequent embodiments to be explained later, the image data stored in the image buffer memory 15 at the point in time at which the shutter release button is pressed become the interpolation processing target.

It is to be noted that the interpolation processing may be implemented on image data which have been read out from by the gradation conversion unit 16 to undergo gradation conversion (logarithm conversion, $\gamma$ conversion and the like) and then have been restored in the image buffer memory 15 after the gradation conversion, instead.

For interpolated image display, images that are being captured continually as well as an image captured at the point in time at which the shutter release button is pressed may undergo the interpolation processing and be displayed. Furthermore, the processing for image data generation (FIG. 3, S1) and image data storage (FIG. 3, S2) may be performed after the shutter release button is pressed, as long as the processing is timed to be executed, prior to the interpolation processing.

The image data (interpolation quantities at vacancies) resulting from the interpolation processing thus performed are stored in a specific area inside the image buffer memory 15 (FIG. 3, S5).

Next, in reference to FIG. 4, the interpolation processing operation achieved in the first embodiment is explained.

In response to an instruction for the execution of the interpolation processing issued by the control unit 10, the interpolation processing unit 19 selects an interpolation target vacancy to undergo the interpolation processing (FIG. 4, S1).

For instance, if "x+y=odd number" is true for a given set of coordinates (x,y) in FIG. 2, the coordinate point corresponds to a vacancy. Accordingly, in the first embodiment and the subsequent embodiments, the coordinates corresponding to the individual pixels are sequentially searched, from (1, 1) to (X_max, Y_max) and the coordinate points each having the sum of the X component and the Y component indicating an odd number are assigned as vacancies.

It is to be noted that if "x+y=odd number" is true for a given set of coordinates (x,y) in FIG. 2, the color output from the pixel at the coordinate point can be identified by ascertaining whether x is an even number or an odd number. For instance, if a pixel at which "x+y=odd number and x=even number" are true outputs red color information, a pixel at which "x+y=odd number and x=odd number" are true outputs blue color information.

Upon selecting an interpolation target vacancy as described above, the interpolation processing unit 19 reads out the color information shown in FIGS. 5A (or 5B), 5C and 5D from the image buffer memory 15. In other words, the interpolation processing unit 19 reads out the color information needed for the calculation of the similarity degrees manifesting at the interpolation target vacancy from the image buffer memory 15 (FIG. 4, S2). It is to be noted that color information thus read out is provided to the similarity calculation unit 20.

The similarity degree calculation unit 20 calculates a similarity degree $Ct(i,j)$ along the vertical direction and a similarity degree $Cy(i,j)$ along the horizontal direction by using the color information provided by the interpolation processing unit 19 (FIG. 4, S3).

Namely, the similarity degree calculation unit 20 calculates the first similarity component $Ct^{(1)}(i,j)$ along the vertical direction, the first similarity component $Cy^{(1)}(i,j)$ along the horizontal direction, the second similarity component $Ct^{(2)}(i,j)$ along the vertical direction, the second similarity component $Cy^{(2)}(i,j)$ along the horizontal direction, the third similarity component $Ct^{(3)}(i,j)$ along the vertical direction, and the third similarity component $Cy^{(3)}(i,j)$ along the horizontal direction respectively through expression t1 or expression t1-2), expression y1 (or expression y1-2), expression t2, expression y2, expression t3 and expression y3 by using the color information provided by the interpolation processing unit 19, and calculates the vertical similarity degree $Ct(i,j)$ and the horizontal similarity degree $Cy(i,j)$ through expressions 1 and 2 below.

$$Ct(i,j)=\alpha_1 Ct^{(1)}(i,j)+\beta_1 Ct^{(2)}(i,j)+\gamma_1 Ct^{(3)}(i,j) \quad \text{expression 1}$$

$$Cy(i,j)=\alpha_2 Cy^{(1)}(i,j)+\beta_2 Cy^{(2)}(i,j)+\gamma_2 Cy^{(3)}(i,j) \quad \text{expression 2}$$

In the expressions above, $\alpha_1$, $\alpha_2$, $\beta_1$, $\beta_2$, $\gamma_1$ and $\gamma_2$ each represent a positive value used as a weighting coefficient in the corresponding term. It is to be noted that in this example, conditions under which $\alpha_1=\alpha_2=\alpha$, $\beta_1=\beta_2=\beta$, $\gamma_1=\gamma_2=\gamma$ and $\alpha:\beta:\gamma=1:1:1$ are imposed. In addition, if the similarity degree $Ct(i,j)$ along the vertical direction and the similarity degree $Cy(i,j)$ along the horizontal direction are to be standardized based upon the color information, a condition under which $\alpha+\beta+\gamma=1$ may be imposed.

Next, the similarity judging unit 21 judges the direction manifesting a pronounced similarity, based upon the vertical similarity degree $Ct(i,j)$ and the horizontal similarity degree $Cy(i,j)$ calculated as described above (FIG. 4, S4).

For instance, relative to an arbitrary value T ("0" is used in this example), if $|Ct(i,j)-Cy(i,j)|>T$ and $Ct(i,j)<Cy(i,j)$ are true, the similarity judging unit 21 judges that a pronounced similarity manifests along the vertical direction. If $|Ct(i,j)-Cy(i,j)|>T$ and $Ct(i,j)>Cy(i,j)$ are true, the similarity judging unit 21 judges that a pronounced similarity manifest along the horizontal direction and if $|Ct(i,j)-Cy(i,j)|\leq T$ is true, the similarity judging unit 21 judges that equal similarity degrees manifest along the two directions.

Alternatively, the similarity judging unit 21 may judge that a pronounced similarity manifests along the vertical direction when "x>1" is true for in expression 28 in the seventh embodiment to be detailed later, that a pronounced similarity manifests along the horizontal direction if "x<−1" is true and that equal similarity degrees manifest along the two directions if "−1≦x≦1" is true.

When the direction manifesting a pronounced similarity is ascertained in this manner, the interpolation quantity calculation unit 22 calculates the interpolation quantity for the interpolation target vacancy by using the color information output from adjacent lattice points located along the direction judged to manifest a pronounced similarity (FIG. 4, S5).

The interpolation quantity calculation unit 22 calculates the interpolation quantity $G'(i,j)$ for the interpolation target vacancy through $G'(i,j)=(G(i,j-1)+G(i,j+1))/2$ if the vertical direction is judged to manifest a pronounced similarity, calculates the interpolation quantity $G'(i,j)$ for the interpolation target vacancy through $G'(i,j)=(G(i-1,j)+G(i+1,j))/2$ if the horizontal direction is judged to manifest pronounced similarity, and calculates $G'(i,j)$ through $G'(i,j)=\{G(i,j-1)+G(i,j+1)+G(i-1,j)+G(i-1,j)\}/4$ or $G'(i,j)=$median $\{G(i,j-1), G(i,j+1), G(i-1,j), G(i+1,j)\}$ if the two directions are judged to manifest equal similarity degrees.

"median { }" indicates a function for calculating the median of a plurality of elements, and if there are an even number of elements, the average of the two elements at the center is taken.

Alternatively, if the direction manifesting a pronounced similarity is ascertained based upon "x" in expression 28 in the seventh embodiment to be detailed later, the interpolation quantity calculation unit 22 may calculate the interpolation quantity for the interpolation target vacancy as in the seventh embodiment (see FIG. 15, S7~S11).

When the interpolation quantity for the interpolation target vacancy is calculated in this manner, the interpolation processing unit 19 makes a decision as to whether or not the interpolation processing for all the vacancies has been completed (FIG. 4, S6).

For instance, such decision-making may be achieved by making a decision as to whether or not "i>X_max−3" and "j>Y_max−3" are true for a given coordinate point (i,j) during the process of searching the coordinates corresponding to the individual pixels as described earlier.

It is to be noted that for an area of an image such as an edge over which the interpolation processing according to the present invention cannot be directly adopted, a virtual image may be generated by folding back the portion beyond the edge of the image (prior art technology) to implement interpolation processing on the image thus generated.

The interpolation processing unit 19 repeatedly implements the processing described above (the processing in FIG. 4, S1 and subsequent steps) until it is determined through the decision-making that the interpolation processing for all the vacancies has been completed.

As described above, in the first embodiment, the first similarity components, the second similarity components and the third similarity components along the vertical direction and the horizontal direction are calculated, and the similarity degrees for the interpolation target vacancy are calculated by performing weighted addition of the three types of similarity components.

As a result, even when the direction manifesting a pronounced similarity cannot be ascertained based upon the results of the calculation of the third similarity components alone, as in FIG. 11C for instance, the similarity degrees manifesting at the interpolation target vacancy can be calculated with a high degree of accuracy through effective use of the results of the calculation of the first similarity components and the second similarity components. In addition, even when an erroneous judgment may be made with regard to the direction manifesting a pronounced similarity based upon the results of the calculation of the first similarity components alone, as in FIG. 12C, the similarity degrees manifesting at the interpolation target vacancy can be calculated with a high degree of accuracy through the use of the results of the calculation of the second similarity components and the third similarity components.

Furthermore, the "color artifact reduction effect achieved by using different-color similarity components" and the "color artifact reduction effect achieved by using same-color similarity components" in FIG. 7 are realized in a well-balanced manner in the first embodiment.

Thus, the occurrence of color artifacts in various types of images including natural images as well as images with a high spatial frequency such as black-and-white Nyquist stripes can be reduced through the first embodiment. In other words, the first embodiment improves the interpolation processing accuracy with a high degree of reliability.

It is to be noted that while the conditions under which $\alpha_1=\alpha_2=\alpha$, $\beta_1=\beta_2=\beta$, $\gamma_1=\gamma_2=\gamma$ and $\alpha:\beta:\gamma=1:1:1$ are imposed with respect to expressions 1 and 2 in the first embodiment, $\alpha_1$, $\alpha_2$, $\beta_1$, $\beta_2$, $\gamma_1$ and $\gamma_2$ may be any values as long as the weighted addition of the first through third similarity components is achieved at a rate that can be regarded as equal.

In addition, while the vertical similarity degree Ct(i,j) and the horizontal similarity degree Cy(i,j) are calculated by performing weighted addition of the three types of similarity components obtained using the color information in FIGS. 5A (or 5B), 5C and 5D in the first embodiment, the vertical similarity degree Ct(i,j) and the horizontal similarity degree Cy(i,j) may be calculated through weighted addition of three types of similarity components obtained using the color information in FIGS. 5A (or 5B) and 5C and the color information in any one of FIGS. 5D~5F, instead.

(Second Embodiment)

The following is an explanation of the operation achieved in the second embodiment.

Since the second embodiment is characterized in the method through which the vertical similarity degree Ct(i,j) and the horizontal similarity degree Cy(i,j) are calculated (corresponds to FIG. 4, S2 and S3) and the other aspects of the operation achieved therein are similar to those in the first embodiment, their explanation is omitted. In other words, the operation corresponding to FIG. 4, S2 and S3 is explained below.

The interpolation processing unit 19 reads out the color information in FIGS. 5A (or 5B) and 5C (corresponds to FIG. 4, S2) and provides the color information to the similarity degree calculation unit 20.

The similarity degree calculation unit 20 calculates the first similarity component $Ct^{(1)}(i,j)$ along the vertical direction, the first similarity component $Cy^{1}(i,j)$ along the horizontal direction, the second similarity component $Ct^{(2)}(i,j)$ along the vertical direction and the second similarity component $Cy^{(2)}(i,j)$ along the horizontal direction respectively through expression t1 (or expression t1-2), expression y1 (or expression y1-2), expression t2 and expression y2 by using the color information thus provided, and calculates the vertical similarity degree Ct(i,j) and the horizontal similarity degree Cy(i,j) through expressions 3 and 4 below (corresponds to FIG. 4, S3).

$$Ct(i,j)=\alpha_1 Ct^{(1)}(i,j)+\beta_1 Ct^{(2)}(i,j) \quad \text{expression 3}$$

$$Cy(i,j)=\alpha_2 Cy^{(1)}(i,j)+\beta_2 Cy^{(2)}(i,j) \quad \text{expression 4}$$

In the expressions above, $\alpha_1$, $\alpha_2$, $\beta_1$ and $\beta_2$, each represent a positive value used as a weighting coefficient in each corresponding term. It is to be noted that in is this example, conditions under which $\alpha_1=\alpha_2=\alpha$, $\beta_1=\beta_2=\beta$ and $\alpha:\beta=1:1$ are imposed. In addition, if the similarity degree Ct(i,j) along the vertical direction and the similarity degree Cy(i,j) along the horizontal direction are to be standardized based upon the color information, a condition under which $\alpha+\beta=1$ may be imposed.

In other words, in the second embodiment, the similarity degrees manifesting at the interpolation target vacancy are calculated through weighted addition of the two types of similarity components, i.e., the first similarity components and the second similarity components along the vertical direction and the horizontal direction which have been calculated.

Thus, similarity degrees manifesting at the interpolation target vacancy in, for instance, black-and-white Nyquist stripes can be calculated with a high degree of accuracy through effective use of the results of the calculation of the first similarity components and the second similarity components, as shown in FIG. 11C.

In addition, the "color artifact reduction effect achieved by using different-color similarity components" in FIG. 7 is realized through the second embodiment.

Consequently, the occurrence of color artifacts in images with a high spatial frequency such as black-and-white Nyquist stripes can be reduced in the second embodiment. At the same time, although not as effective as the first embodiment, the "color artifact reduction effect achieved by using same-color similarity components" in FIG. 7 is achieved through the use of the second similarity components, so that the occurrence of the color artifacts in various types of images including natural images is reduced. Thus, the interpolation processing accuracy is improved with a high degree of reliability in the second embodiment.

It is to be noted that while the conditions under which $\alpha_1=\alpha_2=\alpha$, $\beta_1=\beta_2=\beta$, $\alpha:\beta=1:1$ are imposed in expressions 3 and 4 in the second embodiment, $\alpha_1$, $\alpha_2$, $\beta_1$ and $\beta_2$ may be any values as long as the weighted addition of the first and second similarity components is achieved at a rate that can be regarded as equal.

(Third Embodiment)

The following is an explanation of the operation achieved in the third embodiment.

Since the third embodiment is characterized in the method through which the vertical similarity degree Ct(i,j) and the horizontal similarity degree Cy(i,j) are calculated (corresponds to FIG. 4, S2 and S3) and the other aspects of the operation achieved therein are similar to those in the first embodiment, their explanation is omitted. In other words, the operation corresponding to FIG. 4, S2 and S3 is explained below.

The interpolation processing unit 19 reads out the color information in FIGS. 5C and 5D (corresponds to FIG. 4, S2) and provides the color information to the similarity degree calculation unit 20.

The similarity degree calculation unit 20 calculates the second similarity component $Ct^{(2)}(i,j)$ along the vertical direction with, the second similarity component $Cy^{(2)}(i,j)$ along the horizontal direction, the third similarity component $Ct^{(3)}(i,j)$ along the vertical direction and the third similarity component $Cy^{(3)}(i,j)$ along the horizontal direction through expression t2, expression y2, expression t3 and expression y3 by using the color information thus provided, and calculates the vertical similarity degree Ct(i,j) and the horizontal similarity degree Cy(i,j) through expressions 5 and 6 below (corresponds to FIG. 4, S3).

$$Ct(i,j)=\beta_1 Ct^{(2)}(i,j)+\gamma_1 Ct^{(3)}(i,j) \quad \text{expression 5}$$

$$Cy(i,j)=\beta_2 Cy^{(2)}(i,j)+\gamma_2 Cy^{(3)}(i,j) \quad \text{expression 6}$$

In the expressions above $\beta_1$, $\beta_2$, $\gamma_1$ and $\gamma_2$ each represent a positive value used as a weighting coefficient in the corresponding term. It is to be noted that in this example, conditions under which $\beta_1=\beta_2=\beta$, $\gamma_1=\gamma_2=\gamma$ and $\beta:\gamma=1:1$ are imposed. In addition, if the similarity degree Ct(i,j) along the vertical direction and the similarity degree Cy(i,j) along the horizontal direction are to be standardized based upon the color information, a condition under which $\beta+\alpha=1$ may be imposed.

In other words, in the third embodiment, the similarity degrees manifesting at the interpolation target vacancy are calculated through weighted addition of the two types of similarity components, i.e., the second similarity components and the third similarity components along the vertical direction and the horizontal direction that have been calculated.

Thus, similarity degrees manifesting at the interpolation target vacancy in, for instance, cyan vertical stripes can be calculated with a high degree of accuracy through the use of the results of the calculation of the second similarity components and the third similarity components, as shown in FIG. 12C.

In addition, the "color artifact reduction effect achieved by using same-color similarity components" in FIG. 7 is realized through the third embodiment.

Consequently, the occurrence of color artifacts in various types of images including natural images can be reduced through the third embodiment. At the same time, although not as effective as the first embodiment, it achieves a reduction in the occurrence of color artifacts in images with a high spatial frequency such as black-and-white Nyquist stripes through the "color artifact reduction effect achieved by using different color similarity components" in FIG. 7 realized by using the second similarity components. In short, the third embodiment improves the interpolation processing accuracy with a high degree of reliability.

It is to be noted that while the conditions under which $\beta_1=\beta_2=\beta$, $\gamma_1=\gamma_2=\gamma$ and $\beta:\gamma=1:1$ are imposed with respect to expressions 5 and 6 in the third embodiment, $\beta_1$, $\beta_2$, $\gamma_1$ and $\gamma_2$ may be any values as long as the weighted addition of the second and third similarity components is achieved at a rate that can be regarded as equal to each other.

In addition, while the vertical similarity degree Ct(i,j) and the horizontal similarity degree Cy(i,j) are calculated by performing weighted addition of the two similarity components obtained using the color information in FIGS. 5C and 5D in the third embodiment, the vertical similarity degree Ct(i,j) and the horizontal similarity degree Cy(i,j) may be calculated through weighted addition of at least two types of similarity components obtained using the color information in FIG. 5C and the color information in at least one of FIGS. 5D~5F instead.

(Fourth Embodiment)

The following is an explanation of the operation achieved in the fourth embodiment.

Since the fourth embodiment is characterized in the method through which the vertical similarity degree Ct(i,j) and the horizontal similarity degree Cy(i,j) are calculated (corresponds to FIG. 4, S2 and S3) and the other aspects of the operation achieved therein are similar to those in the first embodiment, their explanation is omitted. In other words, the operation corresponding to FIG. 4, S2 and S3 is explained below.

The interpolation processing unit 19 reads out the color information in FIGS. 5a (or 5B) and 5D (corresponds to FIG. 4, S2) and provides the color information to the similarity degree calculation unit 20.

The similarity degree calculation unit 20 calculates the first similarity component $Ct^{(1)}(i,j)$ along the vertical direction with, the first similarity component $Cy^{(1)}(i,j)$ along the horizontal direction, the third similarity component $Ct^{(3)}(i,j)$ along the vertical direction and the third similarity component $Cy^{(3)}(i,j)$ along the horizontal direction respectively through expression t1 (or expression t1-2) in which $a^{(1)}\neq 0$ is true, expression y1 (or expression y1-2) in which $b^{(1)}\neq 0$ is true, expression t3 and expression y3 by using the color information thus provided, and calculates the vertical similarity degree Ct(i,j) and the horizontal similarity degree Cy(i,j) through expressions 7 and 8 below (corresponds to FIG. 4, S3).

$$Ct(i,j)=\alpha_1 Ct^{(1)}(i,j)+\gamma_1 Ct^{(3)}(i,j) \quad \text{expression 7}$$

$$Cy(i,j)=\alpha_2 Cy^{(1)}(i,j)+\gamma_2 Cy^{(3)}(i,j) \quad \text{expression 8}$$

In the expressions above $\alpha_1$, $\alpha_2$, $\gamma_1$ and $\gamma_2$ each represent a positive value used as a weighting coefficient in the corresponding term. It is to be noted that in this example, conditions under which $\alpha_1=\alpha_2=\alpha$, $\gamma_1=\gamma_2=\gamma$, and $\alpha:\gamma=1:1$ are imposed. In addition, if the similarity degree Ct(i,j) along the vertical direction and the similarity degree Cy(i,j) along the horizontal direction are to be standardized based upon the color information, a condition under which $\alpha+\gamma=1$ may be imposed.

Namely, in the fourth embodiment, since the first similarity components $Ct^{(1)}(i,j)$ along the vertical direction is calculated through a expression t1 (or expression t1-2) with respect to which $a_1^{(1)}\neq 0$ is true, $$Ct^{(1-1)}(i,j)=t^{(1-1)}|G(i,j-1)-RB(i,j)|+(1-t^{(1-1)})|G(i+1,j)-RB(i,j)|$$

is incorporated in the vertical similarity degree Ct(i,j), and since the first similarity component $Cy^{(1)}(i,j)$ along the horizontal direction is calculated through expression y1 (or expression y1-2) with respect to which $b_1^{(1)}\neq 0$ is true, $$Cy^{(1-1)}(i,j)=y^{(1-1)}|G(i-1,j)-RB(i,j)|+(1-y^{(1-1)})|G(i+1,j)-RB(i,j)|$$

is incorporated in the horizontal similarity degree Cy(i,j). It is to be noted that $t^{(1-1)}$ and $y^{(1-1)}$ are constants within a range of 0~1.

As a result, the fourth embodiment eliminates the "problem of expansion in the range over which color artifacts occur" which is not addressed in U.S. Pat. No. 5,652,621, and, at the same time, similarity degrees manifesting at the interpolation target vacancy can be calculated with accuracy.

In addition, the "color artifact reduction effect achieved by using different-color similarity components" and the "color artifact reduction effect achieved by using same-color similarity components" in FIG. 7 are both realized through the fourth embodiment.

Consequently, although not as effective as the first embodiment, the occurrence of color artifact in various types of images including images with a high spatial frequency such as black-and-white Nyquist stripes and natural images can be reduced through the fourth embodiment. In short, the fourth embodiment achieves an improvement in the interpolation processing accuracy with a high degree of reliability.

It is to be noted that while the conditions under which $\alpha_1=\alpha_2=\alpha$, $\gamma_1=\gamma_2=\gamma$ and $\alpha:\gamma=1:1$ are imposed with respect to expressions 7 and 6 in the fourth embodiment, $\alpha_1$, $\alpha_2$, $\gamma_1$ and $\gamma_2$ may be any values as long as the weighted addition of the first and third similarity components is achieved at a rate that can be regarded as equal to each other.

In addition, while the vertical similarity degree Ct(i,j) and the horizontal similarity degree Cy(i,j) are calculated by performing weighted addition of the two similarity components obtained using the color information in FIGS. 5A (or 5B) and 5D in the fourth embodiment, the vertical similarity degree Ct(i,j) and the horizontal similarity degree Cy(i,j) may be calculated through weighted addition of at least two types of similarity components obtained using the color information in FIG. 5A (or 5B) and the color information in at least one of FIGS. 5D~5F, instead.

(Fifth Embodiment)

The following is an explanation of the operation achieved in the fifth embodiment.

Since the fifth embodiment is characterized in the method through which the vertical similarity degree Ct(i,j) and the horizontal similarity degree Cy(i,j) are calculated (corresponds to FIG. 4, S2 and S3 and the other aspects of the operation achieved therein are similar to those in the first embodiment, their explanation is omitted. In other words, the operation corresponding to FIG. 4, S2 and S3 is explained below.

The interpolation processing unit 19 reads out the color information in FIGS. 5A (or 5B), 5C, 5D, 5E and 5F (corresponds to FIG. 4, S2) and provides the color information to the similarity degree calculation unit 20.

The similarity degree calculation unit 20 calculates the first similarity component $Ct^{(1)}(i,j)$ along the vertical direction, the first similarity component $Cy^{(1)}(i,j)$ along the horizontal direction, the second similarity component $Ct^{(2)}(i,j)$ along the vertical direction, the second similarity component $Cy^{(2)}(i,j)$ along the horizontal direction, the third similarity component $Ct^{(3)}(i,j)$ along the vertical direction, the third similarity component $Cy^{(3)}(i,j)$ along the horizontal direction, the fourth similarity component $Ct^{(4)}(i,j)$ along the vertical direction, the fourth similarity component $Cy^{(4)}(i,j)$ along the horizontal direction, the fifth similarity component $Ct^{(5)}(i,j)$ along the vertical direction and the fifth similarity component $Cy^{(5)}(i,j)$ along the horizontal direction respectively through expression t1 or expression t1-2), expression y1 (or expression y1-2), expression t2, expression y2, expression t3, expression y3, expression t4, expression y4, expression t5 and expression y5, by using the color information thus provided, and calculates the vertical similarity degree $Ct(i,j)$ and the horizontal similarity degree $Cy(i,j)$ through expression 9 and 10 below (corresponds to FIG. 4, S3).

$$Ct(i,j) = \alpha_1 Ct^{(1)}(i,j) + \beta_1 Ct^{(2)}(i,j) + \gamma_1 Ct^{(3)}(i,j) + \delta_1 Ct^{(4)}(i,j) + \epsilon_1 Ct^{(5)}(i,j) \quad \text{expression 9}$$

$$Cy(i,j) = \alpha_2 Cy^{(1)}(i,j) + \beta_2 Cy^{(2)}(i,j) + \gamma_2 Cy^{(3)}(i,j) + \delta_2 Cy^{(4)}(i,j) + \epsilon_2 Cy^{(5)}(i,j) \quad \text{expression 10}$$

In the expressions above, $\alpha_1$, $\alpha_2$, $\gamma_1$, $\gamma_2$, $\delta_1$, $\delta_2$, $\epsilon_1$ and $\epsilon_2$ each represent a positive value used as a weighting coefficient in the corresponding term. It is to be noted that in this example, conditions under which $\alpha_1=\alpha_2=\alpha$, $\beta_1=\beta_2=\beta$, $\gamma_1=\gamma_2=\gamma$, $\delta_1=\delta_2=\delta$, $\epsilon_1=\epsilon_2=\epsilon$ and $\alpha:\beta:\gamma:\delta:\epsilon=4:4:2:1:1$ are imposed. In addition, if the similarity degree $Ct(i,j)$ along the vertical direction and the similarity degree $Cy(i,j)$ along the horizontal direction are to be standardized based upon the color information, a condition under which $\alpha+\beta+\gamma+\delta+\epsilon=1$ may be imposed.

As described above, in the fifth embodiment, the first through fifth similarity components along the vertical direction and the horizontal direction are calculated, and the similarity degrees for the interpolation target vacancy are calculated by performing weighted addition of the five types of similarity components.

As a result, even when the direction manifesting a pronounced similarity cannot be ascertained based upon the results of the calculation of the third through fifth similarity components alone, as in FIG. 11C, for instance, the similarity degrees manifesting at the interpolation target vacancy can be calculated with a high degree of accuracy through effective use of the results of the calculation of the first similarity components and the second similarity components in the fifth embodiment. In addition, even when an erroneous judgment may be made with regard to the direction manifesting a pronounced similarity based upon the results of the calculation of the first similarity components alone, as in FIG. 12C, the similarity degrees manifesting at the interpolation target vacancy can be calculated with a high degree of accuracy through the use of the results of the calculation of the second through fourth similarity components.

Furthermore, as shown in FIG. 12C, since the red color component is not contained in cyan, the directionality cannot be ascertained by using the fifth similarity components among the same-color similarity components. However, similarity degrees manifesting at the interpolation target vacancy can be calculated with accuracy through effective use of the results of the calculation of the third similarity components and the fourth similarity components.

It is to be noted that the conditions imposed with respect to expressions 9 and 10 $\alpha_1=\alpha_2=\alpha$, $\beta_1=\beta_2=\beta$, $\gamma_1=\gamma_2=\gamma$, $\delta_1=\delta_2=\delta$, $\epsilon_1=\epsilon_2=\epsilon$ and $\alpha:\beta:\gamma:\delta:\epsilon=4:4:2:1:1$ are conditions under which "$\alpha:\beta:(\gamma:\delta:\epsilon)=1:1:1$" and "$(\gamma+\delta+\epsilon)=2:1:1$" are satisfied at the same time.

By satisfying "$\alpha:\beta:(\gamma+\delta+\epsilon)=1:1:1$" both the "color artifact reduction effect achieved by using different-color similarity components" and the "color artifact reduction effect achieved by using same-color similarity components" in FIG. 7 are achieved in a well-balanced manner at the same rate as in the first embodiment.

Furthermore, satisfying "$\gamma:\delta:\epsilon=2:1:1$" means that the third similarity components having a greater "color artifact reduction effect achieved by same-color similarity components" compared to the fourth similarity components and the fifth similarity components are utilized effectively.

Consequently, through the fifth embodiment, the occurrence of color artifacts in various types of images including natural images as well as images with a higher spatial frequency such as black-and-white Nyquist stripes can be reduced. In other words, the fifth embodiment improves the interpolation processing accuracy with a high degree of reliability.

Moreover, since the fourth similarity component and the fifth similarity components which are not calculated in the first embodiment are calculated in the fifth embodiment, the same-color similarity components are calculated with the third through fifth similarity components complementing each other even in the case of an image in which a given color component is not present, an improvement over the first embodiment is achieved with regard to the accuracy with which the interpolation quantity for the interpolation target vacancy is calculated.

As in the first embodiment, the direction manifesting a pronounced similarity can be ascertained in the fifth embodiment when $$|Ct(i,j) - Cy(i,j)| > T$$

is true with regard to an arbitrary value T.

When $\alpha_1=\alpha_2=\alpha$, $\beta_1=\beta_2=\beta$, $\gamma_1=\gamma_2=\gamma$, $\delta_1=\delta_2=\delta$ and $\epsilon_1\epsilon_2=\epsilon$ in expressions 9 and 10.

$$|Ct(i,j) - Cy(i,j)| = |\alpha(Ct^{(1)}(i,j) - Cy^{(1)}(i,j)) +$$
$$\beta(Ct^{(2)}(i,j) - Cy^{(2)}(i,j)) +$$
$$\gamma(Ct^{(3)}(i,j) - Cy^{(3)}(i,j)) +$$
$$\delta(Ct^{(4)}(i,j) - Cy^{(4)}(i,j)) +$$
$$\varepsilon(Ct^{(5)}(i,j) - Cy^{(5)}(i,j))|$$

is achieved.

As a result, when the values calculated for the similarity components along the vertical direction and the horizontal direction are both "0" as in the case of the third through fifth similarity components in FIG. 11C, or when the values calculated for the similarity components along the vertical direction and the horizontal direction are close to each other as in the case of the first similarity components in FIG. 12C, for instance, using large values for the weighting coefficients does not greatly affect the value of $|Ct(i,j) - Cy(i,j)|$.

In other words, in the fifth embodiment, even when similarity components (e.g., the third through fifth similarity components in FIG. 11C) that are not suited for use in the interpolation processing of the interpolation target vacancy are calculated and they are included in the weighted addition along with the similarity components (e.g., the first similarity components and the second similarity component in FIG. 11C) suited for the interpolation processing for the interpolation target vacancy, the similarity components suited for the interpolation processing of the interpolation target vacancy alone are utilized effectively to achieve highly accurate interpolation processing.

In addition, while the vertical similarity degree Ct(i,j) and the horizontal similarity degree Cy(i,j) are calculated in the fifth embodiment through the weighted addition of the five types of similarity components obtained using the color information in FIGS. 5A (or 5B), 5C, 5D, 5E and 5F, the vertical similarity degree Ct(i,j) and the horizontal similarity degree Cy(i,j) may instead be calculated through weighted addition of four types of similarity components obtained using the color information in FIGS. 5A (or 5B), 5C and 5D and the color information in either FIG. 5E or 5F.

(Sixth Embodiment)

Figure 13:
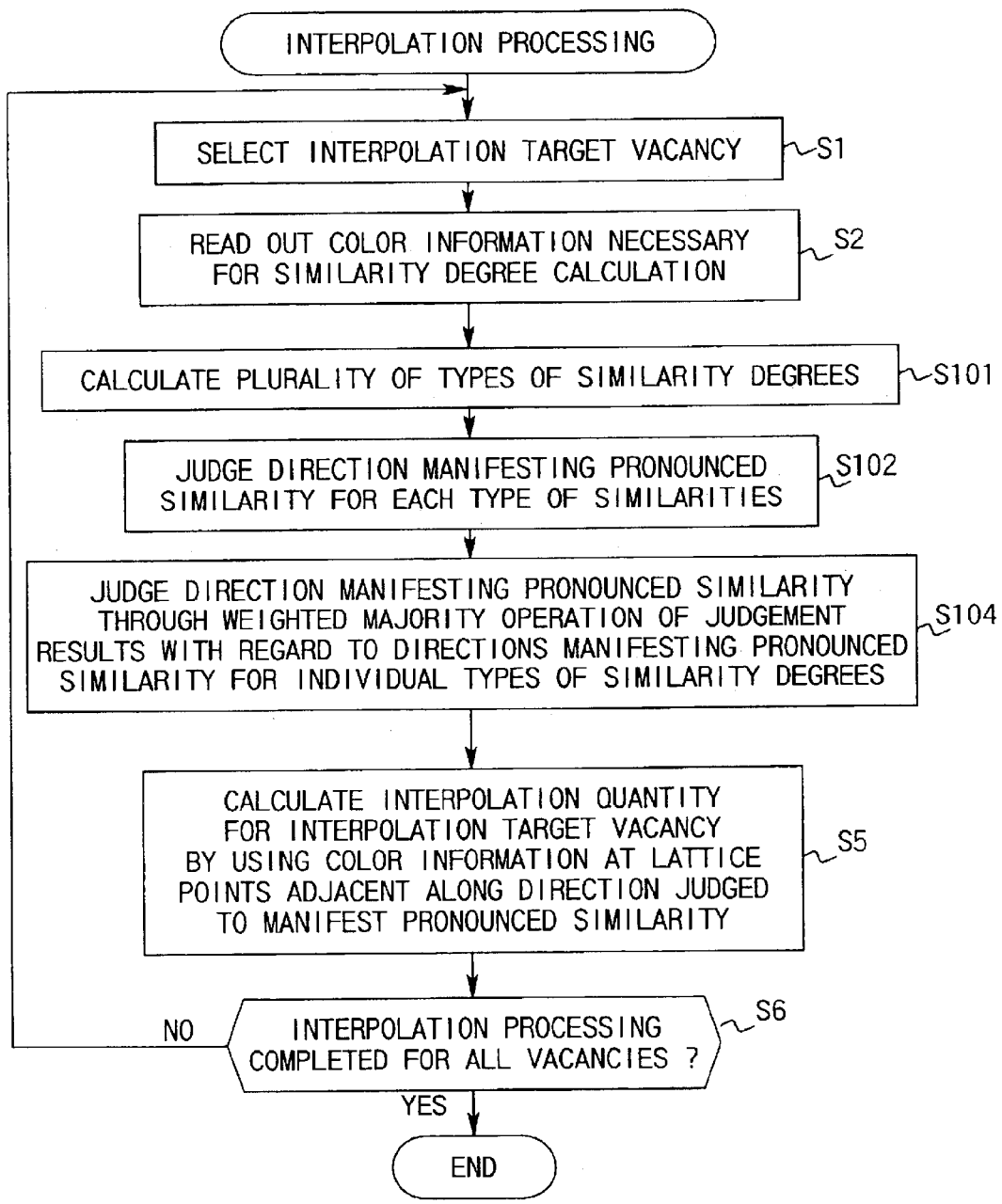
FIG. 13 is a flowchart of the interpolation processing operation achieved in the sixth embodiment.

FIG. 13 is a flowchart of the interpolation processing operation achieved in the sixth embodiment.

In FIG. 3, the same step numbers as those in FIG. 4 are assigned to steps in which similar to that in the operation flowchart in FIG. 4 is implemented, and their explanation is omitted.

It is to be noted that the difference between the operation flowchart in FIG. 4 and the operation flowchart in FIG. 13 is that S3 and S4 in FIG. 4 are replaced by S101~S103 in FIG. 13.

The following explanation of the interpolation processing operation achieved in the sixth embodiment mainly focuses on the processing implemented in S101~S103 in FIG. 13.

The interpolation processing unit 19 reads out the color information in FIGS. 5A (or 5B), 5C, 5D, 5E and 5F (FIG. 13, S2) and provides the color information to the similarity degree calculation unit 20.

The similarity degree calculation unit 20 calculates a plurality of types of similarity degrees (FIG. 13, S101) by using the color information thus read out and provides the calculation results to the similarity judging unit 21.

It is to be noted that in the sixth embodiment, the first through fifth similarity components mentioned earlier are calculated as the plurality of types of similarity degrees. Namely, the similarity degree calculation unit 20 calculates the first through fifth similarity degrees corresponding to the individual similarity components through expression t1 (or expression t1-2), expression y1 (or expression y1-2), expression t2, expression y2, expression t3, expression y3, expression t4, expression y4, expression t5 and expression y5 mentioned before.

The similarity judging unit 21, which has been provided with the plurality of types of similarity degrees, judges the direction manifesting a pronounced similarity for each type of similarity degree (FIG. 13, S102).

In order to simplify the subsequent explanation, the first through fifth similarity degrees are generically expressed as a kth similarity degree, (k: 1, . . . , 5), with $Ct^{(k)}(i,j)$ representing the kth similarity degree along the vertical direction, $Cy^{(k)}(i,j)$ representing the kth similarity degree along the horizontal direction and $D^{(k)}$(k: 1, . . . , 5) representing the value indicating the direction manifesting a pronounced similarity of a given type. It is assumed that "−1" is set for $D^{(k)}$ if the vertical similarity is pronounced, "1" is set for $D^{(k)}$ if the horizontal similarity is pronounced and "0" is set for $D^{(k)}$ if the two directions manifest roughly equal degrees of similarity.

For instance, if $Ct^{(k)}(i,j)<Cy^{(k)}(i,j)$ is true, the similarity judging unit 21 sets "−1" for $D^{(k)}$ based upon the judgment that the vertical direction manifests a pronounced similarity, if $Ct^{(k)}(i,j)=Cy^{(k)}(i,j)$ is true, the similarity judging unit 21 sets "0" for $D^{(k)}$ and if $Ct^{(k)}(i,j)>Cy^{(k)}(i,j)$ is true, it sets "1" for $D^{(k)}$ based upon the judgment that the horizontal direction manifests a pronounced similarity.

Next, when the direction manifesting a pronounced similarity is judged for each type of similarity degree in this manner, the similarity judging unit 21 performs a majority operation by weighting the results of the judgment (hereafter referred to as a "weighted majority operation") to ascertain the direction along which the interpolation target vacancy manifests a pronounced similarity (FIG. 13, S103).

Namely, if the "number of types of similarity degrees for which the vertical similarity is judged to be more pronounced" is larger than the "number of types of similarity degrees for which the horizontal similarity is judged to be more pronounced", the similarity judging unit 21 judges that the vertical similarity is pronounced, whereas if the number of types of similarity degrees for which the horizontal similarity is judged to be more pronounced" is larger than the "number of types of similarity degrees for which the vertical similarity is judged to be more pronounced", the similarity judging unit 21 judges that the horizontal similarity is pronounced.

The similarity judging unit 21 may calculate an evaluation value D(i,j) to be used for such a judgment through the following expression 11;

$$D(i,j)=\alpha D^{(1)}(i,j)+\beta D^{(2)}(i,j)+\gamma D^{(3)}(i,j)+\delta D^{(4)}(i,j)+\epsilon D^{(5)}(i,j) \qquad \text{expression 11}$$

In the expression above, $\alpha$, $\beta$, $\gamma$, $\delta$ and $\epsilon$ each represent a positive value used as the weighting coefficient in the corresponding term. In this example, they are the values satisfying $\alpha:\beta:\gamma:\delta:\epsilon=4:4:2:1:1$ as in the fifth embodiment. Alternatively, $\alpha$, $\beta$, $\gamma$, $\delta$, $\epsilon$ may be values that satisfy $\alpha:\beta:\gamma:\delta:\epsilon=1:1:1:0:0$, 1:1:0:0:0, 0:1:1:0:0 or 1:0:1:0:0 as in the first through fourth embodiments, instead.

In addition, with regard to the evaluation value D(i,j) thus calculated, if D(i,j)<0 is true, the similarity judging unit 21 judges that the vertical similarity is pronounced, if D(i,j)>0 is true, it judges that the horizontal similarity is pronounced and if D(i,j)=0 is true, it judges that roughly equal similarity degrees manifest along the two directions.

As explained above, in the sixth embodiment, the first through fifth similarity degrees along the vertical direction and the horizontal direction are calculated, the direction manifesting a pronounced similarity is judged for each type of similarity degree and the direction along which the interpolation target vacancy manifests pronounced similarity is ascertained through a weighted majority operation performed on the results of the judgment thus made.

As a result, as in the fifth embodiment, the occurrence of color artifacts in various types of images including natural images as well as images with a high spatial frequency such as black-and-white Nyquist stripes can be reduced through the sixth embodiment implemented by ensuring that $\alpha:\beta:\gamma:\delta:\epsilon=4:4:2:1:1$ with respect to expression 11. In short, the sixth embodiment achieves an improvement in the interpolation processing accuracy with a high degree of reliability.

While an example in which five types of similarity degrees (the first through fifth similarity degrees) are calculated is explained in reference to the sixth embodiment, any number of different types of similarity degrees may be calculated in the interpolation processing method through which the direction along which the interpolation target vacancy manifests pronounced similarity is judged through a weighted majority operation, as long as at least two types of similarity degrees among the first through fifth similarity degrees are calculated.

For instance, combinations of similarity degrees that should be calculated in the interpolation processing achieved by determining the direction along which the interpolation target vacancy manifests pronounced similarity through a weighted majority operation include "the first similarity degrees and the second similarity degrees (as in the second embodiment)", "the second similarity degrees and the third similarity degrees (as in the third embodiment)", "the first similarity degrees and the third similarity degrees (as in the fourth embodiment)" and "the first similarity degrees, the second similarity degrees and the third similarity degrees (as in the first embodiment)".

It is to be noted that the color artifact reduction effects achieved through these combinations of similarity degrees correspond to the color artifact reduction effects achieved in the first through fourth embodiments.

(Seventh Embodiment)

Figure 14:
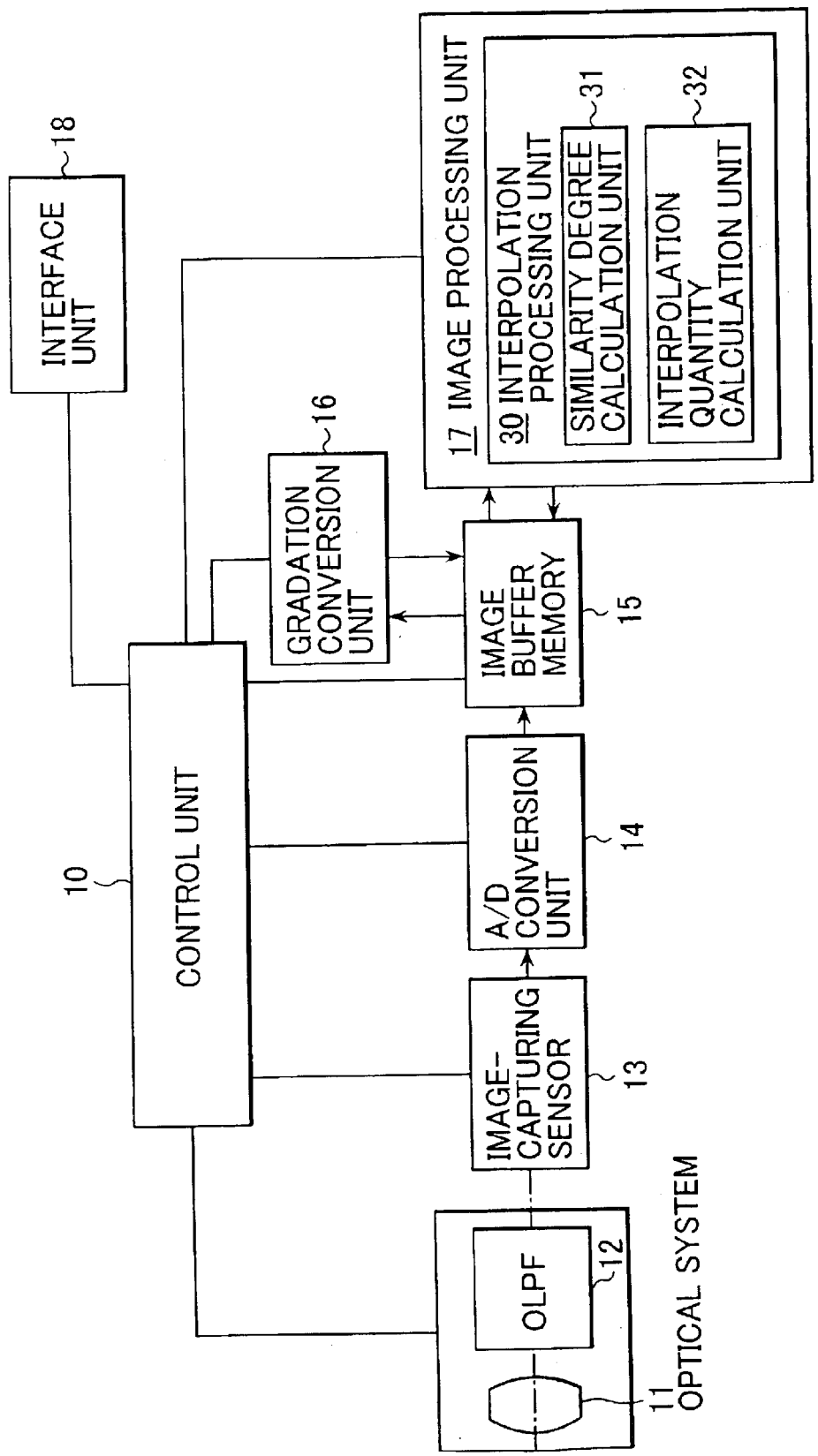
FIG. 14 is a functional block diagram of the electronic still camera corresponding to seventh through tenth embodiments.

FIG. 14 is a functional block diagram of the electronic still camera corresponding to the seventh through tenth embodiments.

In FIG. 14, the same reference numbers are assigned to components having functions identical to those in the functional block diagram in FIG. 1, to preclude the necessity for an explanation of their structures.

It is to be noted that the structural difference between FIG. 14 and FIG. 1 is that an interpolation processing unit 30, a similarity degree calculation unit 31 and an interpolation quantity calculation unit 32 are provided in FIG. 14 in place of the interpolation processing unit 19, the similarity degree calculation unit 20, the similarity judging unit 21 and the interpolation quantity calculation unit 22 in FIG. 1.

In addition, the electronic still camera in FIG. 14 engages in an operation similar to that performed by the electronic still camera in FIG. 1, except for the operation corresponding to FIG. 3, S4 (the step in which the interpolation processing is implemented).

Figure 15:
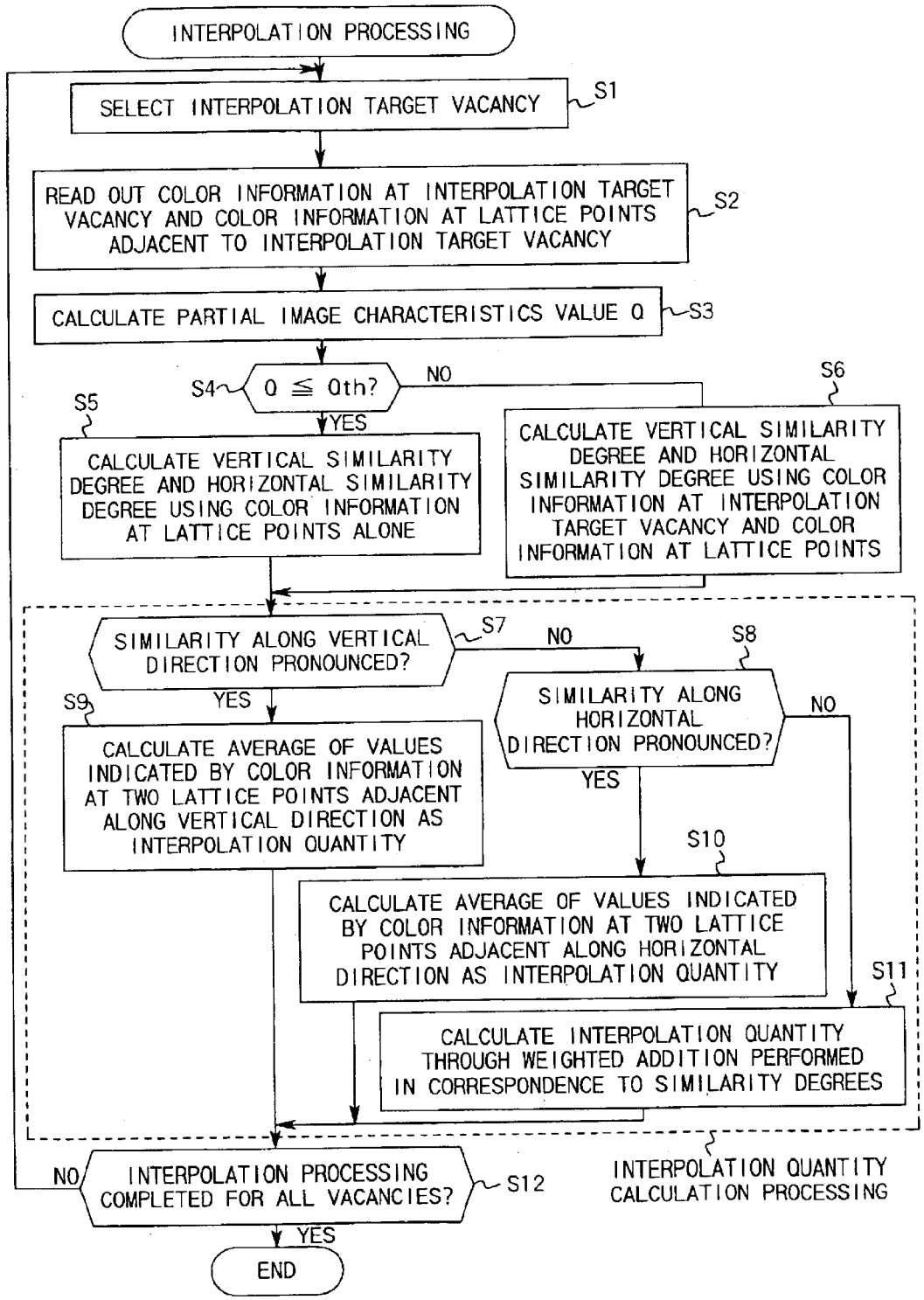
FIG. 15 is a flowchart of the interpolation processing operation achieved in the seventh embodiment.

FIG. 15 is a flowchart of the interpolation processing operation achieved in the seventh embodiment.

Since the seventh embodiment is characterized by the interpolation processing method adopted therein and the other aspects of the operation are similar to those in the first embodiment, the following explanation of the operation achieved in the seventh embodiment given in reference to FIGS. 14 and 15 will focus on the interpolation processing operation.

First, the interpolation processing unit 30 selects an interpolation target vacancy as in the first embodiment (FIG. 15, S1) and reads out the color information RB(i,j) at the interpolation target vacancy and the color information G(i, j−1), G(i,j+1), G(i−1,j) and G(i+1,j) at the lattice points adjacent to the interpolation target vacancy from the image buffer memory 15 (FIG. 15, S2).

It is to be noted that the color information RB(i,j) at the interpolation target vacancy and the color information G(i, j−1), G(i,j+1), G(i−1,j) and G(i+1,j) at the lattice points adjacent to the interpolation target vacancy thus read out from the image buffer memory 15 are provided to the similarity degree calculation unit 31.

The similarity degree calculation unit 31 calculates a value Q indicating the characteristics of the image around the interpolation target vacancy (hereafter referred to as the "partial image characteristic value Q") through the following expression by using the color information G(i,j−1), G(i,j+1), G(i−1,j) and G(i+1,j) at the lattice points thus provided (FIG. 15, S3).

$$Q = Q1 - \theta \times Q2 \quad \text{expression 12}$$

Q1 and Q2 in expression 12 satisfies $$Q1 = |(G(i,j-1)+G(i,j+1)) - (G(i-1,j)+G(i+1,j))| \quad \text{expression 13}$$

$$Q2 = C1(i,j) + C2(i,j)) \quad \text{expression 14,}$$

with $\theta$ representing a predetermined constant.

C1(i,j) and C2(i,j) in the expression 14 satisfy;

$$C1(i,j) = Ct^{(3)}(i,j) + t1 \cdot Ct^{(3)}(i-1,j-1) + t2 \cdot Ct^{(3)}(i-1,j+1) + t3 \cdot Ct^{(3)}(i+1,j-1) + t4 \cdot Ct^{(3)}(i+1,j+1) \quad \text{expression 15}$$

$$C2(i,j) = Cy^{(3)}(i,j) + y1 \cdot Cy^{(3)}(i-1,j-1) + y2 \cdot Cy^{(3)}(i-1,j+1) + y3 \cdot Cy^{(3)}(i+1,j-1) + y4 \cdot Cy^{(3)}(i+1,j+1) \quad \text{expression 16}$$

$Ct^{(3)}(i,j)$ in expression 15 satisfies;

$$Ct^{(3)}(i,j) = |G(i,j-1) - G(i,j+1)| \quad \text{expression 17}$$

(identical to expression t3), with t1, t2, t3 and t4 each representing a predetermined constant (they may all be "0").

$Cy^{(3)}(i,j)$ in expression 16 satisfies;

$$Cy^{(3)}(i,j) = |G(i-1,j) - G(i+1,j)| \quad \text{expression 18}$$

(identical to expression y3), with y1, y2, y3 and y4 each representing a predetermined constant (they may all be "0").

Namely, when the difference (Q1) between "G(i,j−1)+G(i,j+1)" and "G(i−1,j)+G(i+1,j)" is large, the partial image characteristic value Q indicates that there is a large discrepancy between the sum of the values indicated by the color information at the lattice points adjacent to the interpolation target vacancy along the vertical direction and the sum of the values indicated by the color information at the lattice points adjacent to the interpolation target vacancy along the horizontal direction.

In addition, if the sum (Q2) of C1(i,j) and C2(i,j) is small, the partial image characteristics value Q indicates that the inclination of the color information along the vertical direction and the inclination of the color information along the horizontal direction around the interpolation target vacancy are both slight.

When the partial image characteristic value Q has been calculated through the expression above;, the similarity degree calculation unit 31 makes a decision as to whether or not "Q≦Qth" is true with regard to that partial image characteristic value Q (FIG. 15, S4).

It is to be noted that Qth represents a predetermined threshold value, and if the partial image characteristic value Q exceeds the threshold value Qth (if Q1 is large and Q2 is small), the likelihood of the image around the interpolation target vacancy being black-and-white Nyquist stripes is high.

If "Q≦Qth" is true, the similarity degree calculation unit 31 calculates the vertical similarity degree Ct(i,j) and the horizontal similarity degree Cy(i,j) through the following expressions by using the color information G(i,j−1), G(i,j+1), G(i−1,j) and G(i+1,j) at the lattice points which has already been read out (FIG. 15, S5).

$$Ct(i,j) = C1(i,j) \quad \text{expression 19}$$

$$Cy(i,j) = C2(i,j) \quad \text{expression 20,}$$

with C1(i,j) and C2(i,j) representing values calculated through expressions 15~18 explained earlier.

If, on the other hand, "Q≦Qth" is not true, (if "Q>Qth"), the similarity degree calculation unit 31 calculates the vertical similarity degree Ct(i,j) and the horizontal similarity degree Cy(i,j) through the following expressions by using the color information RB(i,j) at the interpolation target vacancy and the color information G(i,j−1), G(i,j+1), G(i−1,j) and G(i+1,j) at the lattice points which have already been read out (FIG. 15, S6)

$$Ct(i,j)=D1(i,j) \quad \text{expression 21}$$

$$Cy(i,j)=D2(i,j) \quad \text{expression 22}$$

D1(i,j) in expression 21 satisfies $$D1(i,j)=Ct^{(1-4)}(i,j)+u1 \cdot Ct^{(1-4)}(i-1,j-1)+u2 \cdot Ct^{(1-4)}(i-1,j+1)+u3 \cdot Ct^{(1-4)}(i+1,j-1)+u4 \cdot Ct^{(1-4)}(i+1,j+1) \quad \text{expression 23}$$

and D2(i,j) in expression 22 satisfies $$D2(i,j)=Cy^{(1-4)}(i,j)+v1 \cdot Cy^{(1-4)}(i-1,j-1)+v2 \cdot Cy^{(1-4)}(i-1,j+1)+v3 \cdot Cy^{(1-4)}(i+1,j-1)+v4 \cdot Cy^{(1-4)}(i+1,j+1) \quad \text{expression 24}$$

$Ct^{(1-4)}(i,j)$ in expression 23 satisfies either;

$$Ct^{(1-4)}(i,j)=t|RB(i,j)-G(i,j-1)|+(1-t)|RB(i,j)-G(i,j+1)| \quad \text{expression 25a or}$$

$$Ct^{(1-4)}(i,j)=|t \cdot G(i,j-1)+(1-t) \cdot G(i,j+1)-RB(i,j)| \quad \text{expression 25b,}$$

with u1, u2, u3, u4 and t each representing a predetermined constant.

$Cy^{(1-4)}(i,j)$ in expression 24 satisfies either;

$$Cy^{(1-4)}(i,j)=y|RB(i,j)-G(i-1,j)|+(1-y)|RB(i,j)-G(i1,j)| \quad \text{expression 26a or}$$

$$Cy^{(1-4)}(i,j)=|y \cdot G(i-1,j)+(1-y) \cdot G(i+1,j)-RB(i,j)| \quad \text{expression 26b}$$

with v1, v2, v3, v4 and y each representing a predetermined constant.

In other words, the similarity degree calculation unit 31 is capable of making a decision as to whether or not the color information RB(i,j) at the interpolation target vacancy is to be used when calculating the vertical similarity degree Ct(i,j) and the horizontal similarity degree Cy(i,j), based upon the level of the partial image characteristic value Q.

It is to be noted that the similarity degree calculation unit 31 provides the interpolation quantity calculation unit 32 with the vertical similarity degree Ct(i,j) and the horizontal similarity degree Cy(i,j) calculated through this process.

The interpolation quantity calculation unit 32, which has been provided with the vertical similarity degree Ct(i,j) and the horizontal similarity degree Cy(i,j), calculates the interpolation quantity G'(i,j) for the interpolation target vacancy by using the color information G(i,j−1), G(i,j+1), G(i−1,j) and G(i+1,j) at the lattice points that has already been provided via the interpolation processing unit 30 as follows;

$$G'(i,j)=\{(G(i,j-1)+G(i,j+1)) \cdot (1+f(x))+(G(i-1,j)+G(i1,j)) \cdot (1-f(x))\}/4 \quad \text{expression 27, with}$$

$$x=(Cy(i,j)-Ct(i,j))/\{(Cy(i,j)+Ct(i,j)) \cdot T1+T0\} \quad \text{expression 28, and}$$

$f(x)=x$ when $-1 \leq x \leq 1$
$f(x)=1$ when $x>1$ and
$f(x)=-1$ when $x<-1$.

In expression 28, T1 represents a constant satisfying "0≦T1≦1", and it is assumed that when each set of color information indicates a numerical value (eight bits) between 0 and 255, T0 is a constant within a range between "0 and 100". In addition, T0 and T1 never assume the value "0" at the same time. For instance, possible combinations (t1, t0) of T1 and T0 include (0.3, 0), (0.5, 10), (0.7, 0), (0.3, 40), (0.5, 40) and (0.7, 40).

As described above, the interpolation quantity calculation unit 32 uses the value of x obtained through expression 28 as the value for evaluating the similarity manifesting at the interpolation target vacancy and calculates the interpolation quantity for the interpolation target vacancy in correspondence to the evaluation value. When "x>0" is true, the vertical similarity is more pronounced than the horizontal similarity, whereas when "x<0" is true, the horizontal similarity is more pronounced than the vertical similarity.

Figure 16:
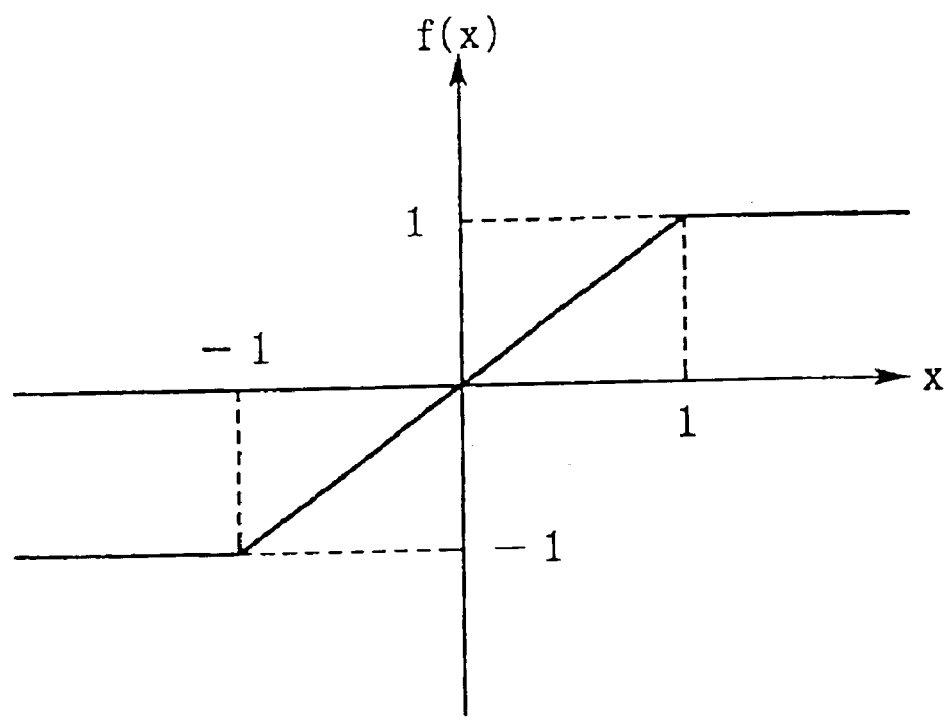
FIG. 16 presents an f(x) graph.

It is to be noted that the f(x) is rendered in the graph presented in FIG. 16.

Expression 27 is equivalent to;

$$G'(i,j)=(G(i,j-1)+G(i,j+1))/2$$

when "x>1" is true since "f(x)=1" in such a case, whereas it is equivalent to $$G'(i,j)=(G(i-1,j)+G(i+1,j))/2$$

if "x<−1" is true since "f(x)=−1" in such a case.

In other words, the interpolation quantity calculation unit 32 makes a decision as to whether or not the interpolation target vacancy manifests pronounced vertical similarity by determining whether not "x>1" is true (FIG. 15, S7), and makes a decision as to whether or not the interpolation target vacancy manifests pronounced horizontal similarity by determining whether or not "x<−1" is true (FIG. 15, S8).

In addition, if the interpolation target vacancy manifests pronounced vertical similarity, the interpolation quantity calculation unit 32 calculates the average of the values indicated by the color information at the two lattice points adjacent along the vertical direction as the interpolation quantity for the interpolation target vacancy (FIG. 15, S9), whereas if the interpolation target vacancy manifests pronounced horizontal similarity, the interpolation quantity calculation unit 32 calculates the average of the values indicated by the color information at two lattice points adjacent along the horizontal direction as the interpolation quantity for the interpolation target vacancy (FIG. 15, S10).

When "−1≦x≦1" is true, expression 27 is equivalent to;

$$G'(i,j)=\{(G(i,j-1)+G(i,j+1))/2\} \cdot \{(1+x)/2\}+\{(G(i-1,j)+G(i+1,j))/2\} \cdot \{(1-x)/2\}$$

In the above expression, "(G(i,j−1)+G(i,j+1))/2" represents the average of the values indicated by the color information at the two lattice points adjacent along the vertical direction and "(1+x)/2" is equivalent to the weighting coefficient corresponding to the vertical similarity degree.

In addition, "(G(i−1,j)+G(i+1,j))/2 represents the average of the values indicated by the color information at the two lattice points adjacent along the horizontal direction and "(1−x)/2" is equivalent to the weighting coefficient corresponding to the horizontal similarity degree.

In other words, if it is decided that neither direction manifests pronounced similarity, the interpolation quantity calculation unit 32 calculates the interpolation quantity for the interpolation target vacancy by performing weighted addition of the average of the values indicated by the color information at the two lattice points adjacent to the interpolation target vacancy along the vertical direction and the average of the values indicated by the color information at the two lattice points adjacent to the interpolation target vacancy along the horizontal direction, based upon the evaluation value used to evaluate the similarity degrees along the individual directions (FIG. 15, S11).

In addition, the interpolation processing unit 30 makes a decision as to whether or not the interpolation processing has been completed for all the vacancies (FIG. 15, S12). It is to be noted that the processing described above (the processing performed in FIG. 15, S1 and subsequent steps) is repeated until it is confirmed that the interpolation processing for all the vacancies has been completed through such decision-making.

As explained above, through the seventh embodiment, the color information at the interpolation target vacancy is reflected with a high degree of reliability when calculating the vertical similarity degree and the horizontal similarity degree in a specific situation in which the image around the interpolation target vacancy is, for instance, a black-and-white Nyquist stripes (an image with the values indicated by the color information at two lattice points adjacent to the interpolation target vacancy along the vertical direction extremely close to each other, the values indicated by the color information at the two lattice points adjacent to the interpolation target vacancy along the horizontal direction extremely close to each other and a great different manifesting between the value indicated by the color information at a lattice point adjacent to the interpolation target vacancy to the interpolation target vacancy along the vertical direction and value indicated by the color information at a lattice point adjacent along the horizontal direction).

As a result, the similarity degrees can be calculated with accuracy through the seventh embodiment even for an image which tends to be erroneously judged to manifest roughly equal similarity degrees along the two directions in the interpolation processing in the prior art (an image which actually manifests pronounced similarity along one of the directions).

In addition, if the image around the interpolation target vacancy is of a type that allows calculation of similarity degrees without requiring the use of the color information at the interpolation target vacancy, the similarity degrees can be calculated simply by using the color information from the lattice points adjacent to the interpolation target vacancy in the seventh embodiment.

In short, in the seventh embodiment, in which the similarity degrees can be calculated with accuracy in correspondence to the characteristics of the image around the interpolation target vacancy, an improvement in the interpolation processing accuracy is achieved with a high degree of reliability.

Now, the method adopted to identify the characteristics of the image is explained. According to the present invention, image characteristics are ascertained in order to identify an "area manifesting an unusually drastic change", and in the explanation given above, an area over which "Q>Qth" is true is equivalent to an "area manifesting an unusually drastic change". Since various methods may be adopted to ascertain such image characteristics, some of them are explained below.

In expression 13 mentioned earlier, Q1 represents a value equivalent to (twice) the absolute value of the difference between the average of the values indicated by the color information at the two lattice points adjacent to the interpolation target vacancy along the vertical direction and the average of the values indicated by the color information at the two lattice points adjacent to the interpolation target vacancy along the horizontal direction. Thus, an area manifesting a large Q1 is highly likely to be an image of black-and-white Nyquist stripes, and accordingly, it is possible to identify an "area manifesting an unusually drastic change" based upon Q1 alone.

Namely, by making a decision as to whether or not "Q1>Q1th; Q1th is a constant" is true instead of making a decision as to whether or not "Q>Qth" is true, an "area manifesting an unusually drastic change" can be identified.

In addition, while an area over which Q1 is large and Q2 is small is identified by making a decision as to whether or not "Q>Qth" is true in the seventh embodiment, this identification may be made by making a decision as to whether or not "Q1>Q1th and Q2<Q2th; Q1th and Q2th are constants" is true instead of making a decision as to whether or not "Q>Qth" is true.

It is to be noted that the decision-making with respect to "Q=Q1−θ·Q2>Qth" is similar to the decision-making with respect to "Q1>Q1th and Q2<Q2th".

As described earlier, when the sum (Q2) of C1(i,j) and C2(i,j) is small, the inclination of the color information along the vertical direction and the inclination of the color information along the horizontal direction around the interpolation target vacancy are both slight. In such a case, the area to undergo the interpolation processing is highly likely to be either a completely flat image area with no change at all or part of black-and-white Nyquist stripes.

It is to be noted that the results of interpolation processing implemented on a completely flat image area do not change much regardless of whether the interpolation processing is implemented by averaging the values of the color information at the lattice points adjacent along the vertical direction or the interpolation processing is implemented by averaging the values of the color information at the lattice points adjacent along the horizontal direction.

Thus, no significant problem is caused even when "each area manifesting an unusually drastic change" that includes a completely flat portion is identified by determining that both C1(i,j) and C2(i,j) are small.

In other words, the effect of the interpolation processing is substantially sustained by making a decision as to whether or not "C1(i,j)<C1th and C2(i,j)<C2th: C1th and C2th are constants" is true instead of making a decision as to whether or not "Q>Qth" is true.

In addition, since "Q2=C1(i,j)+C2(i,j)", a decision may be made as to whether or not "C2<Q2th2; Q2th2 is a constant" is true, instead of making a decision as to whether or not "Q>Qth" is true.

As described above, various methods may be adopted to identify image characteristics, and any mathematical expressions may be used as long as "area manifesting an unusually drastic change" can be identified.

It is to be noted that while f(x) is rendered as shown in FIG. 16 in the seventh embodiment, f(x) may be any other function as long as the average of the values indicated by the color information at the two lattice points adjacent along the direction manifesting a pronounced similarity is used as the interpolation quantity for the interpolation target vacancy when either the vertical direction or the horizontal direction manifests a pronounced similarity.

In addition, while the value of f(x) is calculated during the calculation of the interpolation quantity, pre-calculated values of f(x) may be stored at a look-up table provided inside the interpolation quantity calculation unit 32, for instance, so that a value of f(x) is obtained by referencing the look-up table in correspondence to the vertical similarity degree Ct(i,j) or the horizontal similarity degree Cy(i,j) manifesting at the interpolation target vacancy.

Furthermore, in order to avoid performing division when calculating x, x may be calculated through multiplication by first calculating the value corresponding to the denominator and then replacing the value with a value corresponding to "1/denominator" in reference to the look-up table. Alternatively, the absolute value of the numerator and the denominator may be logarithm converted by referencing the table or the like and then their difference may be taken to be compared against a specific value (in this case, the signs should be separately ascertained).

Moreover, while the direction manifesting a pronounced similarity is judged based upon the value of x in the seventh embodiment, the vertical direction may be judged to manifest pronounced similarity when the vertical similarity degree Ct(i,j) indicates a value equal to or lower than a threshold value Th and the horizontal similarity degree Cy(i,j) exceeds the threshold value Th, for instance, and the horizontal direction may be judged to manifest pronounced similarity when the horizontal similarity degree Cy(i,j) indicates a value equal to or lower than the threshold value Th and the vertical similarity degree Ct(i,j) exceeds the threshold value.

In addition, while the interpolation quantity G'(i,j) for the interpolation target vacancy is calculated using the weighting coefficients set in correspondence to the various types of similarity degrees when the vertical similarity degree Ct(i,j) and the horizontal similarity degree Cy(i,j) are close to each other in the seventh embodiment, the interpolation quantity G'(i,j) for the interpolation target vacancy may be instead calculated through $$G'(i,j)=\{G(i,j-1)+G(i,j+1)+G(i-1,j)+G(i+1,j)\}/4 \text{ or}$$

$$G'(i,j)=\text{median}\{G(i,j-1),G(i,j+1),G(i-1,j),G(i+1,j)\}.$$

In the expression above, "median { }" represents a function used to calculate the median of a plurality of elements, and it is assumed that if there are an even number of elements, the average of the two elements at the center is calculated.

(Eighth embodiment)

Figure 17:
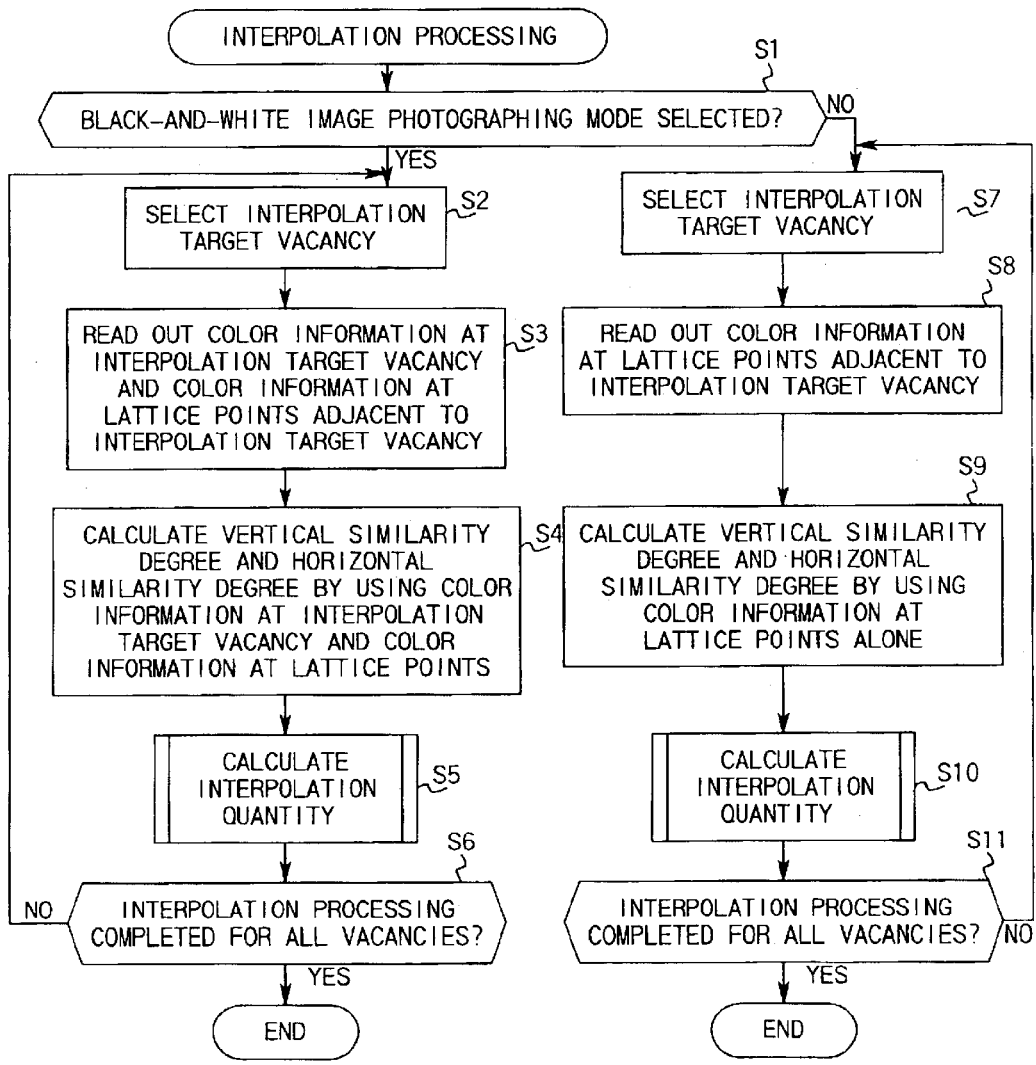
FIG. 17 is a flowchart of the interpolation processing operation achieved in the eighth embodiment.

FIG. 17 is a flowchart of the interpolation processing operation achieved in the eighth embodiment.

The following is an explanation of the interpolation processing in the eighth embodiment, given in reference to FIG. 17.

It is assumed that a "mode selector switch" is provided at the casing of the electronic still camera in the eighth embodiment to enable the operator to select either a "black-and-white image photographing mode" or a "color image photographing mode". For instance, when photographing a subject which may be regarded to be achromatic, such as a white board with black letters written on it, the operator selects the "black-and-white image photographing mode" through the "mode selector switch" and presses the shutter release button. In addition, information indicating state of the mode selector switch (hereafter referred to as the "mode information") is transmitted to the control unit 10 via the interface unit 18 in the eighth embodiment.

In the eighth embodiment, upon recognizing that the shutter release button has been pressed, the control unit 10 provides the "mode information" to the interpolation processing unit 30 in the image processing unit 17 and issues an instruction for an execution of interpolation processing.

In response to the instruction issued by the control unit 10 for the interpolation processing execution, the interpolation processing unit 30 makes a decision as to whether or not the "black-and-white image photographing mode" has been selected based upon the "mode information" (FIG. 17, S1). If the interpolation processing unit 30 ascertains that the "black-and-white image photographing mode" has been selected through this decision-making, it repeatedly implements the processing in FIG. 17, S2~S6. If, on the other hand, it is decided that "black-and-white image photographing mode" has not been selected, it repeatedly implements the processing in FIG. 17, S7~S11.

First, the processing implemented when the interpolation processing unit 30 ascertains that the "black-and-white image photographing mode" has been selected is explained.

The interpolation processing unit 30 selects an interpolation target vacancy (FIG. 17, S2), reads out the color information RB(i,j) at the interpolation target vacancy and the color information G(i,j−1), G(i,j+1), G(i−1,j) and G(i+1,j) at the lattice points adjacent to the interpolation target vacancy from the image buffer memory 15 (FIG. 17, S3) and provides the color information to the similarity degree calculation unit 31, as in the first embodiment.

Using the color information thus provided, the similarity degree calculation unit 31 calculates the vertical similarity degree Ct(i,j) and the horizontal similarity degree Cy(i,j) through the following expressions.

$$Ct(i,j)=D1(i,j) \qquad \text{same as expression 21,}$$

$$Cy(i,j)=D2(i,j) \qquad \text{same as expression 22, with D1(i,j)}$$

and D2(i,j) representing values calculated as in the seventh embodiment (through expressions 23~26).

Namely, the similarity degree calculation unit 31 calculates the vertical similarity degree Ct(i,j) and the horizontal similarity degree Cy(i,j) by using the color information RB(i,j) at the interpolation target vacancy and the color information G(i,j−1), G(i,j+1), G(i−1,j) and G(i+1,j) at the lattice points adjacent to the interpolation target vacancy (FIG. 17, S4).

It is to be noted that the similarity degree calculation unit 31 provides the vertical similarity degree Ct(i,j) and the horizontal similarity degree Cy(i,j) thus calculated to the interpolation quantity calculation unit 32.

The interpolation quantity calculation unit 32, which has been provided with the vertical similarity degree Ct(i,j) and the horizontal similarity degree Cy(i,j), calculates an interpolation quantity as in the seventh embodiment (FIG. 17, S5: corresponds to FIG. 15, S7~S11).

After the interpolation quantity is calculated by the interpolation quantity calculation unit 32, the interpolation processing unit 30 makes a decision as to whether or not the interpolation processing has been completed for all the vacancies (FIG. 17, S6). It is to be noted that the processing described above (the processing performed in FIG. 17, S2 and subsequent steps) is repeated until it is ascertained that the interpolation processing for all the vacancies has been completed through this decision-making.

Next, the processing performed when it is decided that the "black-and-white image photographing mode" has not been selected (the "color image photographing mode" has been selected) is explained.

The interpolation processing unit 30 selects an interpolation target vacancy (FIG. 17, S7), as in FIG. 17, S2, reads out the color information G(i,j−1), G(i,j+1), G(i−1,j) and G(i+1,j) at the lattice points adjacent to the interpolation target vacancy from the image buffer memory 15 (FIG. 17, S8) and provides the color information to the similarity degree calculation unit 31.

Using the color information thus provided, the similarity degree calculation unit 31 calculates the vertical similarity degree Ct(i,j) and the horizontal similarity degree Cy(i,j) through the following expressions.

$$Ct(i,j)=C1(i,j) \quad \text{same as expression 19,}$$

$$Cy(i,j)=C2(i,j) \quad \text{same as expression 20, with C1}(i,j)$$

and C2(i,j) representing values calculated as in the seventh embodiment (through expressions 15~18).

Namely, the similarity degree calculation unit 31 calculates the vertical similarity degree Ct(i,j) and the horizontal similarity degree Cy(i,j) by using the color information G(i,j−1), G(i,j+1), G(i−1,j) and G(i+1,j) at the lattice points adjacent to the interpolation target vacancy (FIG. 17, S9).

It is to be noted that the similarity degree calculation unit 31 provides the vertical similarity degree Ct(i,j) and the horizontal similarity degree Cy(i,j) thus calculated to the interpolation quantity calculation unit 32.

The interpolation quantity calculation unit 32 which has been provided with the vertical similarity degree Ct(i,j) and the horizontal similarity degree Cy(i,j), calculates an interpolation quantity as in the seventh embodiment (FIG. 17, S9: corresponds to FIG. 15, S7~S11).

After the interpolation quantity is calculated by the interpolation quantity calculation unit 32, the interpolation processing unit 30 makes a decision as to whether or not the interpolation processing has been completed for all the vacancies (FIG. 17, S6). It is to be noted that the processing described above (the processing performed in FIG. 17, S7 and subsequent steps) is repeated until it is ascertained that the interpolation processing for all the vacancies has been completed through this decision-making.

As explained above, in the eighth embodiment, the color information at the vacancy can be reflected with a high degree of reliability in the calculation of the vertical similarity degree and the horizontal similarity degree as long as the image undergoing the interpolation processing is regarded as achromatic.

Thus, since the similarity degrees of images which are regarded as achromatic can be calculated with accuracy, the interpolation processing accuracy is improved with a high degree of reliability.

(Ninth Embodiment)

Figure 18:
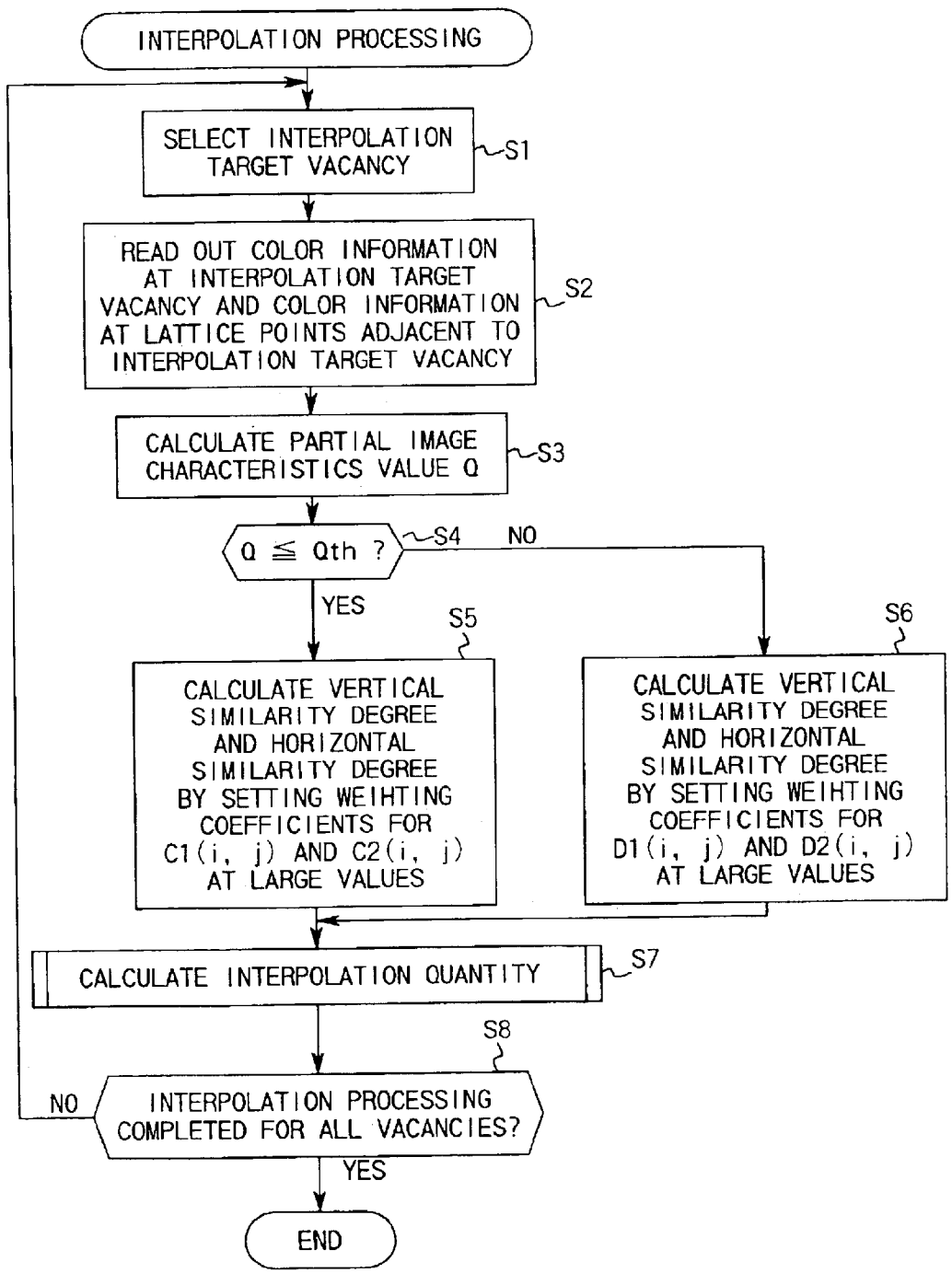
FIG. 18 is a flowchart of the interpolation processing operation achieved in the ninth embodiment.

FIG. 18 is a flowchart of the interpolation processing operation achieved in the ninth embodiment.

The following is an explanation of the interpolation processing operation in the ninth embodiment, given in reference to FIG. 18.

The interpolation processing unit 30 selects an interpolation target vacancy (FIG. 17, S1), reads out the color information RB(i,j) at the interpolation target vacancy and the color information G(i,j−1), G(i,j+1), G(i−1,j) and G(i+1,j) at the lattice points adjacent to the interpolation target vacancy from the image buffer memory 15 (FIG. 17, S2) and provides the color information to the similarity degree calculation unit 31, as in the first embodiment.

The similarity degree calculation unit 31 calculates a partial image characteristic value Q as in the seventh embodiment (through expressions 12~14) by using the color information G(i,j−1), C(i,j+1), G(i−1,j) and G(i+1,j) at the lattice points thus provided (FIG. 17, S3).

In addition, using C1(i,j) and C2(i,j) calculated through expressions 15~18 and D1(i,j) and D2(i,j) calculated through expressions 23~26, the similarity degree calculation unit 31 calculates the vertical similarity degree Ct(i,j) and the horizontal similarity degree Cy(i,j) through the following expressions in correspondence to the partial image characteristic value Q that has been calculated.

When "Q≦Qth" is true, $$Ct(i,j)=A_2 \cdot C1(i,j)+(1-A_2) \cdot D1(i,j)$$

$$Cy(i,j)=B_2 \cdot C2(i,j)+(1-B_2) \cdot D2(i,j),$$

when "Q>Qth" is true, $$Ct(i,j)=A_1 \cdot C1(i,j)+(1-A_1) \cdot D1(i,j)$$

$$Cy(i,j)=B_1 \cdot C2(i,j)+(1-B_1) \cdot D2(i,j)$$

with Qth representing a preset threshold value and $A_1$, $A_2$, $B_1$ and $B_2$ satisfying $0 \leq A_1 < A_2 \leq 1$ and $0 \leq B_1 < B_2 \leq 1$.

Namely, when "Q≦Qth" is true, the similarity degree calculation unit 31 calculates the vertical similarity degree Ct(i,j) and the horizontal similarity degree Cy(i,j) by setting the weighting coefficients for C1(i,j) and C2(i,j) larger than the weighting coefficients used when "Q>Qth" is true (FIG. 17, S5).

In addition, when "Q>Qth" is true, the similarity degree calculation unit 31 calculates the vertical similarity degree Ct(i,j) and the horizontal similarity degree Cy(i,j) by setting the weighting coefficients for D1(i,j) and D2(i,j) larger than the weighting coefficients used when "Q≦Qth" is true (FIG. 17, S6) and provides the results to the interpolation quantity calculation unit 32.

D1(i,j) and D2(i,j) are similarity components calculated by using the color information RB(i,j) at the interpolation target vacancy and the color information G(i,j−1), G(i,j+1), G(i−1,j) and G(i+1,j) at the lattice points. Consequently, the weight of the color information RB(i,j) at the interpolation target vacancy on the vertical similarity degree Ct(i,j) and the horizontal similarity degree Cy(i,j) is larger when "Q>Qth" is true compared to when "Q≦Qth" is true.

The interpolation quantity calculation unit 32, which has been provided with the vertical similarity degree Ct(i,j) and the horizontal similarity Cy(i,j), calculates an interpolation quantity as in the seventh embodiment (FIG. 17, S7: corresponds to FIG. 14, S7~S11).

After the interpolation quantity is calculated by the interpolation quantity calculation unit 32, the interpolation processing unit 30 makes a decision as to whether or not the interpolation processing has been completed for all the vacancies (FIG. 17, S8). It is to be noted that the processing described above (the processing performed in FIG. 17, S1 and subsequent steps) is repeated until it is ascertained that the interpolation processing for all the vacancies has been completed through this decision-making.

As explained above, in the ninth embodiment, the weight of the color information at the interpolation target vacancy on the vertical similarity degree and the horizontal similarity degree can be adjusted in correspondence to the partial image characteristic value Q.

It goes without saying that the condition used to identify the characteristics of an image is not limited to Q and any of the various other conditions may be used, as explained in the seventh embodiment.

Thus, the ninth embodiment, in which the similarity degrees can be calculated accurately in correspondence to the characteristics of the image around the interpolation target vacancy, improves the interpolation processing accuracy with a high degree of reliability.

(Tenth Embodiment)

Figure 19:
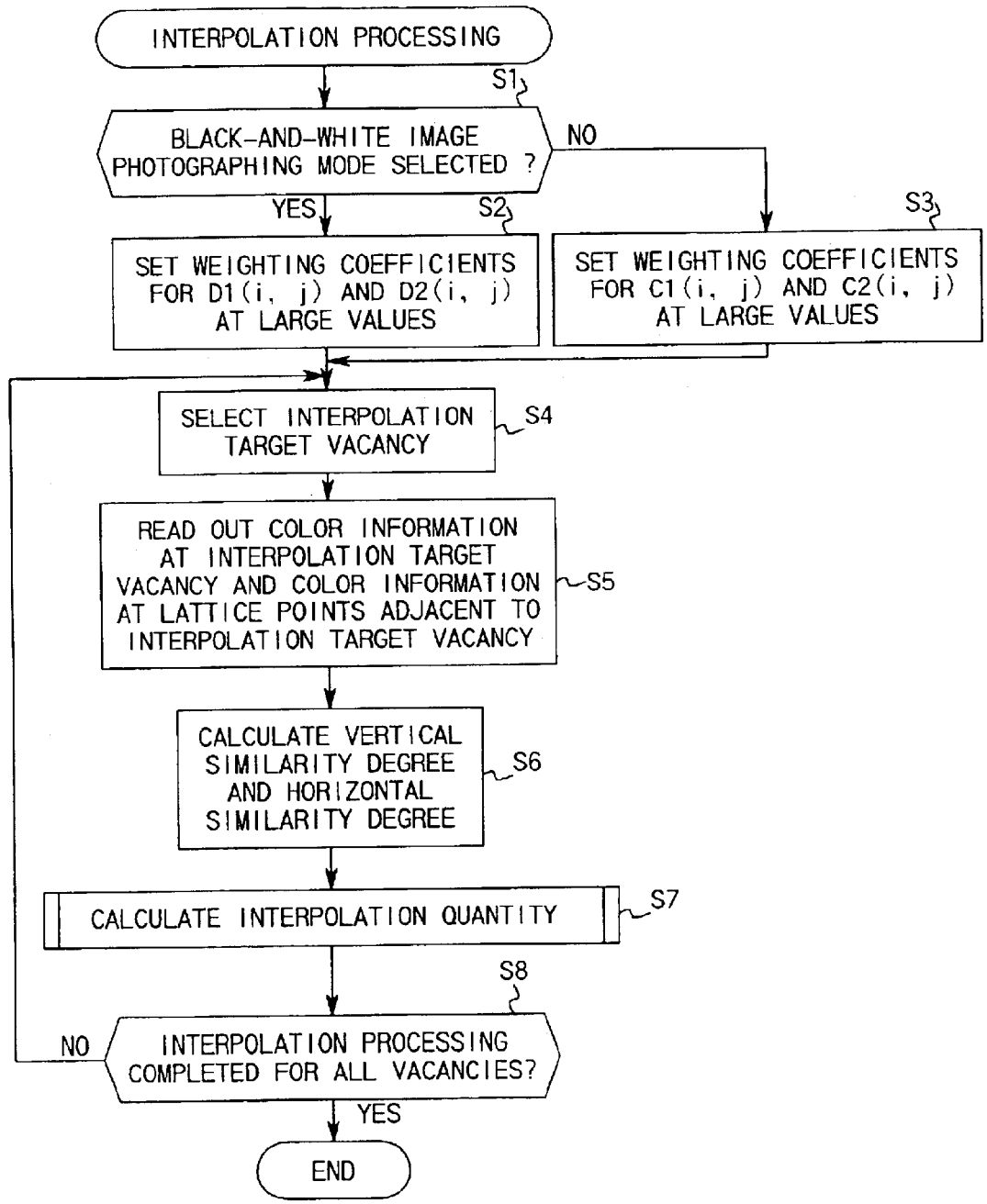
FIG. 19 is a flowchart of the interpolation processing operation achieved in the tenth embodiment.

FIG. 19 is a flowchart of the interpolation processing operation achieved in the tenth embodiment.

The following is an explanation of the interpolation processing the tenth embodiment, given in reference to FIG. 19.

It is assumed that a "mode selector switch" is provided at the casing of the electronic still camera in the tenth embodiment to enable the operator to select either a "black-andwhite image photographing mode" or a "color image photographing mode", as in the eighth embodiment. In addition, information indicating the state of the mode selector switch is transmitted to the control unit 10 via the interface unit 18.

In the tenth embodiment, upon recognizing that the shutter release button has been pressed, the control unit 10 provides the "mode information" to the interpolation processing unit 19 in the image processing unit 17 and issues an instruction for the execution of interpolation processing.

In response to the instruction issued by the control unit 10 for an interpolation processing execution, the interpolation processing unit 30 makes a decision as to whether not the "black-and-white image photographing mode" has been selected based upon the "mode information (FIG. 19, S1). It is to be noted that the results of this decision-making are provided to the similarity degree calculation unit 31.

Based upon the results of the decision-making, the similarity degree calculation unit 31 sets the weighting coefficients to be used to calculate the vertical similarity degree Ct(i,j) and the horizontal similarity degree Cy(i,j) as detailed below.

It is to be noted that in the tenth embodiment, the weighting coefficient used in conjunction with C1(i,j) to calculate the vertical similarity degree Ct(i,j) is referred to as A with the weighting coefficient for D1(i,j) referred to as (1−A). In addition, the weighting coefficient used in conjunction with C2(i,j) to calculate the horizontal similarity degree Cy(i,j) is referred to as B with the weighting coefficient for D2(i,j) referred to as (1−B).

When the "black-and-white image photographing mode" has been selected, the similarity degree calculation unit 31 sets

A=A1

B=B1, whereas if the "black-and-white image photographing mode" has not been selected (when the color image photographing model has been selected), the similarity degree calculation unit 31 sets A and B to;

A=A2

B=B2, with 0≦A1<A2≦1 and 0≦B1<B2≦1.

Namely, when the "black-and-white image photographing mode" has been selected, the similarity degree calculation unit 20 sets the weighting coefficients for D1(i,j) and D2(i,j) to larger values (compared to those set when the "color image photographing mode" has been selected) (FIG. 19, S2).

If, on the other hand, the "color image photographing mode" has been selected, the similarity degree calculation unit 20 sets the weighting coefficients for C1(i,j) and C2(i,j) to larger values (compared to those set to when the "black-and-white image photographing mode" has been selected) (FIG. 19, S3).

After the weighting coefficients to be used to calculate the vertical similarity degree Ct(i,j) and the horizontal similarity degree Cy(i,j) are set in this manner, the interpolation processing unit 30 selects an interpolation target vacancy (FIG. 19, S4), reads out the color information RB(i,j) at the interpolation target vacancy and the color information G(i, j−1), G(i,j+1), G(i−1,j) and G(i+1,j) at the lattice points adjacent to the interpolation target vacancy (FIG. 19, S5) and provides the color information to the similarity degree calculation unit 31, as in the first embodiment.

The similarity degree calculation unit 31 calculates C1(i,j) D1(i,j), C2(i,j) and D2(i,j) by using the color information thus provided, as in the seventh embodiment (expressions 15~18, expressions 23~26).

In addition, the similarity degree calculation unit 31 calculates the vertical similarity degree Ct(i,j) by performing weighted addition of C1(i,j) and D1(i,j) using the weighting coefficient A explained above and calculates the horizontal similarity degree Cy(i,j) by performing weighted addition of C2(i,j) and D2(i,j) using the weighting coefficient B (FIG. 19, S6).

Namely the similarity degree calculation unit 31 calculates the vertical similarity degree Ct(i,j) and the horizontal similarity degree Cy(i,j) through the following expressions $$Ct(i,j)=A \cdot C1(i,j)+(1-A) \cdot D1(i,j)$$

$$Cy(i,j)=B \cdot C2(i,j)+(1-B) \cdot D2(i,j)$$

It is to be noted that the similarity degree calculation unit 31 provides the interpolation quantity calculation unit 32 with the vertical similarity degree Ct(i,j) and the horizontal similarity degree Cy(i,j) thus calculated.

D1(i,j) and D2(i,j) are calculated using the color information RB(i,j) at the interpolation target vacancy and the color information G(i,j−1), G(i,j+1), G(i−1,j) and G(i+1,j) at the lattice points. Thus, the weight of the color information RB(i,j) at the interpolation target vacancy on the vertical similarity degree Ct(i,j) and the horizontal similarity degree Cy(i,j) is larger when the "black-and-white image photographing mode" has been selected (when the values A and B are small) compared to when the "color image photographing mode" has been selected (when the values A and B are large).

The interpolation quantity calculation unit 32, which has been provided with the vertical similarity degree Ct(i,j) and the horizontal similarity degree Cy(i,j) calculates the interpolation quantity as in the seventh embodiment (FIG. 19, S7: corresponds to FIGS. S7~S11).

After the interpolation quantity is calculated by the interpolation quantity calculation unit 32, the interpolation processing unit 30 makes a decision as to whether or not the interpolation processing has been completed for all the vacancies (FIG. 19, S8). It is to be noted that the processing (the processing performed in FIG. 19, S4 and subsequent steps) is repeated until it is ascertained that the interpolation processing for all of the vacancies has been completed through this decision-making.

As explained above, in the tenth embodiment, the weight of the color information RB(i,j) at the interpolation target vacancy on the vertical similarity degree Ct(i,j) and the horizontal similarity degree Cy(i,j) can be increased when performing interpolation processing on an image which can be regarded as achromatic.

Thus, the tenth embodiment, which achieves accurate calculation of the similarity degrees in images which can be regarded as achromatic, improves the interpolation processing accuracy with a high degree of reliability.

(Eleventh Embodiment)

Figure 20:
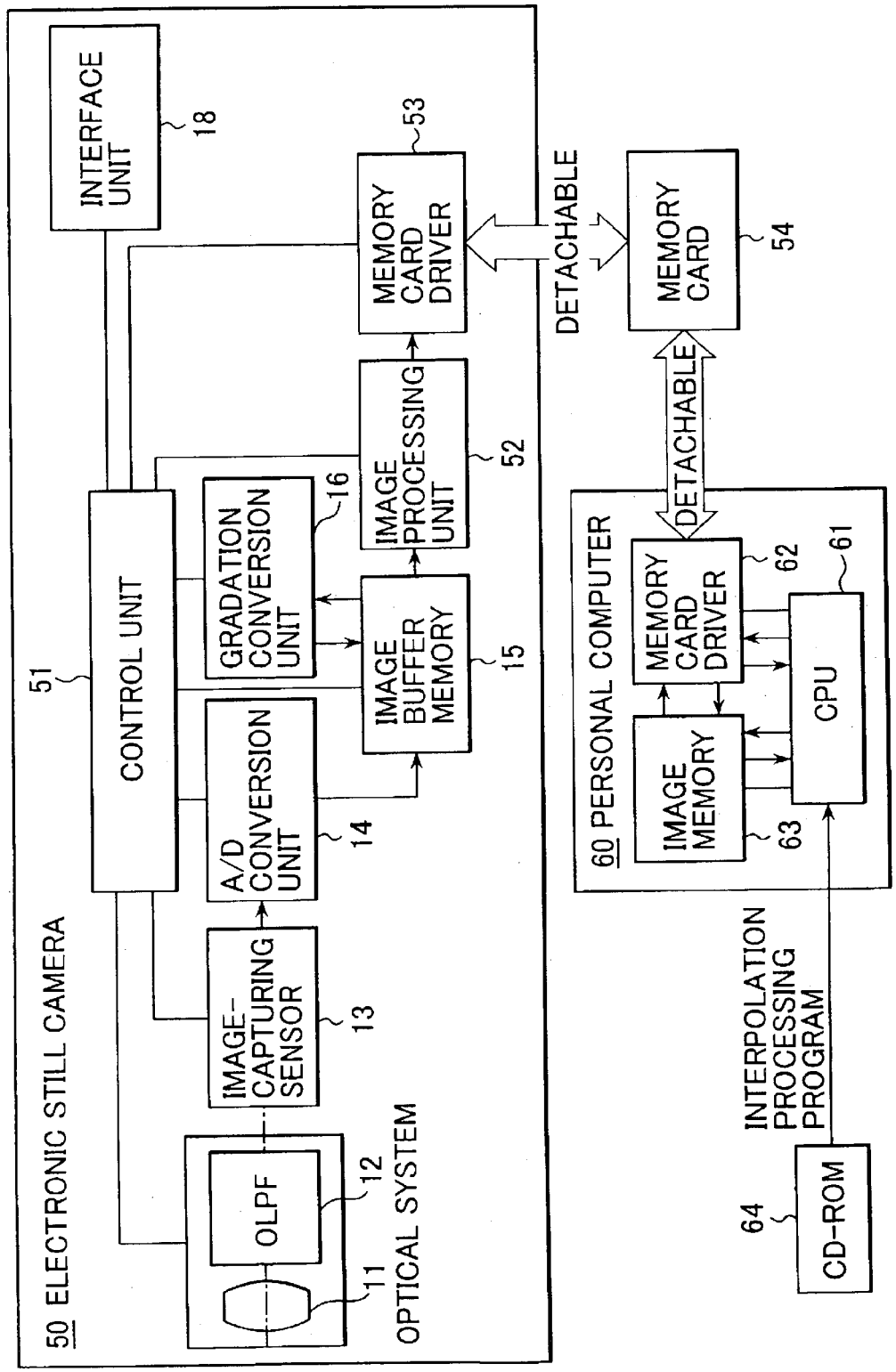
FIG. 20 is a functional block diagram of an eleventh embodiment.

FIG. 20 is a functional block diagram of the eleventh embodiment.

It is to be noted that in the eleventh embodiment, interpolation processing is implemented on a personal computer by utilizing a "recording medium having an interpolation processing program recorded therein".

In FIG. 20, the same reference numbers are assigned to components having functions identical to those in FIG. 1 and FIG. 14, to preclude the necessity for repeated explanation thereof.

It is to be noted that the electronic still camera 50 in FIG. 20 structurally differs from those shown in FIGS. 1 and 14 in that a control unit 51 and an image processing unit 52 are provided in place of the control unit 10 and the image processing unit 17 and that a memory card driver 53, which is connected to the outputs of the control unit 51 and the image processing unit 52 is provided.

In addition, a personal computer 60 in FIG. 20 is provided with a CPU 61, a memory card driver 62 and an image memory 63.

The CPU 61 is connected to the memory card driver 62 and the image memory 63. The output of the memory card driver 62 is connected to the CPU 61 and the image memory 63, the output of the CPU 61 is connected to the memory card driver 62 and the image memory 63 and the output of the image memory 63 is connected to the memory card driver 62 and the CPU 61.

It is to be noted that an interpolation processing program recorded in a CD-ROM 64 is a pre-installed in the CPU 61.

Figure 21:
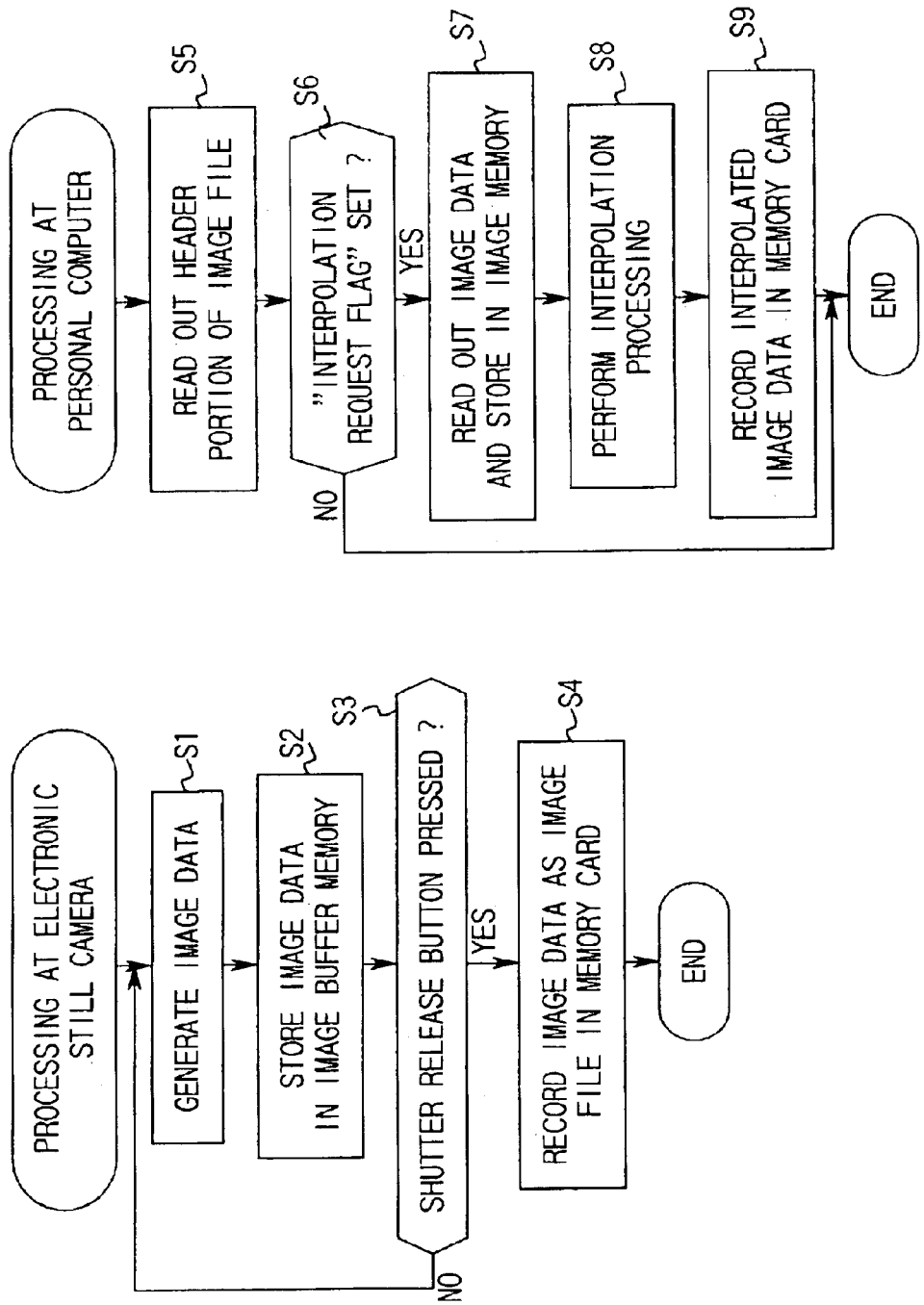
FIG. 21 is a flowchart of the operation achieved in the eleventh embodiment.

FIG. 21 is a flowchart of the operation achieved in the eleventh embodiment.

The following is an explanation of the operation in the eleventh embodiment, given in reference to FIGS. 20 and 21.

First, the operation of the electronic still camera 50 is explained.

As in the previous embodiments, the image-capturing sensor 13 in the electronic camera 50 generates a signal charge. In addition, the image-capturing sensor 13 generates an image signal by scanning the signal charge that has been generated and provides the image signal to the A/D conversion unit 14.

The A/D conversion unit 14 performs A/D conversion on the image signal thus provided and generates image data (FIG. 21, S1). The image data thus generated are temporarily stored in the image buffer memory 15 (FIG. 21, S2).

It is to be noted that a gradation conversion (logarithm conversion, γ conversion and the like) may be implemented on the image data stored in the image buffer memory 15 by the gradation conversion unit 16.

The processing (image data generation and storage) described above is repeatedly implemented in conformance to timing control executed by the control unit 51.

The control unit 51 also makes a decision via the interface unit 18 as to whether or not the shutter release button (not shown) provided at the casing of the electronic still camera 50 has been pressed (FIG. 21, S3).

If the control unit 51 ascertains that the shutter release button has not been pressed through this decision-making, it repeatedly issues an instruction for implementing the processing to generate image data (FIG. 21, S1) and store the image data (FIG. 21 S2) through the timing control mentioned above.

If, on the other hand, it is ascertained that the shutter release button has been pressed, the control unit 51 issues an instruction to the image processing unit 52 and the memory card driver 53 to record the image data stored at the image buffer memory 15 into the memory card 54 (FIG. 21, S4).

The image processing unit 52 performs an adjustment to eliminate problems (e.g., the dark level) inherent to the image-capturing sensor 13 on the image data stored at the image buffer memory 15 (no interpolation processing is performed at this point) and provides the adjusted image data to the memory card driver 53.

The memory card driver 53 records the image data in the memory card 54 in an image file format, and also sets up an "interpolation request flag" (a flag indicating that there are image data to be interpolated) provided at the header portion of the image file.

If a "mode selector switch" that allows selection of either the "black-and-white image photographing mode" or the "color image photographing mode" is provided at the casing of the electronic still camera 50, the control unit 51 obtains "mode information" indicating the state of the mode selector switch" at the point in time at which the shutter release button has been pressed via the interface unit 18.

In addition, the control unit 51 stores the "mode information" thus obtained at the header portion of the image file via the memory card driver 53.

Next, the operation of the personal computer 60 is explained.

When the memory card 54, in which the image file has been recorded, is loaded into the computer 60, the CPU 61 reads out the header portion of the image file via the memory card driver 62 (FIG. 21, S5).

Upon reading out the header portion of the image file in this manner, the CPU 61 makes a decision as to whether or not the "interpolation request flag" is set (FIG. 21, S6).

Only when it is ascertained through this decision-making that the "interpolation request flag" is set, the CPU 61 reads out the image data via the memory card driver 62 and stores them in the image memory 63 (FIG. 21, S7).

In addition, the CPU 61 performs interpolation processing on the image data stored in the image memory 63 (FIG. 21, S8).

It is to be noted that since the interpolation processing implemented by the CPU 61 is identical to the interpolation processing performed by the image processing unit 17 in FIGS. 1 and 14 in the individual embodiments explained earlier, its explanation is omitted.

When executing interpolation processing similar to that achieved in the eighth embodiment or the tenth embodiment, the CPU 61 reads out the "mode information" from the header portion of the image file to make a decision as to whether or not the "black-and-white image photographing mode" has been selected.

When the interpolation processing is completed, the CPU 61 records the image data having undergone the interpolation processing back into the memory card 54 via the memory card driver 62 (FIG. 21, S9). It is to be noted that the operator may be allowed to make a choice as to whether or not the image data having undergone the interpolation processing should be recorded in the memory card 54 by operating an input device (e.g., a keyboard) of the personal computer 60.

In other words, interpolation processing similar to that achieved in the individual embodiments explained earlier can be executed with a high degree of reliability on the personal computer 60 in the eleventh embodiment.

The eleventh embodiment, in which similarity degrees can be calculated as in the previous embodiments, improves the interpolation processing accuracy with a high degree of reliability.

It is to be noted that while image data to undergo the interpolation processing are obtained by the personal computer 60 via the memory card 54 in the eleventh embodiment, the image data to undergo the interpolation processing may be obtained through any other method.

For instance, when adopting the present invention in a personal computer provided with a means for communication, the interpolation processing may be executed on image data provided via the means for communication.

(CIP Addition)

Next, the twelfth, thirteenth and fourteenth embodiments are explained.

In these embodiments, the expressions "lattice point" and "vacancy" used in the explanation of the first through eleventh embodiments are modified and they are both referred to as pixels. In addition, the term RB indicating the color information from a lattice point R or B is replaced by Z.

Furthermore, in the twelfth through fourteenth embodiments, the expressions of the first through fifth similarity components are modified as follows:

The vertical first similarity component, i.e., $Ct^{(1)}(i,j)$ in expression t1 is replaced with Cv1 in expression 10,
the horizontal first similarity component, i.e., $Cy^{(1)}(i,j)$ in expression t1 is replaced with Ch1 in expression 11,
the vertical second similarity component, i.e., $Ct^{(2)}(i,j)$ in expression t2 is replaced with Cv2 in expression 12, the horizontal second similarity component, i.e., $Ct^{(2)}(i,j)$ in expression t2 is replaced with Ch2 in expression 13,
the vertical third similarity component, i.e., $Ct^{(3)}(i,j)$ in expression t3 is replaced with Cv3 in expression 14, the horizontal third similarity component, i.e., $Cy^{(3)}(i,j)$ in expression t3 is replaced with Ch3 in expression 15,
the vertical fourth similarity component, i.e., $Ct^{(4)}(i,j)$ in expression t4 is replaced with Cv4 in expression 16,
the horizontal fourth similarity component, i.e., $Cy^{(4)}(i,j)$ in expression t4 is replaced with Ch4 in expression 17,
the vertical fifth similarity component, i.e., $Ct^{(5)}(i,j)$ in expression t5 is replaced with Cv5 in expression 18 and
the horizontal fifth similarity component, i.e., $Cy^{(5)}(i,j)$ in expression t5 is replaced with Ch5 in expression 19.

Although they are expressed differently, the meanings of the first through fifth similarity components remain unchanged in the first through fourteenth embodiments.

FIG. 23 is a functional block diagram of the electronic camera which corresponds to the twelfth and the thirteenth embodiments.

In FIG. 23, an electronic camera 100 is provided with a control unit 110, an optical system 120, an image-capturing unit 130, an A/D conversion unit 140, an image processing unit 150 and a recording unit 160. In addition, the image processing unit 150 is provided with an interpolation processing unit (e.g., a one-chip microprocessor dedicated for interpolation processing) 170. The image-capturing unit 130 is provided with an image-capturing sensor (not shown) constituted by arranging R, G and B color filters in a Bayer array.

It is to be noted that while the interpolation processing unit 170 alone is shown in the image processing unit 150 in FIG. 23 to simplify the illustration, a functional block that engages in other image processing such as gradation conversion processing may also be provided within the image processing unit 150.

In FIG. 23, the control unit 110 is connected to the image-capturing unit 130, the A/D conversion unit 140, the image processing unit 150 and the recording unit 160. In addition, an optical image obtained at the optical system 120 is formed at the image-capturing sensor in the image-capturing unit 130. The output from the image-capturing unit 130 is quantized at the A/D conversion unit 140 and is supplied to the image processing unit 150 as image data. The image data provided to the image processing unit 150 undergo interpolation processing at the interpolation processing unit 170, and after undergoing image compression such as JPEG compression as necessary, and they are recorded via the recording unit 160. The image data achieving a higher degree of resolution for the individual color components through the interpolation processing are ultimately output as colorimetric system data appropriate for individual devices that are connected such as a display and a printer.

FIGS. 24A and 24B illustrate the arrangements of image data color components in the twelfth and thirteenth embodiments.

In FIGS. 24A and 24B, the individual color components are indicated as R, G and B, and i and j are used to indicate the positions of pixels at which the individual color components are present, with FIG. 24A showing the arrangement in which pixels with the red color component are interpolation target pixels and FIG. 20B showing the arrangement in which pixels with the blue color component are interpolation target pixels.

It is assumed in the following explanation that a green color interpolation quantity is ascertained through the interpolation processing of the pixel located at coordinates [i,j]. In addition, since the green color interpolation quantity can be calculated regardless of the color component (red or blue) at the interpolation target pixel through the interpolation processing explained below, R and B in FIGS. 24A and 24B are replaced by Z and the color information at the interpolation target pixel is expressed as Z[i,j] with the same rules applied when expressing the color information at other pixels.

(Twelfth Embodiment)

Figure 25:
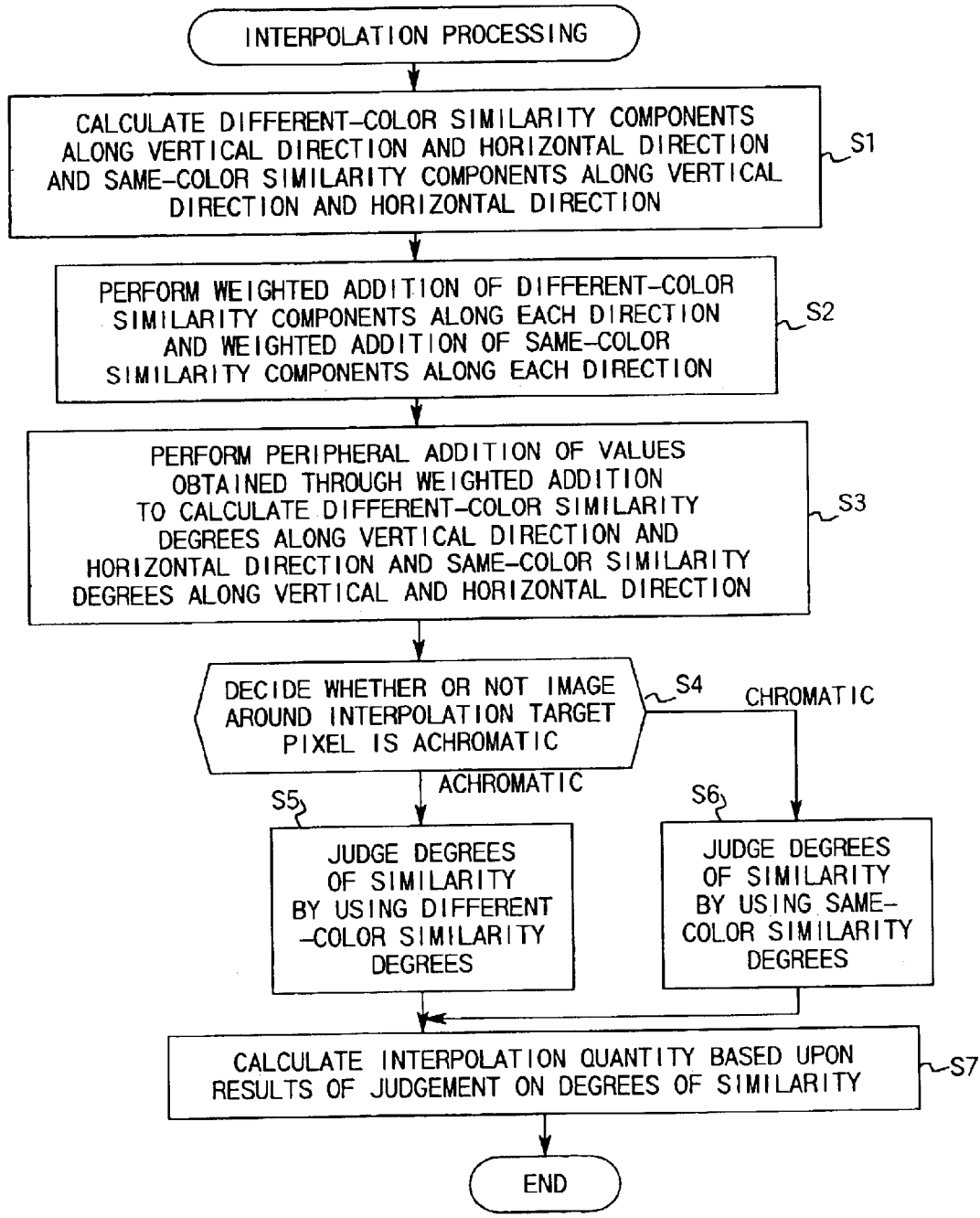
FIG. 25 is a flow chart of the operation achieved in the interpolation processing unit in the twelfth embodiment.

FIG. 25 is a flow chart of the operation achieved in the interpolation processing unit 170 in the twelfth embodiment.

The following explanation of the operation achieved in the twelfth embodiment focuses on the operation of the interpolation processing unit 170 in reference to FIG. 25.

First, the interpolation processing unit 170 calculates different-color similarity components along the vertical direction and the horizontal direction and same-color similarity components along the vertical direction and the horizontal direction (FIG. 25, S1).

It is to be noted that in the twelfth embodiment, a plurality of types of similarity components as defined through expressions 10~13 below are calculated as the different-color similarity components along the vertical direction and the horizontal direction and a plurality of types of similarity components as defined through expressions 14~19 below are calculated as the same-color similarity components along the vertical direction and the horizontal direction.

(a) Different-color Similarity Components

GR(GB) similarity component along the vertical direction:

$$Cv1[i,j]=(|G[i,j-1]-Z[i,j]|+|G[i,j+1]-Z[i,j]|)/2 \quad \text{expression 10}$$

GR(GB) similarity component along the horizontal direction:

$$Ch1[i,j]=(|G[i-1,j]-Z[i,j]|+|G[i+1,j]-Z[i,j]|)/2 \quad \text{expression 11}$$

BG(RG) similarity component along the vertical direction:

$$Cv2[i,j]=(|Z[i-1,j-1]-G[i-1,j]|+|Z[i-1,j+1]-G[i1,j]|+|Z[i+1,j-1]-G[i+1,j]|+|Z[i+1,j+1]-G[i+1,j]|)/4 \quad \text{expression 12}$$

BG(RG) similarity component along the horizontal direction:

$$Ch2[i,j]=(|Z[i-1,j-1]-G[i,j-1]|+|Z[i-1,j+1]-G[i,j1]|+|Z[i+1,j-1]-G[i,j-1]|+|Z[i+1,j+1]-G[i,j+1]|)/4 \quad \text{expression 13}$$

(b) same-color similarity components

GG similarity component along the vertical direction:

$$Cv3[i,j]=|G[i,j-1]-G[i,j+1]| \quad \text{expression 14}$$

GG similarity component along the horizontal direction:

$$Ch3[i,j]=|G[i-1,j]-G[i+1,j]| \quad \text{expression 15}$$

BB(RR) similarity component along the vertical direction:

$$Cv4[i,j]=(|Z[i-1,j-1]-Z[i-1,j+1]|+|Z[i+1,j+1]-Z[i1,j+1]|)/2 \quad \text{expression 16}$$

BB(RR) similarity component along the horizontal direction:

$$Ch4[i,j]=(|Z[i-1,j-1]-Z[i-1+1,j-1]|+|Z[i-1,j+1]-Z[i1,j1]|)/2 \quad \text{expression 17}$$

RR(BB) similarity component along the vertical direction:

$$Cv5[i,j]=(|Z[i,j-2]-Z[i,j]|+|Z[i,j+2]-Z[i,j]|)/2 \quad \text{expression 18}$$

RR(BB) similarity component along the horizontal direction:

$$Ch5[i,j]=(|Z[i-2,j]-Z[i,j]|+|Z[i,j]|)/2 \quad \text{expression 19}$$

It is to be noted that while the similarity degree elements constituting the individual similarity components above are each calculated by using the absolute value corresponding to the difference, they may be calculated by squaring the absolute value or raising the absolute value to a higher power instead.

Next, the interpolation processing unit 170 calculates the different-color similarity degree for each direction through weighted addition of the plurality of types of different-color similarity components, as indicated in expressions 20 and 21 below, and also, calculates the same-color similarity degree for each direction through weighted addition of the plurality of types of same-color similarity components, as indicated in expressions 22 and 23 below (FIG. 25, S2).

$$CvN0[i,j]=\alpha \cdot Cv1[i,j]+\beta \cdot Cv2[i,j] \quad \text{expression 20}$$

$$ChN0[i,j]=\alpha \cdot Ch1[i,j]+\beta \cdot Ch2[i,j] \quad \text{expression 21,}$$

with α and β each representing a constant which is 0 or a positive value satisfying; α+β=1.

$$Cv0[i,j]=\gamma \cdot Cv3[i,j]+\delta \cdot Cv4[i,j]+\epsilon \cdot Cv5[i,j] \quad \text{expression 22}$$

$$Ch0[i,j]=\gamma \cdot Ch3[i,j]+\delta \cdot Ch4[i,j]+\epsilon \cdot Ch5[i,j] \quad \text{expression 23}$$

with γ, δ and ε each representing a constant which is 0 or a positive value and satisfying γ+δ+ε=1.

If α=1 and β=0 in expressions 20 and 21, the different-color similarity degrees are each constituted of "color information corresponding to the same color component as that present at the interpolation target pixel" and color information corresponding to the green color component, whereas if α=0 and β=1, the different-color similarity degrees are each constituted of "color information corresponding to a color component, i.e., the red color component or the blue color component, different from the color component at the interpolation target pixel" and color information corresponding to the green color component. In addition, if γ=0 in expressions 22 and 23, same-color similarity degrees each contain at least either a similarity component constituted of color information corresponding to the red color component alone" or a "similarity component constituted of color information corresponding to the blue color component alone".

Next, the interpolation processing unit 170 performs weighted addition (hereafter referred to as "peripheral addition") of the values obtained through the weighted addition of the individual similarity components at the interpolation target pixel and the surrounding pixels (e.g., CvN0[i,j], CvN0[i−1,j−1], CvN0[i−1,j+1], CvN0[i+1,j−1] and CvN0[i+1,j+1]) along each direction through (method 1) or (method 2) below, to calculate the ultimate different-color similarity degrees and same-color similarity degrees along both the vertical direction and the horizontal direction for the interpolation target pixel (FIG. 25, S3).

It is to be noted that in (method 1) or (method 2), CvN[i,j] indicates the different-color similarity degree along the vertical direction, ChN[i,j] indicates the different-color similarity degree along the horizontal direction, Cv[i,j] indicates the same-color similarity degree along the vertical direction and Ch[i,j] indicates the same-color similarity degree along the horizontal direction.

(method 1)

$$CvN[i,j] = (4 \cdot CvN0[i,j] + CvN0[i-1,j-1] + CvN0[i+1,j-1] + CvN0[i-1,j+1] + CvN0[i+1,j+1])/8 \quad \text{expression 24}$$

$$ChN[i,j] = (4 \cdot ChN0[i,j] + ChN0[i-1,j-1] + ChN0[i+1,j-1] + ChN0[i-1,j+1] + ChN0[i+1,j+1])/8 \quad \text{expression 25}$$

$$CvN[i,j] = (4 \cdot Cv0[i,j] + Cv0[i-1,j-1] + Cv0[i+1,j-1] + Cv0[i-1,j+1] + Cv0[i+1,j+1])/8 \quad \text{expression 26}$$

$$Ch[i,j] = (4 \cdot Ch0[i,j] + Ch0[i-1,j-1] + Ch0[i+1,j-1] + Ch0[i-1,j+1] + Ch0[i+1,j+1])/8 \quad \text{expression 27}$$

(method 2)

$$CvN[i,j] = (4 \cdot CvN0[i,j] + 2(CvN0[i-1,j-1] + CvN0[i+1,j-1] + CvN0[i-1,j+1] + CvN0[i+1,j+1]) + CvN0[i,j-2] + CvN0[i,j+2] + CvN0[i-2,j] + CvN0[i+2,j])/16 \quad \text{expression 28}$$

$$ChN[i,j] = (4 \cdot ChN0[i,j] + 2(ChN0[i-1,j-1] + ChN0[i+1,j-1] + ChN0[i-1,j+1] + ChN0[i+1,j+1]) + ChN0[i,j-2] + ChN0[i,j+2] + ChN0[i-2,j] + ChN0[i+2,j])/16 \quad \text{expression 29}$$

$$Cv[i,j] = (4 \cdot Cv0[i,j] + 2(Cv0[i-1,j-1] + Cv0[i+1,j-1] + Cv0[i-1,j+1] + Cv0[i+1,j+1]) + Cv0[i,j-2] + Cv0[i,j+2] + Cv0[i-2,j] + Cv0[i+2,j])/16 \quad \text{expression 30}$$

$$Ch[i,j] = (4 \cdot Ch0[i,j] + 2(Ch0[i-1,j-1] + Ch0[i+1,j-1] + Ch0[i-1,j+1] + Ch0[i+1,j+1]) + Ch0[i,j-2] + Ch0[i,j+2] + Ch0[i-2,j] + Ch0[i+2,j])/16 \quad \text{expression 31}$$

It is to be noted that in (method 1) the weighted addition of the similarity components at the interpolation target pixel and the surrounding pixels is performed as shown in FIG. 26A, whereas in (method 2) the weighted addition of the similarity components at the interpolation target pixel and the surrounding pixels is performed as shown in FIG. 26B.

As described above, the twelfth embodiment, in which the different-color similarity degrees and the same-color similarity degrees for the interpolation target pixel are calculated through the peripheral addition, achieves a higher degree of accuracy in the judgment on the degrees of similarity, which is to be detailed later, since the continuity between the interpolation target pixel and the surrounding pixels is taken into consideration.

However, the arithmetic operation may be simplified by setting:

$$CvN[i,j]=CvN0[i,j]$$

$$ChN[i,j]=ChN0[i,j]$$

$$Cv[i,j]=Cv0[i,j]$$

$$Ch[i,j]=Ch0[i,j]$$

Since the different-color similarity components are each calculated by comparing the sets of color information at pixels adjacent along the vertical direction or the horizontal direction, a different-color similarity degree constituted of such different-color similarity components enables judgment on degrees of similarity over a shorter distance compared to the same-color similarity degree. In other words, the different-color similarity degree reflects a finer image structure compared to the same-color similarity degree.

In particular, since the different-color similarity degrees are calculated on the assumption that sets of color information corresponding to different color components all represent the same brightness information, judgment made on degrees of similarity by using the different-color similarity degrees is highly reliable in an achromatic image area. While judgment made on degrees of similarity by using the same-color similarity degree is generally reliable both in chromatic (saturated) image areas and achromatic image areas, its reliability is inferior in an area with a fine image structure compared to the reliability of the judgment made by using the different-color similarity degrees.

Thus, it is desirable to divide the entire image into achromatic image areas and chromatic image areas and to use similarity degrees suitable for the individual areas, when judging degrees of similarity manifesting in the entire image undergoing the interpolation processing with a high degree of reliability.

After calculating the different-color similarity degrees along the vertical direction and the horizontal direction and the same-color similarity degrees along the vertical direction and the horizontal direction, the interpolation processing unit 170 makes a decision as to whether or not the image around the interpolation target pixel is achromatic (FIG. 5, S4).

If it is decided that the image around the interpolation target pixel is achromatic through this decision-making, the interpolation processing unit 170 judges degrees of similarity at the interpolation target pixel by using the different-color similarity degrees (FIG. 25, S5), whereas if it is decided that the image around the interpolation target pixel is chromatic, the interpolation processing unit 170 judges degrees of similarity at the interpolation target pixel by using the same-color similarity degrees (FIG. 25, S6).

While a color index that indicates the presence/absence of color in the local area is required when making a decision as to whether or not the image around the interpolation target pixel is achromatic, color difference information in the local area may be used as this color index. Since the different-color similarity degrees calculated as described above each reflect color difference information in the local area as well as the degree of similarity, the different-color similarity degree may be directly utilized as the color index.

It is to be noted that a different-color similarity degree indicates a higher degree of similarity as its value goes down, and thus, if the different-color similarity degrees along the vertical direction and the horizontal direction both indicate large values, the image around the interpolation target pixel is either an achromatic image with little similarity along both the vertical direction and the horizontal direction or a chromatic image. If, on the other hand, at least one of the different-color similarity degrees along the vertical direction and the horizontal direction indicates a relatively small value, the image around the interpolation target pixel is achromatic with a high degree of similarity manifesting along a certain direction.

The following is a detailed explanation of processing implemented to judge degrees of similarity by switching between the different-color similarity degrees and the same-color similarity degrees.

FIG. 27 is a detailed flow chart of the processing implemented to judge degrees of similarity, and FIGS. 28A 28B illustrate the relationship between the similarity degrees and varying degrees of similarity.

It is to be noted that FIG. 27, S1, FIG. 27, S2~S6 and FIG. 27, S7~S11 respectively correspond to FIG. 25, S4, FIG. 25, S5 and FIG. 25, S6.

First, the interpolation processing unit 170 makes a decision as to whether or not;

$$CvN[i,j] \leq ThNv \text{ or } ChN[i,j] \leq ThNh \quad \text{condition 1,}$$

is satisfied with regard to threshold values ThNv and ThNh (FIG. 27, S1). The threshold values ThNv and ThNh each assume a value equal to or lower than approximately 10 when the number of gradations is 256.

If condition 1 is satisfied, the interpolation processing unit 170 makes a decision as to whether or not $$|CvN[i,j]-ChN[i,j]| \leq Th0 \quad \text{condition 2}$$

is satisfied with regard to a threshold value Th0 (FIG. 27, S2). It is to be noted that condition 2 is used to decide as to whether or not the different-color similarity degree CvN[i,j] along the vertical direction and the different-color similarity degree ChN[i,j] along the horizontal direction are approximately equal to each other and that the threshold value Th0 is provided to prevent an erroneous judgment that the similarity along one of the directions is pronounced, from being made due to noise when the difference between the vertical different-color is similarity degree CvN[i,j] and the horizontal different-color similarity degree ChN[i,j] is very small. Thus, by setting the threshold value Th0 to a high value, the accuracy of the similarity judgment for a color image with a great deal of noise is improved.

If condition 1 and condition 2 are satisfied (corresponds to an area 1 in FIG. 28A), the interpolation processing unit 170 determines that the image around the interpolation target pixel is achromatic with pronounced similarity manifesting along both the vertical direction and the horizontal direction, and thus sets 0 for an index HV[i,j] indicating similarity (FIG. 27, S3).

If condition 1 is satisfied but condition 2 is not satisfied, the interpolation processing unit 170 makes a decision as to whether or not $$CvN[i,j]<ChN[i,j] \quad \text{condition 3,}$$

is satisfied (FIG. 27, S4).

If conditions 1 and 3 are satisfied but condition 2 is not satisfied (corresponds to an area 2 in FIG. 28A) the interpolation processing unit 170 determines that the image around the interpolation target pixel is achromatic with pronounced similarity manifesting along the vertical direction, and thus sets 1 for the index HV[i,j] (FIG. 27, S5).

If condition 1 is satisfied but conditions 2 and 3 are not satisfied (corresponds to an area 3 in FIG. 28A), the interpolation processing unit 170 determines that the image around the interpolation target pixel is achromatic with pronounced similarity manifesting along the horizontal direction, and thus sets −1 for the index HV[i,j] (FIG. 27, S6).

If condition 1 is not satisfied, the interpolation processing unit 170 makes a decision as to whether or not $$|Cv[i,j]-Ch[i,j]| \leq Th1 \quad \text{condition 4}$$

is satisfied with regard to the threshold value Th1 (FIG. 27, S7). It is to be noted that condition 4 is used to decide as to whether or not the same-color similarity degree Cv[i,j] along the vertical direction and the same-color similarity degree Ch[i,j] along the horizontal direction are approximately equal to each other, that the threshold value Th1 is provided to prevent an erroneous judgment that similarity along one of the directions is pronounced from being made due to noise when the difference between the vertical same-color similarity degree Cv[i,j] and the horizontal same-color similarity degree Ch[i,j] is very small and that by setting the threshold value Th1 to a high value, the accuracy of the similarity judgment for a color image with a great deal of noise is improved, as in the case with the threshold value Th0.

If condition 1 is not satisfied but condition 4 is satisfied (corresponds to an area 4 in FIG. 28B), the interpolation processing unit 170 determines that the image around the interpolation target pixel is a chromatic image manifesting a pronounced similarity (or little similarity) along both the vertical direction and the horizontal direction, and thus sets 0 for the index HV[i,j] (FIG. 27, S8).

If conditions 1 and 4 are not satisfied, the interpolation processing unit 170 makes a decision as to whether or not $$Cv[i,j]<Ch[i,j] \quad \text{condition 5}$$

is satisfied (FIG. 27, S9).

If condition 1 is not satisfied but condition 5 is satisfied (corresponds to an area 5 in FIG. 28B), the interpolation processing unit 170 determines that the image around the interpolation target pixel is a chromatic image manifesting pronounced similarity along the vertical direction and thus sets 1 for the index HV[i,j] (FIG. 27, S10).

If neither condition 1 nor condition 5 is satisfied (corresponds to an area 6 in FIG. 28B) the interpolation processing unit 170 determines that the image around the interpolation target pixel is a chromatic image manifesting pronounced similarity along the horizontal direction, and thus sets −1 for the index HV[i,j] (FIG. 27, S11).

When the judgment with regard to the degrees of similarity is made as explained above, the interpolation processing unit 170 calculates an interpolation quantity in correspondence to the results of the judgment made on the degrees of similarity (FIG. 25, S7).

For instance, the interpolation processing unit 170 may calculate an interpolation quantity G[i,j] for the green color component as follows.

When HV[i,j] is set at 1, $$G[i,j]=Gv[i,j] \quad \text{expression 32.}$$

When HV[i,j] is set at −1, $$G[i,j]=Gh[i,j] \quad \text{expression 33.}$$

When HV[i,j] is set at 0, $$G[i,j]=(Gv[i,j]+Gh[i,j])/2 \quad \text{expression 34.}$$

Gv[i,j] and Gh[i,j] in the expressions above are values calculated through the following (method 1) or (method 2).

(method 1)

$$Gv[i,j]=(G[i,j-1]+G[i,j+1])/2 \quad \text{expression 35}$$

$$Gh[i,j]=(G[i-1,j]+G[i,j+1])/2 \quad \text{expression 36}$$

(method 2)

$$Gv[i,j]=(G[i,j-1]+G[i,j+1])/2+(2\cdot Z[i,j]-Z[i,j-2]-Z[i,j+2])/4 \quad \text{expression 37}$$

$$Gh[i,j]=(G[i-1,j]+G[i+1,j])/2+(2\cdot Z[i,j]-Z[i-2,j]-Z[i+2,j])/4 \quad \text{expression 38}$$

As explained above, through the twelfth embodiment, in which the entire image is divided into achromatic image areas and chromatic image areas by using the different-color similarity degrees reflecting color difference information in the local area and degrees of similarity are judged based upon the similarity degrees suitable for the individual image areas, interpolation quantities can be calculated with a higher degree of accuracy compared to the prior art.

It is to be noted that while the different-color similarity degrees and the same-color similarity degrees are switched when judging degrees of similarity in the twelfth embodiment, similarity degrees obtained through weighted addition of the different-color similarity degrees and the same-color similarity degrees performed by raising the addition ratio of the different-color similarity degrees in an achromatic image area and raising the addition ratio of the same-color similarity degrees in a chromatic image area may be used for the judgment on similarity instead of completely switching from/to the different-color similarity degrees to/from the same-color similarity degrees.

In addition, while the color differences contained in the different-color similarity degrees are used to ascertain the presence/absence of color in the local area in the twelfth embodiment, another color index such as a color ratio may be utilized instead.

The following is an explanation of the operation performed during RB interpolation processing implemented in the prior art (an explanation of B interpolation processing is omitted).

The well-known modes of RB interpolation processing in the prior art include linear interpolation processing performed in color-difference space, in which after color differences for all the pixels (values each obtained by subtracting the values indicated by color information corresponding to the green color component from the value indicated by color information corresponding to the red color component (or the blue color component)) are calculated, the interpolation quantity is calculated by implementing the processing in one of (1)~(3) below on each interpolation target pixel.

(1) If the color component missing at the interpolation target pixel is present at two pixels adjacent to the interpolation target pixel along the vertical direction, the value achieved by adding the value indicated by the color information corresponding to the green color component that the interpolation target pixel to the average of the color differences at the two adjacent pixels is used as the interpolation quantity.

(2) If the color component missing at the interpolation target pixel is present at two pixels adjacent to the interpolation target pixel along the horizontal direction, the value achieved by adding the value indicated by the color information corresponding to the green color component that the interpolation target pixel to the average of the color differences at the two adjacent pixels is used as the interpolation quantity.

(3) If the color component missing at the interpolation target pixel is present at four pixels adjacent to the interpolation target pixel along the diagonal directions, the value achieved by adding the value indicated by the color information corresponding to the green color component at the interpolation target pixel to the average of the color differences at the four adjacent pixels is used as the interpolation quantity.

(Thirteenth Embodiment)

Figure 29:
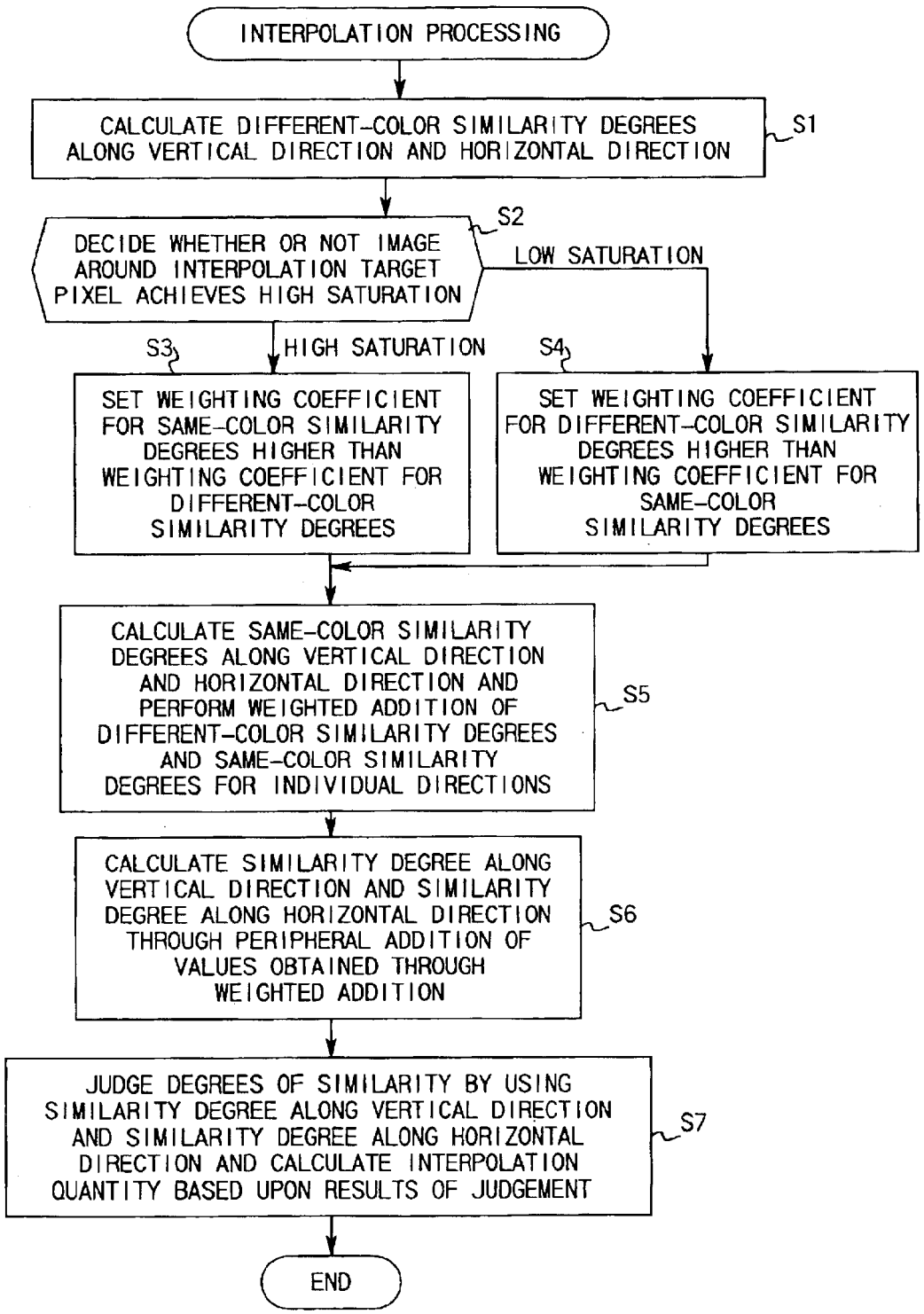
FIG. 29 is a flow chart of the operation achieved in the interpolation processing unit 170 in the thirteenth embodiment.

FIG. 29 is a flow chart of the operation achieved in the interpolation processing unit 170 in the thirteenth embodiment.

The following explanation of the operation performed in the thirteenth embodiment focuses on the operation performed by the interpolation processing unit 170 in reference to FIG. 29.

First, the interpolation processing unit 170 calculates different-color similarity degrees along the vertical direction and the horizontal direction defined in expressions 39 and 40 below (FIG. 29, S1).

Different-color similarity degree along the vertical direction:

$$CvN[i,j]=(|G[i,j-1]-Z[i,j]|+|G[i,j+1]-Z[i,j]|)/2 \quad \text{expression 39}$$

Different-color similarity degree along the horizontal direction:

$$ChN[i,j]=(|G[i-1,j]-Z[i,j]|+|G[i+1,j]-Z[i,j]|)/2 \quad \text{expression 40}$$

Next, the interpolation processing unit 170 makes a decision as to whether or not the saturation (chroma) of the image around the interpolation target pixel is high (FIG. 29, S2).

Then, if it is decided that the image around the interpolation target pixel achieves a high degree of saturation through this decision-making, the interpolation processing unit 170 sets a value larger than the different-color similarity degree weighting coefficient da2 for the same-color similarity degree weighting coefficient da1 to be used for the weighted addition of the different-color similarity degrees and the same-color similarity degrees (FIG. 29, S3). If, on the other hand, it is determined that the saturation of the image around the interpolation target pixel is low, the interpolation processing unit 170 sets a value larger than the same-color similarity degree weighting coefficient da1 for the different-color similarity degree weighting coefficient da2 (FIG. 29, S4).

The decision-making as to whether or not the saturation in the image around the interpolation target pixel is high may be achieved by using the different-color similarity degrees, as in the "decision-making as to whether or not the image around the interpolation target pixel is achromatic" in the twelfth embodiment.

Namely, if the different-color similarity degrees along both the vertical direction and the horizontal direction are large values, the image around the interpolation target pixel has high saturation or the image around the interpolation target pixel does not manifest pronounced similarity either along the vertical direction or the horizontal direction even though the saturation is low. If, on the other hand, the different-color similarity degree along at least either the vertical direction or the horizontal direction is a relatively small value, the saturation of the image around the interpolation target pixel is low with a pronounced similarity manifesting along a certain direction.

For instance, the interpolation processing unit 170 determines that the degree of saturation is high if; $CvN[i,j]$ >BWthand $ChN[i,j]$>BWth ... condition 6, is satisfied with regard to a threshold value BWth, whereas it determines that the degree of saturation is low if condition 6 is not satisfied. It is assumed that the threshold value BWth assumes a value equal to approximately 5 when the number of gradations is 256.

If condition 6 is satisfied (if the saturation of the image around the interpolation target pixel is high), the interpolation processing unit 170 sets the following values for the same-color similarity degree weighting coefficient da1 and the different-color similarity degree weighting coefficient da2:

da1=da1s da2=da2s, whereas if condition 6 is not satisfied (if the saturation of the image around the interpolation target pixel is low), the interpolation processing unit 170 sets the following values for the same-color similarity degree weighting coefficient da1 and the different-color similarity degree weighting coefficient da2:

da1=da1d da2=da2d.

Note that da1s, da2s, da1d and da2d each represent a constant equal to 0 or a positive value and satisfy "da1s>da2s and da1d<da2d". For instance, they may be set at; (da1s, da2s, da1d, da2d)=(1, 0, 0, 1) or (2, 1, 1, 2). It is to be noted that when (da1s, da2s, da1d, da2d)=(1, 0, 0, 1), the judgment on degrees of similarity is made by using either the different-color similarity degrees or the same-color similarity degrees.

After setting the weighting coefficients as explained above, the interpolation processing unit 170 calculates the same-color similarity degrees along the vertical direction and the horizontal direction and also performs weighted addition of the same-color similarity degrees and the different-color similarity degrees along the individual directions (FIG. 29, S5).

For instance, the interpolation processing unit 170 may perform the weighted addition of the same-color similarity degrees and the different-color similarity degrees as expressed below.

$$Cv0[i,j]=(|G[i,j-1]-G[i,j+1]|\cdot da1 +CvN[i,j]\cdot da2)/(da1+da2) \quad \text{expression 41}$$

$$Ch0[i,j]=(|G[i-1,j]-G[i+1,j]|\cdot da1+ChN[i,j]\cdot da2)/(da1+da2) \quad \text{expression 42}$$

It is to be noted that expressions 41 and 42 indicate that the same-color similarity degree along the vertical direction is calculated as $|G[i,j-1]-G[i,j+1]|$ and that the same-color similarity degree along the horizontal direction is calculated as $|G[i-1,j]-G[i+1,j]|$.

While Cv0[i,j] and Ch0[i,j] may be directly utilized as similarity degrees, the processing for calculating the different-color similarity degrees and the same-color similarity degrees and performing weighted addition of the calculated values are implemented for surrounding pixels as well as for the interpolation target pixel, in order to improve the accuracy of the similarity degrees, in the thirteenth embodiment.

The interpolation processing unit 170 performs weighted addition (hereafter referred to as "peripheral addition") of the values obtained through the weighted addition of the various similarity components at the interpolation target pixel and the surrounding pixels along the individual directions (e.g. Cv0[i,j], Cv0[i−1,j−1], Cv0[i+1,j−1], Cv0[i−1,j+1] and Cv0[i+1,j+1]) as follows, to calculate the vertical similarity degree Cv[i,j] and the horizontal similarity degree Ch[i,j] at the interpolation target pixel (FIG. 29, S6).

Vertical similarity degree:

$$Cv[i,j]=(4\cdot Cv0[i,j]+Cv0[i-1,j-1]+Cv0[i+1,j-1]+Cv0[i-1,j+1]+Cv0[i+1,j+1])/8 \quad \text{expression 43}$$

Horizontal similarity degree:

$$Ch[i,j]=(4\cdot Ch0[i,j]+Ch0[i-1,j-1]+Ch0[i+1,j-1]+Ch0[i-1,j+1]+Ch0[i+1,j+1])/8 \quad \text{expression 44}$$

Next, the interpolation processing unit 170 judges the degrees of similarity by using the vertical similarity degree and the horizontal similarity degree and calculates the interpolation quantity based upon the results of the judgment made on the degrees of similarity (FIG. 29, S7).

For instance, if;

$$Ch[i,j]-Cv[i,j]>Th1 \quad \text{condition 7,}$$

is satisfied with regard to a threshold value Th1, the interpolation processing unit 170 determines that the similarity along the vertical direction is pronounced, whereas if condition 7 is not satisfied but;

$$Cv[i,j]-Ch[i,j]>Th1 \quad \text{condition 8,}$$

is satisfied the interpolation processing unit 170 determines that the similarity along the horizontal direction is pronounced. If neither condition 7 nor condition 8 is satisfied, the interpolation processing unit 170 determines that the similarity is pronounced (or slight) along both the vertical direction and the horizontal direction. It is assumed that the threshold value Th1 takes a value equal to approximately 5 when the number of gradations is 256.

Then, the interpolation processing unit 170 calculates the green interpolation quantity G[i,j] as follows.

When the vertical similarity is pronounced:

$$G[i,j]=Gh[i,j] \quad \text{expression 45.}$$

When the horizontal similarity is pronounced:

$$G[i,j]=Gh[i,j] \quad \text{expression 46.}$$

When similarity is pronounced (or slight) along both the vertical direction and the horizontal direction:

$$G[i,j]=(Gv[i,j]+Gh[i,j])/2 \quad \text{expression 47.}$$

It is to be noted that Gv[i,j] and Gh[i,j] are values calculated as in the twelfth embodiment (expressions 35~38).

While only one type of similarity degree needs to be recorded for each of the directions, i.e., the vertical direction and the horizontal direction, in correspondence to each pixel for which the interpolation quantity is to be calculated in the thirteenth embodiment in which the vertical similarity degree Cv[i,j] and the horizontal similarity degree Ch[i,j] are utilized to judge the degrees of similarity, it is necessary to record two types of similarity degrees for each of the directions, i.e., the vertical direction and the horizontal direction, in correspondence to each pixel for which the interpolation quantity is to be calculated in the twelfth embodiment in is which "the vertical different-color similarity degree CvN[i,j] and the horizontal different-color similarity degree ChN[i,j]" or the "vertical same-color similarity degree Cv[i,j] and the horizontal same-color similarity degree Ch[i,j]" are utilized.

Namely, by adopting the thirteenth embodiment, the storage area required for making the judgment on the degrees of similarity can be reduced compared to that required in the twelfth embodiment and, at the same time, the interpolation quantities can be calculated with a high degree of accuracy as in the twelfth embodiment.

The following is an explanation of the operation performed during the RB interpolation processing in the prior art (an explanation of B interpolation processing is omitted).

The well-known modes of RB interpolation processing implemented in the prior art include linear interpolation processing performed in color-difference space, in which after color differences for all the pixels (values each obtained by subtracting the values indicated by color information corresponding to the green color component from the value indicated by color information corresponding to the red color component (or the blue color component)) are calculated, the interpolation quantity is calculated by implementing the processing in one of (1)~(3) below on each interpolation target pixel.

(1) If the color component missing at the interpolation target pixel is present at two pixels adjacent to the interpolation target pixel along the vertical direction, the value achieved by adding the value indicated by the color information corresponding to the green color component at the interpolation target pixel to the average of the color differences at the two adjacent pixels is used as the interpolation quantity.

(2) If the color component missing at the interpolation target pixel is present at two pixels adjacent to the interpolation target pixel along the horizontal direction, the value achieved by adding the value indicated by the color information corresponding to the green color component that the interpolation target pixel to the average of the color differences at the two adjacent pixels is used as the interpolation quantity.

(3) If the color component missing at the interpolation target pixel is present at four pixels adjacent to the interpolation target pixel along the diagonal directions, the value achieved by adding the value indicated by the color information corresponding to the green color component at the interpolation target pixel to the average of the color differences at the four adjacent pixels is used as the interpolation quantity.

(Fourteenth Embodiment)

The following is an explanation of the operation achieved in the fourteenth embodiment.

Figure 30:
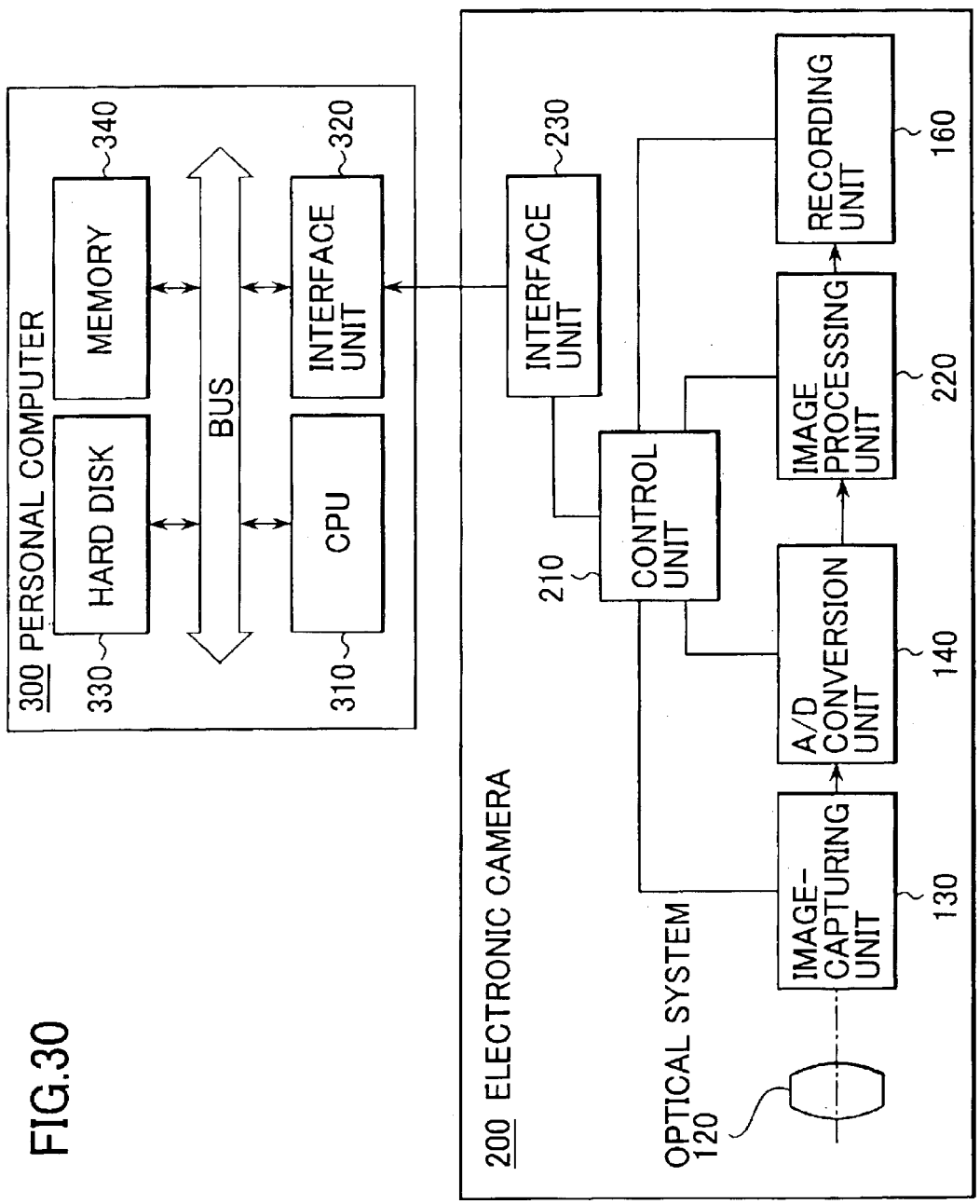
FIG. 30 as a functional block diagram of a fourteenth embodiment.

FIG. 30 is a functional block diagram of the fourteenth embodiment. In the fourteenth embodiment, interpolation processing is executed by a personal computer by using a recording medium in which an interpolation processing program is recorded.

In FIG. 30, the same reference numbers are assigned to components achieving functions identical to those in the functional block diagram in FIG. 23 to preclude the necessity for repeated explanation of their structures.

It is to be noted that an electronic camera 200 in FIG. 30 structurally differs from the electronic camera 100 in FIG. 23 in that a control unit 210 and an image processing unit 220 in FIG. 30 replace the control unit 110 and the image processing unit 150 in FIG. 23 and in that an interface unit 230 is added in FIG. 30.

In addition, in FIG. 30, a personal computer 300 is provided with a CPU 310, an interface unit 320, a hard disk 330 and a memory 340, with the CPU 310 connected with the interface unit 320, the hard disk 330 and the memory 340 via a bus.

It is to be noted that an interpolation processing program (an interpolation processing program for executing interpolation processing as executed by the interpolation processing unit 170 in the previous embodiments) recorded at a recording medium such as a CD-ROM is pre-installed in the personal computer 300. In other words, the interpolation processing program is stored at the hard disk 330 in an execution-enabled state.

The following is an explanation of the operation achieved in the fourteenth embodiment, given in reference to FIG. 30.

First, at the electronic camera 200, image data generated as in the electronic camera 100 shown in FIG. 23 are provided to the image processing unit 220. The image processing unit 220 performs image processing (e.g., gradation conversion processing) other than interpolation processing on the image data, and the image data having undergone the image processing are recorded at the recording unit 160 in an image file format.

This image file is provided to the personal computer 300 via the interface unit 230.

Upon obtaining the image file via the interface unit 320, the CPU 310 in the personal computer 300 executes the interpolation processing program mentioned earlier. Image data with higher degrees of resolution for the individual color components, which are achieved through the interpolation processing, undergo image compression and the like as necessary, are recorded at the hard disk 330 or the like and are ultimately output as colorimetric system data appropriate for the individual devices that are connected such as a display and a printer.

In other words, through the fourteenth embodiment, interpolation processing similar to that explained in reference to the previous embodiments can be executed on the personal computer 300.

(Terms)

A further explanation is given on the terms in this specification.

When color information corresponding to the second color component is output from the interpolation target vacancy, the "similarity components obtained by using color information corresponding to the first color component and color information corresponding to the second color component" and the "similarity degrees obtained by using color information corresponding to the first color component and color information corresponding to the second color component" both may correspond to first similarity components ($Ct^{(1)}(i,j)$, $Cy^{(1)}(i,j)$), and that the "similarity component obtained by using color information at the interpolation target vacancy and color information corresponding to the first color component" may correspond to $Ct^{(1)}(i,j)$ containing at least the value of $Ct^{(1-1)}(i,j)$ or $Cy^{(1-1)}(i,j)$ containing at least the value of $Cy^{(1-1)}(i,j)$ among the first similarity component ($Ct^{(1)}(i,j)$, $Cy^{(1)}(i,j)$).

When color information corresponding to the second color component is output from the interpolation target vacancy, the "similarity components obtained by using color information corresponding to the first color component and color information corresponding to the third color component", the "similarity components obtained by using color information from a vacancy which outputs information corresponding to a color component other than the color component of the interpolation target vacancy and color information corresponding to the first color component" and the "similarity degrees obtained by using color information corresponding to the first color component and color information corresponding to the third color component" all may correspond to second similarity components ($Ct^{(2)}(i,j)$, $Cy^{(2)}(i,j)$).

When color information corresponding to the second color component is output from the interpolation target vacancy, the "similarity components obtained by using color information corresponding to the first color component alone" and the "similarity degrees obtained by using color information corresponding to the first color component alone" both may correspond to third similarity components" ($Ct^{(3)}(i,j)$, $Cy^{(3)}(i,j)$).

When color information corresponding to the second color component is output from the interpolation target vacancy, the "similarity components obtained by using color information corresponding to the third color component alone" and the "similarity degrees obtained by using color information corresponding to the third color component alone" both may correspond to fourth similarity components" ($Ct^{(4)}(i,j)$, $Cy^{(4)}(i,j)$).

When color information corresponding to the second color component is output from the interpolation target vacancy, the "similarity components obtained by using color information corresponding to the second color component alone" and the "similarity degrees obtained by using color information corresponding to the second color component alone" both may correspond to fifth similarity components" ($Ct^{(5)}(i,j)$, $Cy^{(5)}(i,j)$).

The "similarity components obtained by using color information corresponding to the first color component alone" may also correspond to C1(i,j) and C2(i,j).

The "similarity components obtained by using color information at the interpolation target vacancy and color information corresponding to the first color component" may also correspond to D1(i,j) and D2(i,j).

The "similarity degrees" may also correspond to similarity degrees constituted of the individual similarity components obtained through expression t1-3, expression t2-2, expression t3-2, expression t4-2 and expression t5-2 or similarity degrees constituted of the values calculated through expressions 15, 16, 23 and 24.

A different-color similarity component may be constituted of at least one similarity degree element calculated as the absolute value representing the difference between the values indicated by the individual sets of color information from a plurality of pixels that output color information corresponding to color components different from each other, a value resulting from raising the absolute value to a higher power or the like, whereas a different-color similarity degree may be constituted of at least one such different-color similarity component. Likewise, a same-color similarity component may be constituted of at least one similarity degree element calculated as the absolute value representing the difference between the values indicated by the individual sets of color information from a plurality of pixels that output information corresponding to the same-color, a value resulting from raising the absolute value to a higher power or the like, whereas a same-color similarity degree may be constituted of at least one such same-color similarity component. A pixel corresponds to a lattice point or a vacancy.

The "image over an area surrounding the interpolation target vacancy" and the "image over a local area containing the interpolation target pixel" are used synonymously.

The "image over a local area containing the interpolation target pixel" may correspond to the "image over an area near the interpolation target pixel".

(Addition A)

It is to be noted that while an explanation is given in reference to the embodiments on an example in which an image-capturing sensor constituted by arranging color filters in three colors, i.e., R, G and B in a Bayer array is employed, the present invention is not limited to this example and it may be adopted in conjunction with an image-capturing sensor adopting another array. In addition, the present invention may be adopted in conjunction with colors other than R, G and B. It is not necessary to restrict the number of color components to three, either, and there may be two color components or four or more color components. In other words, there may be n color components (n≧2).

(Addition B)

While an explanation is given in reference to the embodiment above on an example in which the interpolation processing program is provided in a recording medium such as a CD-ROM, the recording medium other than a CD-ROM may be used instead. Any of various types of recording media including magnetic tape and DVD may be used.

Figure 31:
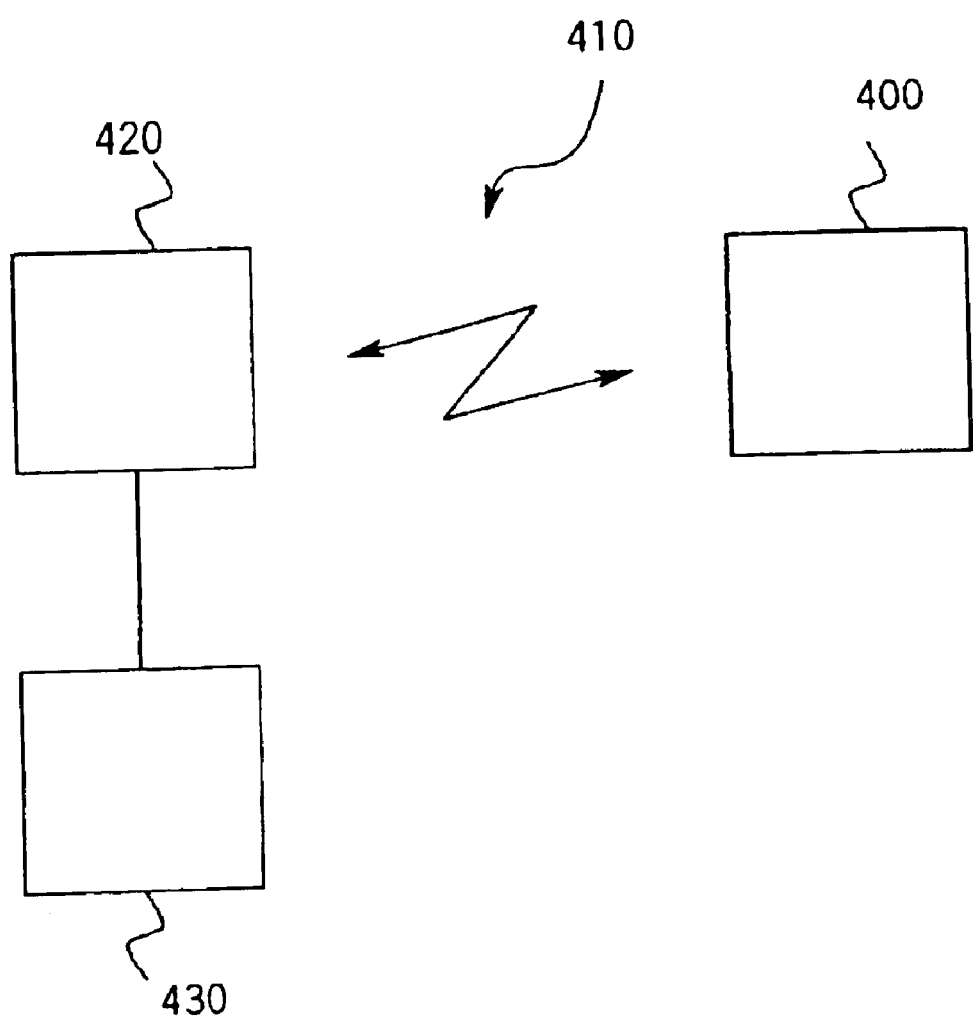
FIG. 31 illustrates how the interpolation processing program may be provided via a communication line.

In addition, the program may be provided via a transmission medium such as a communication line, a typical example of which is the Internet. Namely, the program may be converted to a signal on a carrier wave which carries the transmission medium and be transmitted. FIG. 31 illustrates how this may be achieved. A computer 400 executes the interpolation processing program explained above, and is similar to the computer 300 in FIG. 30. The computer 400 has a function of connecting with a communication line 410. A computer 420 is a server computer that provides the interpolation processing program, with the interpolation processing program stored at a recording medium such as a hard disk 430. The communication line 410 may be a communication line for connection with the Internet or for personal computer communication, or it may be a dedicated communication line. The computer 420 reads out the interpolation processing program from the hard disk 430 and transmits the interpolation processing program to the computer 400 via the communication line 410.

What is claimed is:

1. An interpolation processing apparatus that performs interpolation processing on an image generated by an image-capturing sensor constituted by two-dimensionally arraying a plurality of lattice points each of which outputs color information corresponding to a first color component and a plurality of vacancies each of which outputs color information corresponding to a second color component or a third color component instead of outputting color information corresponding to the first color component, to determine an interpolation quantity equivalent to color information corresponding to the first color component for a vacancy, comprising:

a similarity degree calculation unit that calculates two types of similarity components along each of a plurality of directions, which are a "similarity component obtained by using color information corresponding to the first color component and color information corresponding to the second color component" and a "similarity component obtained by using color information corresponding to the first color component and color information corresponding to the third color component", for an interpolation target vacancy to undergo said interpolation processing based upon color information corresponding to the first through third color components output from said interpolation target vacancy and lattice points and vacancies near said interpolation target vacancy, and then calculates similarity degrees based upon said two types of similarity components;

a similarity judgment unit that makes a judgment with respect to a direction manifesting pronounced similarity for said interpolation target vacancy based upon said similarity degrees along the plurality of directions calculated by said similarity degree calculation unit; and an interpolation quantity calculation unit that calculates said interpolation quantity for said interpolation target vacancy in conformance to results of said judgment made by said similarity judgment unit.

2. An interpolation processing apparatus according to claim 1, wherein said similarity degree calculation unit calculates at least three types of similarity components along each of the plurality of directions, including at least one type of similarity component among a "similarity component obtained by using color information corresponding to the first color component alone", a "similarity component obtained by using color information corresponding to the second color component alone" and a "similarity component obtained by using color information corresponding to the third color component alone", and calculates said similarity degrees based upon said at least three types of similarity components.

3. An interpolation processing apparatus that performs interpolation processing on an image generated by an image-capturing sensor constituted by two-dimensionally arraying a plurality of lattice points each of which outputs color information corresponding to a first color component and a plurality of vacancies each of which outputs color information corresponding to a second color component or a third color component instead of outputting color information corresponding to the first color component, to determine an interpolation quantity equivalent to color information corresponding to the first color component for a vacancy, comprising:

a similarity degree calculation unit that calculates at least two types of similarity components along each of a plurality of directions including (a) a "similarity component obtained by using color information at a vacancy that outputs color information corresponding to a color component different from a color component of said interpolation target vacancy and color information corresponding to the first color component" and (b) at least one type of similarity component among a "similarity component obtained by using color information corresponding to the first color component alone", a "similarity component obtained by using color information corresponding to the second color component alone" and a "similarity component obtained by using color information corresponding to the third color component alone", for an interpolation target vacancy to undergo said interpolation processing, based upon color information corresponding to the first through third color components output from said interpolation target vacancy and lattice points and vacancies near said interpolation target vacancy, and then calculates similarity degrees based upon said at least two types of similarity components;

a similarity judgment unit that makes a judgment with respect to a direction manifesting pronounced similarity for said interpolation target vacancy based upon said similarity degrees along the plurality of directions calculated by said similarity degree calculation unit; and an interpolation quantity calculation unit that calculates an interpolation quantity for said interpolation target vacancy in conformance to results of the judgment made by said similarity judgment unit.

4. An interpolation processing apparatus that performs interpolation processing on an image generated by an image-capturing sensor constituted by two-dimensionally arraying a plurality of lattice points each of which outputs color information corresponding to a first color component and a plurality of vacancies each of which outputs color information corresponding to a second color component or a third color component instead of outputting color information corresponding to the first color component, to determine an interpolation quantity equivalent to color information corresponding to the first color component for a vacancy, comprising:

a similarity degree calculation unit that calculates similarity degrees along a plurality of directions for an interpolation target vacancy to undergo said interpolation processing;

a similarity judgment unit that makes a judgment with respect to a direction manifesting pronounced similarity for said interpolation target vacancy based upon said similarity degrees along the plurality of directions calculated by said similarity degree calculation unit; and an interpolation quantity calculation unit that calculates an interpolation quantity for said interpolation target vacancy in conformance to results of the judgment made by said similarity judgment unit, wherein:

said similarity degree calculation unit calculates at least two types of similarity components along each of the plurality of directions including (a) a "similarity component obtained by using color information output from said interpolation target vacancy and color information corresponding to the first color component" and (b) at least one type of similarity component among a "similarity component obtained by using color information corresponding to the first color component alone", a "similarity component obtained by using color information corresponding to the second color component alone, and a "similarity component obtained by using color information corresponding to the third color component alone", based upon color information corresponding to the first through third color components output from said interpolation target vacancy and lattice points and vacancies near said interpolation target vacancy, and then calculates similarity degrees based upon said at least two types of similarity components; and said "similarity component obtained by using color information from said interpolation target vacancy and color information corresponding to the first color component" is calculated through "a1|G1−A2|+a2|G3−A2|" in which G1 and G3 represent color information at two lattice points set on a single straight line with said interpolation target vacancy located in between, A2 represents the color information at said interpolation target vacancy and a1 and a2 each represent a constant with at least either a1 or a2 not equal to 0.

5. An interpolation processing apparatus according to claim 1, wherein:

said similarity degree calculation unit calculates said similarity degrees for said interpolation target vacancy along the plurality of directions by combining a plurality of types of similarity components obtained along each of the plurality of directions through weighted addition of similarity components performed along each direction.

6. An interpolation processing apparatus that performs interpolation processing on an-image generated by an image-capturing sensor constituted by two-dimensionally arraying a plurality of lattice points each of which outputs color information corresponding to a first color component and a plurality of vacancies each of which outputs color information corresponding to a second color component or a third color component instead of outputting color information corresponding to the first color component, to determine an interpolation quantity equivalent to color information corresponding to the first color component for a vacancy, comprising:

a similarity degree calculation unit that calculates at least two types of similarity degrees among a "similarity degree obtained by using color information corresponding to the first color component and color information corresponding to the second color component", a "similarity degree obtained by using color information corresponding to the first color component and color information corresponding to the third color component", a "similarity degree obtained by using color information corresponding to the first color component alone", a "similarity degree obtained by using color information corresponding to the second color component alone" and a "similarity degree obtained by using color information corresponding to the third color component alone" as similarity degrees along a plurality of directions manifesting at an interpolation target vacancy, based upon color information corresponding to the first through third color components output from said interpolation to undergo said interpolation processing and lattice points and vacancies near said interpolation target vacancy;

a similarity judgment unit that makes a judgment with respect to a direction manifesting pronounced similarity relative to said interpolation target vacancy by comparing, along each direction, similarity degrees of a single type among a plurality of types of similarity degrees along the plurality of directions calculated for said interpolation target vacancy by said similarity degree calculation unit, determining a direction manifesting pronounced similarity for each type of similarity degree and ascertaining a direction being in a majority of directions manifesting pronounced similarity; and an interpolation quantity calculation unit that calculates an interpolation quantity for said interpolation target vacancy in conformance to results of the judgment made by said similarity judgment unit.

7. An interpolation processing apparatus that performs interpolation processing on an image generated by an image-capturing sensor constituted by two-dimensionally arraying a plurality of lattice points each of which outputs color information corresponding to a first color component and a plurality of vacancies each of which outputs color information corresponding to a second color component or a third color component instead of outputting color information corresponding to the first color component, to determine an interpolation quantity equivalent to color information corresponding to the first color component for a vacancy, comprising:

a similarity degree calculation unit that calculates at least one type of similarity component among two types of similarity components, which are a "similarity component obtained by using color information from an interpolation target vacancy and color information corresponding to the first color component" and a "similarity component obtained by using color information corresponding to the first color component alone" as similarity components along a plurality of directions for said interpolation target vacancy based upon color information output from said interpolation target vacancy undergoing said interpolation processing and lattice points and vacancies near said interpolation target vacancy, and calculates similarity degrees along a plurality of directions for said interpolation target vacancy based upon said at least one type of similarity component;

a similarity judgment unit that makes a judgment with respect to a direction manifesting pronounced similarity for said interpolation target vacancy based upon said similarity degrees along the plurality of directions calculated by said similarity degree calculation unit; and an interpolation quantity calculation unit that calculates an interpolation quantity for said interpolation target vacancy in conformance to results of the judgment made by said similarity judgment unit, wherein:

said similarity degree calculation unit extracts characteristics of an image over an area surrounding said interpolation target vacancy and calculates one type of similarity component selected in conformance to the characteristics among said two types of similarity components as said similarity degree, or calculates said similarity degree by calculating said two types of similarity components and performing weighted addition of the calculated two types of similarity components while is adjusting a weighting ratio in correspondence to said characteristics.

8. An interpolation processing apparatus that performs interpolation processing on an image generated by an image-capturing sensor constituted by two-dimensionally arraying a plurality of lattice points each of which outputs color information corresponding to a first color component and a plurality of vacancies each of which outputs color information corresponding to a second color component or a third color component instead of outputting color information corresponding to the first color component, to determine an interpolation quantity equivalent to color information corresponding to the first color component for a vacancy, comprising:

a similarity degree calculation unit that calculates at least one type of similarity component among two types of similarity components, which are a "similarity component obtained by using color information from an interpolation target vacancy and color information corresponding to the first color component" and a "similarity component obtained by using color information corresponding to the first color component alone" as similarity components along a plurality of directions for said interpolation target vacancy based upon color information output from said interpolation target vacancy undergoing said interpolation processing and lattice points and vacancies near said interpolation target vacancy, and calculates similarity degrees along a plurality of directions for said interpolation target vacancy based upon said at least one type of similarity component;

a similarity judgment unit that makes a judgment with respect to a direction manifesting pronounced similarity for said interpolation target vacancy based upon said similarity degrees along the plurality of directions calculated by said similarity degree calculation unit;

an interpolation quantity calculation unit that calculates an interpolation quantity for said interpolation target vacancy in conformance to results of the judgment made by said similarity judgment unit; and an interface unit that receives a first instruction indicating which of said two types of similarity components is to be calculated or a second instruction indicating a weighting rate to be used when performing weighted addition of said two types of similarity components, wherein:

said similarity degree calculation unit calculates one type of similarity component as indicated by said first instruction as said similarity degree when said first instruction has been received at said interface unit, and calculates said similarity degrees through weighted addition of said two types of similarity components implemented in response to said second instruction when said second instruction has been received at said interface unit.

9. An interpolation processing apparatus according to claim 7, wherein:

said similarity degree calculation unit calculates said "similarity degrees obtained by using color information from said interpolation target vacancy and color information corresponding to the first color component" when the characteristics of the image in the area around said interpolation target vacancy indicate that sets of color information from a plurality of lattice points set along a first direction among two directions intersecting at a right angle at said interpolation target vacancy are highly similar, that sets of color information from a plurality of lattice points set along a second direction among the two directions are highly similar and that the color information from lattice points set along the first direction is greatly different from the color information from lattice points set along the second direction.

10. An interpolation processing apparatus according to claim 1, wherein:

said similarity degree calculation unit calculates said similarity degrees for said interpolation target vacancy by using a similarity component calculated on a vacancy located near said interpolation target vacancy.

11. An interpolation processing apparatus according to claim 1, wherein:

said similarity judgment unit makes a decision as to whether or not a difference between similarity degrees along individual directions exceeds a specific threshold value and judges that roughly equal similarity degrees manifest along the directions if the difference does not exceed said threshold value.

12. An interpolation processing apparatus according to claim 1, wherein:

when said similarity judgment unit judges that one of the plurality of directions manifests pronounced similarity, said interpolation quantity calculation unit calculates an average of values indicated by color information from two lattice points set along the direction manifesting pronounced similarity as the interpolation quantity, whereas when said similarity judgment unit judges that similarity degrees manifested along the plurality of directions are close to each other, said interpolation quantity calculation unit ascertains an interpolation quantity through another method without calculating an average of values indicated by color information from two lattice points set along one of the plurality of directions.

13. A recording medium having recorded therein an interpolation processing program for enabling a computer to execute interpolation processing on an image generated by an image-capturing sensor constituted by two-dimensionally arraying a plurality of lattice points each of which outputs color information corresponding to a first color component and a plurality of vacancies each of which outputs color information corresponding to a second color component or a third color component instead of outputting color information corresponding to the first color component, to determine an interpolation quantity equivalent to color information corresponding to the first color component for a vacancy, said interpolation processing program comprising:

a similarity degree calculation step in which two types of similarity components along each of a plurality of directions, which are a similarity component obtained by using color information corresponding to the first color component and color information corresponding to the second color component" and a "similarity component obtained by using color information corresponding to the first color component and color information corresponding to the third color component", are calculated for an interpolation target vacancy to undergo said interpolation processing based upon color information corresponding to the first through third color components output from said interpolation target vacancy and lattice points and vacancies near said interpolation target vacancy, and then similarity degrees are calculated based upon said two types of similarity components;

a similarity judgment step in which a judgment is made with respect to a direction manifesting pronounced similarity for said interpolation target vacancy based upon said similarity degrees along the plurality of directions calculated in said similarity degree calculation step; and an interpolation quantity calculation step in which an interpolation quantity for said interpolation target vacancy is calculated in conformance to results of the judgment made in said similarity judgment step.

14. A recording medium having recorded therein an interpolation processing program for enabling a computer to execute interpolation processing on an image generated by an image-capturing sensor constituted by two-dimensionally arraying a plurality of lattice points each of which outputs color information corresponding to a first color component and a plurality of vacancies each of which outputs color information corresponding to a second color component or a third color component instead of outputting color information corresponding to the first color component, to determine an interpolation quantity equivalent to color information corresponding to the first color component for a vacancy, said interpolation processing program comprising:

a similarity degree calculation step in which at least two types of similarity components along each of a plurality of directions including (a) a "similarity component obtained by using color information at a vacancy that outputs color information corresponding to a color component different from a color component of said interpolation target vacancy and color information corresponding to the first color component" and (b) at least one type of similarity component among a "similarity component obtained by using color information corresponding to the first color component alone", a "similarity component obtained by using color information corresponding to the second color component alone, and a "similarity component obtained by using color information corresponding to the third color component alone", are calculated for an interpolation target vacancy to undergo said interpolation processing, based upon color information corresponding to the first through third color components output from said interpolation target vacancy and lattice points and vacancies near said interpolation target vacancy, and then similarity degrees are calculated based upon said at least two types of similarity components;

a similarity judgment step in which a judgment is made with respect to a direction manifesting pronounced similarity for said interpolation target vacancy based upon said similarity degrees along the plurality of directions calculated by said similarity degree calculation step; and an interpolation quantity calculation step in which an interpolation quantity for said interpolation target vacancy is calculated in conformance to results of the judgment made in said similarity judgment step.

15. A recording medium having recorded therein an interpolation processing program for enabling a computer to execute interpolation processing on an image generated by an image-capturing sensor constituted by two-dimensionally arraying a plurality of lattice points each of which outputs color information corresponding to a first color component and a plurality of vacancies each of which outputs color information corresponding to a second color component or a third color component instead of outputting color information corresponding to the first color component, to determine an interpolation quantity equivalent to color information corresponding to the first color component for a vacancy, said interpolation processing program comprising:

a similarity degree calculation step in which similarity degrees along a plurality of directions are calculated for an interpolation target vacancy to undergo said interpolation processing;

a similarity judgment step in which a judgment is made with respect to a direction manifesting pronounced similarity for said interpolation target vacancy based upon said similarity degrees along the plurality of directions calculated by said similarity degree calculation step; and an interpolation quantity calculation step in which an interpolation quantity for said interpolation target vacancy is calculated in conformance to results of the judgment made in said similarity judgment step, wherein:

in said similarity degree calculation step at least two types of similarity components are calculated along the plurality of directions including (a) a "similarity component obtained by using color information output from said interpolation target vacancy and color information corresponding to the first color component"

(b) at least one type of similarity component among a "similarity component obtained by using color information corresponding to the first color component alone", a "similarity component obtained by using color information corresponding to the second color component alone" and a "similarity component obtained by using color information corresponding to the third color component alone", based upon color information corresponding to the first through third color components output from said interpolation target vacancy and lattice points and vacancies near said interpolation target vacancy, and then the similarity degrees are calculated based upon said at least two types of similarity components; and said "similarity component obtained by using color information from said interpolation target vacancy and color information corresponding to the first color component" calculated through "a1|G1−A2|+a2|G3−A2|" in which G1 and G3 represent color information at two lattice points set on a single straight line with said interpolation target vacancy located in between, A2 represents color information at said interpolation target vacancy and a1 and a2 each represent a constant with at least either a1 or a2 not equal to 0.

16. A recording medium having recorded therein an interpolation processing program for enabling a computer to execute interpolation processing on an image generated by an image-capturing sensor constituted by two-dimensionally arraying a plurality of lattice points each of which outputs color information corresponding to a first color component and a plurality of vacancies each of which outputs color information corresponding to a second color component or a third color component instead of outputting color information corresponding to the first color component, to determine an interpolation quantity equivalent to color information corresponding to the first color component for a vacancy, said interpolation processing program comprising:

a similarity degree calculation step in which at least two types of similarity degrees among a "similarity degree obtained by using color information corresponding to the first color component and color information corresponding to the second color component", a "similarity degree obtained by using color information corresponding to the first color component and color information corresponding to the third color component", a "similarity degree obtained by using color information corresponding to the first color component alone", a "similarity degree obtained by using color information corresponding to the second color component alone" and a "similarity degree obtained by using color information corresponding to the third color component alone" are calculated as similarity degrees along a plurality of directions manifesting at an interpolation target vacancy based upon color information corresponding to the first through third color components output from said interpolation target vacancy to undergo said interpolation processing and lattice points and vacancies near said interpolation target vacancy;

a similarity judgment step in which a judgment is made with respect to a direction manifesting pronounced similarity relative to said interpolation target vacancy by comparing, along each direction, similarity degrees of a single type among a plurality of types of similarity degrees calculated along the plurality of directions for said interpolation target vacancy in said similarity degree calculation step, determining a direction manifesting pronounced similarity for each type of similarity degree and ascertaining a direction being in a majority of directions manifesting pronounced similarity; and an interpolation quantity calculation step in which an interpolation quantity for said interpolation target vacancy is calculated in conformance to results of judgment made in said similarity judgment step.

17. A recording medium having recorded therein an interpolation processing program for enabling a computer to execute interpolation processing on an image generated by an image-capturing sensor constituted by two-dimensionally arraying a plurality of lattice points each of which outputs color information corresponding to a first color component and a plurality of vacancies each of which outputs color information corresponding to a second color component or a third color component instead of outputting color information corresponding to the first color component, to determine an interpolation quantity equivalent to color information corresponding to the first color component for a vacancy, said interpolation processing program comprising:

a similarity degree calculation step in which at least one type of similarity components among two types of similarity components, which are a "similarity component obtained by using color information from an interpolation target vacancy and color information corresponding to the first color component" and a "similarity component obtained by using color information corresponding to the first color component alone" is calculated as similarity components along a plurality of directions for said interpolation target vacancy based upon color information output from said interpolation target vacancy undergoing said interpolation processing and lattice points and vacancies set near said interpolation target vacancy, and similarity degrees along a plurality of directions for said interpolation target vacancy are calculated based upon said at least one type of similarity components;

a similarity judgment step in which a judgment is made with respect to a direction manifesting pronounced similarity for said interpolation target vacancy is judged based upon said similarity degrees along the plurality of directions calculated in said similarity degree calculation step; and an interpolation quantity calculation step in which an interpolation quantity for said interpolation target vacancy is calculated in conformance to results of the judgment made in said similarity judgment step, wherein:

in said similarity degree calculation step, characteristics of an image over an area surrounding said interpolation target vacancy is extracted, and one type of similarity component selected in conformance to the characteristics among said two types of similarity components is calculated as said similarity degrees, or said similarity degrees are calculated by calculating two types of similarity degrees and performing weighted addition of said two types of similarity components while adjusting a weighting ratio in correspondence to said characteristics.

18. A recording medium having recorded therein an interpolation processing program for enabling a computer to execute interpolation processing on an image generated by an image-capturing sensor constituted by two-dimensionally arraying a plurality of lattice points each of which outputs color information corresponding to a first color component and a plurality of vacancies each of which outputs color information corresponding to a second color component or a third color component instead of outputting color information corresponding to the first color component, to determine an interpolation quantity equivalent to color information corresponding to the first color component for a vacancy, said interpolation processing program comprising:

a similarity degree calculation step in which at least one type of similarity components among two types of similarity components, which are a "similarity component obtained by using color information from an interpolation target vacancy and color information corresponding to the first color component" and a "similarity component obtained by using color information corresponding to the first color component alone" is calculated as similarity components along a plurality of directions for said interpolation target vacancy based upon color information output from said interpolation target vacancy undergoing said interpolation processing and lattice points and vacancies set near said interpolation target vacancy, and similarity degrees along a plurality of directions for said interpolation target vacancy are calculated based upon said at least one type of similarity components;

a similarity judgment step in which a judgment is made with respect to a direction manifesting pronounced similarity for said interpolation target vacancy is judged based upon said similarity degrees along the plurality of directions calculated in said similarity degree calculation step;

an interpolation quantity calculation step in which an interpolation quantity for said interpolation target vacancy is calculated in conformance to results of the judgment made in said similarity judgment step; and an interface step in which a first instruction indicating which of said two types of similarity components is to be calculated is received or a second instruction indicating a weighting rate to be used when performing weighted addition of said two types of similarity components is received, wherein:

in said similarity degree calculation step, one type of similarity component is calculated as indicated by said first instruction as said similarity degrees when said first instruction has been received in said interface step, and said similarity degrees are calculated through weighted addition of said two types of similarity components implemented in response to said second instruction when said second instruction has been received in said interface step.

19. An interpolation processing apparatus that performs interpolation to obtain color information corresponding to a first color component of a pixel, in which the first color component is missing, of an image-capturing sensor having a plurality of pixels which are arranged in a two-dimensional array and output color information corresponding to different color components which are first~third color components, each of the plurality of pixels outputting color information corresponding to a single color component, comprising:

a similarity degree calculation unit that calculates each of similarity degrees along, at least, two directions relative to an interpolation target pixel to undergo interpolation processing by using a "different-color similarity component obtained by using color information corresponding to different color components" calculated with a "similarity degree element constituted of color information from three or fewer pixels", based upon color information at a plurality of pixels selected from the interpolation target pixel and pixels near the interpolation target pixel;

a similarity judgment unit that makes a judgment on degrees of similarity along the individual directions based upon said similarity degrees; and an interpolation quantity calculation unit that calculates an interpolation quantity for the interpolation target pixel based upon results of the judgment made by said similarity judgment unit.

20. An interpolation processing apparatus according to claim 19, wherein said similarity degree calculation unit calculates a "same-color similarity component obtained by using color information corresponding to a single color component" for each of one or more color components and calculates said each of similarity degrees by using said same-color similarity component together with said different-color similarity component.

21. An interpolation processing apparatus that performs interpolation to obtain color information corresponding to a first color component of a pixel, in which the first color component is missing, of an image-capturing sensor having a plurality of pixels which are arranged in a two-dimensional array and output color information corresponding to different color components which are first~third color components, each of the plurality of pixels outputting color information corresponding to a single color component, comprising:

a similarity degree calculation unit that calculates each of similarity degrees along at least two directions relative to an interpolation target pixel to undergo interpolation processing by using color information corresponding to three different color components and a "similarity degree element constituted of color information from three or fewer pixels", based upon color information at a plurality of pixels selected from the interpolation target pixel and pixels near the interpolation target pixel;

a similarity judgment unit that makes a judgment on degrees of similarity along the individual directions based upon said similarity degrees; and an interpolation quantity calculation unit that calculates an interpolation quantity for the interpolation target pixel based upon results of the judgment made by said similarity judgment unit.

22. An interpolation processing apparatus that performs interpolation to obtain color information corresponding to a first color component of a pixel, in which the first color component is missing, of an image-capturing sensor having a plurality of pixels which are arranged in a two-dimensional array and output color information corresponding to different color components which are first~third color components, each of the plurality of pixels outputting color information corresponding to a single color component, comprising:

a similarity degree calculation unit that calculates each of similarity degrees along at least two directions relative to an interpolation target pixel to undergo interpolation processing by using color information corresponding to three different components and a "different-color similarity component obtained by using color information corresponding to two different color components", based upon color information at a plurality of pixels selected from the interpolation target pixel and pixels near the interpolation target pixel;

a similarity judgment unit that makes a judgment on degrees of similarity along the individual directions based upon said similarity degrees; and an interpolation quantity calculation unit that calculates an interpolation quantity for the interpolation target pixel based upon results of the judgment made by said similarity judgment unit.

23. An interpolation processing apparatus that performs interpolation to obtain color information corresponding to a first color component of a pixel, in which the first color component is missing, of an image-capturing sensor having a plurality of pixels which are arranged in a two-dimensional array and output color information corresponding to different color components which are first~third color components, each of the plurality of pixels outputting color information corresponding to a single color component, comprising:

a similarity degree calculation unit that calculates each of similarity degrees along, at least, two directions-relative to an interpolation target pixel to undergo interpolation processing based upon color information at a plurality of pixels selected from the interpolation target pixel and pixels near the interpolation target pixel, by calculating a "same-color similarity component obtained by using color information corresponding to a single color component" for each of three color components, by calculating a "different-color similarity component obtained by using color information corresponding to different color components" and by utilizing the similarity components in combination with each other;

a similarity judgment unit that makes a judgment on degrees of similarity along the individual directions based upon said similarity degrees; and an interpolation quantity calculation unit that calculates an interpolation quantity for the interpolation target pixel based upon results of the judgment made by said similarity judgment unit.

24. An interpolation processing apparatus that performs interpolation to obtain color information corresponding to a first color component of a pixel, in which the first color component is missing, of an image-capturing sensor having a plurality of pixels which are arranged in a two-dimensional array and output color information corresponding to different color components which are first~third color components, each of the plurality of pixels outputting color information corresponding to a single color component, comprising:

a similarity degree calculation unit that calculates each of similarity degrees along, at least, two directions relative to an interpolation target pixel to undergo interpolation processing based upon color information at a plurality of pixels selected from the interpolation target pixel and pixels near the interpolation target pixel, by calculating a "different-color similarity component obtained by using color information corresponding to different color components" for each of three color components, by calculating a "same-color similarity component obtained by using color information corresponding to a single color component" for each of two or more color components and by utilizing the similarity components in combination with each other;

a similarity judgment unit that makes a judgment on degrees of similarity along the individual directions based upon said similarity degrees; and an interpolation quantity calculation unit that calculates an interpolation quantity for the interpolation target pixel based upon results of the judgment made by said similarity judgment unit.

25. An interpolation processing apparatus that performs interpolation to obtain color information corresponding to a first color component of a pixel, in which the first color component is missing, of an image-capturing sensor having a plurality of pixels which are arranged in a two-dimensional array and output color information corresponding to different color components which are first~third color components, each of the plurality of pixels outputting color information corresponding to a single color component, comprising:

a similarity degree calculation unit that calculates each of similarity degrees along, at least, two directions relative to an interpolation target pixel to undergo interpolation processing based upon color information at a plurality of pixels selected from the interpolation target pixel and pixels near the interpolation target pixel, by using a "different-color similarity component obtained by using color information corresponding to two different color components" and a "same-color similarity component obtained by using color information corresponding to a single color component calculated with a similarity degree element constituted of color information from two pixels";

a similarity judgment unit that makes a judgment on degrees of similarity along the individual directions based upon said similarity degrees; and an interpolation quantity calculation unit that calculates an interpolation quantity for the interpolation target pixel based upon results of the judgment made by said similarity judgment unit.

26. An interpolation processing apparatus that performs interpolation to obtain color information corresponding to a first color component of a pixel, in which the first color component is missing, of an image-capturing sensor having a plurality of pixels which are arranged in a two-dimensional array and output color information corresponding to different color components which are first~third color components, each of the plurality of pixels outputting color information corresponding to a single color component, comprising:

a similarity degree calculation unit that calculates each of similarity degrees along, at least, two directions relative to an interpolation target pixel to undergo interpolation processing based upon color information at a plurality of pixels selected from the interpolation target pixel and pixels near the interpolation target pixel, by calculating a "same-color similarity component obtained by using color information corresponding to a single color component calculated with a similarity degree element constituted of color information from two pixels" for each of two or more color components, and by performing weighted addition of said same-color similarity components;

a similarity judgment unit that makes a judgment on degrees of similarity along the individual directions based upon said similarity degrees; and an interpolation quantity calculation unit that calculates an interpolation quantity for the interpolation target pixel based upon results of the judgment made by said similarity judgment unit.

27. An interpolation processing apparatus that performs interpolation to obtain color information corresponding to a first color component of a pixel, in which the first color component is missing, of an image-capturing sensor having a plurality of pixels which are arranged in a two-dimensional array and output color information corresponding to different color components which are first~third color components, each of the plurality of pixels outputting color information corresponding to a single color component, comprising:

a similarity degree calculation unit that calculates each of similarity degrees along, at least, two directions relative to an interpolation target pixel to undergo interpolation processing based upon color information at a plurality of pixels selected from the interpolation target pixel and pixels near the interpolation target pixel, by using a "different-color similarity component obtained by using color information corresponding to a color component different from the color component of the interpolation target pixel and the first color component and color information corresponding to the first color component";

a similarity judgment unit that makes a judgment on degrees of similarity along the individual directions based upon said similarity degrees; and an interpolation quantity calculation unit that calculates an interpolation quantity for the interpolation target pixel based upon results of the judgment made by said similarity judgment unit.

28. An interpolation processing apparatus that performs interpolation to obtain color information corresponding to a first color component of a pixel, in which the first color component is missing, of an image-capturing sensor having a plurality of pixels which are arranged in a two-dimensional array and output color information corresponding to different color components which are first~third color components, each of the plurality of pixels outputting color information corresponding to a single color component, comprising:

a similarity degree calculation unit that calculates each of similarity degrees along, at least, two directions relative to an interpolation target pixel to undergo interpolation processing based upon color information at a plurality of pixels selected from the interpolation target pixel and pixels near the interpolation target pixel, for each of two types of similarity degrees, which are a "similarity degree containing a different-color similarity component obtained by using color information corresponding to different color components" and a "similarity degree containing a same-color similarity component obtained by using color information corresponding to a single color component", by switching to either type of similarity degrees or switching weighting ratios to be used in weighted addition of the similarity degrees in correspondence to information related to color of an image over an area surrounding the interpolation target pixel, the information related to color of the image being obtained in consideration of directions within the image;

a similarity judgment unit that makes a judgment on degrees of similarity along the individual directions based upon said similarity degrees; and an interpolation quantity calculation unit that calculates an interpolation quantity for the interpolation target pixel based upon results of the judgment made by said similarity judgment unit.

29. An interpolation processing apparatus according to claim 19, wherein said similarity degree calculation unit calculates the similarity degrees manifesting at the interpolation target pixel by incorporating similarity components calculated for pixels located around the interpolation target pixel as well as the similarity components calculated for the interpolation target pixel.

30. A recording medium having an interpolation processing program for performing interpolation to obtain color information corresponding to a first color component for a pixel, in which the first color component is missing, of an image-capturing sensor having a plurality of pixels which are arranged in a two dimensional array and output color information corresponding to different color components which are first~third color components, each of the plurality of pixels outputting color information corresponding to a single color component, said interpolation processing program comprising:

a similarity degree calculation step in which each of similarity degrees along, at least, two directions relative to an interpolation target pixel to undergo interpolation processing is calculated by using a "different-color similarity component obtained by using color information corresponding to different color components" calculated with a "similarity degree element constituted of color information from three or fewer pixels", based upon color information at a plurality of pixels selected from the interpolation target pixel and pixels near the interpolation target pixel;

a similarity judgment step in which a judgment is made on degrees of similarity along the individual directions based upon said similarity degrees; and an interpolation quantity calculation step in which an interpolation quantity for the interpolation target pixel is calculated based upon results of the judgment made in said similarity judgment step.

31. An interpolation processing apparatus that performs interpolation to obtain color information corresponding to a first color component of a pixel, in which the first color component is missing, of an image-capturing sensor having a plurality of pixels which are arranged in a two-dimensional array and output color information corresponding to different color components, which are first~nth (n≧2) color components, each of the plurality of pixels outputting color information corresponding to a single color component, comprising:

a similarity degree calculation unit that calculates each of similarity degrees along, at least, two directions relative to an interpolation target pixel to undergo interpolation processing by using a "different-color similarity component obtained by using color information corresponding to different color components" calculated with a "similarity degree element constituted of color information from three or fewer pixels", based upon color information at a plurality of pixels selected from the interpolation target pixel and pixels near the interpolation target pixel;

a similarity judgment unit that makes a judgment on degrees of similarity along the individual directions based upon said similarity degrees; and an interpolation quantity calculation unit that calculates an interpolation quantity for the interpolation target pixel based upon results of the judgment made by said similarity judgment unit.

32. An interpolation processing apparatus according to claim 31, wherein said similarity degree calculation unit calculates a "same-color similarity component obtained by using color information corresponding to a single color component" for each of one or more color components and calculates said each of similarity degrees by using said same-color similarity component together with said different-color similarity component.

33. An interpolation processing apparatus that performs interpolation to obtain color information corresponding to a first color component of a pixel, in which the first color component is missing, of an image-capturing sensor having a plurality of pixels which are arranged in a two-dimensional array and output color information corresponding to different color components, which are first~nth (n≧3) color components, each of the plurality of pixels outputting color information corresponding to a single color component, comprising:

a similarity degree calculation unit that calculates each of similarity degrees along at least two directions relative to an interpolation target pixel to undergo interpolation processing by using color information corresponding to three or more different color components and a "similarity degree element constituted of color information from three or fewer pixels", based upon color information at a plurality of pixels selected from the interpolation target pixel and pixels near the interpolation target pixel;

a similarity judgment unit that makes a judgment on degrees of similarity along the individual directions based upon said similarity degrees; and an interpolation quantity calculation unit that calculates an interpolation quantity for the interpolation target pixel based upon results of the judgment made by said similarity judgment unit.

34. An interpolation processing apparatus that performs interpolation to obtain color information corresponding to a first color component of a pixel, in which the first color component is missing, of an image-capturing sensor having a plurality of pixels which are arranged in a two-dimensional array and output color information corresponding to different color components, which are first~nth (n≧3) color components, each of the plurality of pixels outputting color information corresponding to a single color component, comprising:

a similarity degree calculation unit that calculates each of similarity degrees along at least two directions relative to an interpolation target pixel to undergo interpolation processing by using color information corresponding to three or more different components and a "different-color similarity component obtained by using color information corresponding to two different color components", based upon color information at a plurality of pixels selected from the interpolation target pixel and pixels near the interpolation target pixel;

a similarity judgment unit that makes a judgment on degrees of similarity along the individual directions based upon said similarity degrees; and an interpolation quantity calculation unit that calculates an interpolation quantity for the interpolation target pixel based upon results of the judgment made by said similarity judgment unit.

35. An interpolation processing apparatus that performs interpolation to obtain color information corresponding to a first color component of a pixel, in which the first color component is missing, of an image-capturing sensor having a plurality of pixels which are arranged in a two-dimensional array and output color information corresponding to different color components, which are first~nth (n≧3) color components, each of the plurality of pixels outputting color information corresponding to a single color component, comprising:

a similarity degree calculation unit that calculates each of similarity degrees along, at least, two directions relative to an interpolation target pixel to undergo interpolation processing based upon color information at a plurality of pixels selected from the interpolation target pixel and pixels near the interpolation target pixel, by calculating a "same-color similarity component obtained by using color information corresponding to a single color component" for each of three or more color components, by calculating a "different-color similarity component obtained by using color information corresponding to different color components" and by utilizing the similarity components in combination with each other;

a similarity judgment unit that makes a judgment on degrees of similarity along the individual directions based upon said similarity degrees; and an interpolation quantity calculation unit that calculates an interpolation quantity for the interpolation target pixel based upon results of the judgment made by said similarity judgment unit.

36. An interpolation processing apparatus that performs interpolation to obtain color information corresponding to a first color component of a pixel, in which the first color component is missing, of an image-capturing sensor having a plurality of pixels which are arranged in a two-dimensional array and output color information corresponding to different color components, which are first~nth (n≧3) color components, each of the plurality of pixels outputting color information corresponding to a single color component, comprising:

a similarity degree calculation unit that calculates each of similarity degrees along, at least, two directions relative to an interpolation target pixel to undergo interpolation processing based upon color information at a plurality of pixels selected from the interpolation target pixel and pixels near the interpolation target pixel, by calculating a "different-color similarity component obtained by using color information corresponding to different color components" for each of three or more color components, by calculating a "same-color similarity component obtained by using color information corresponding to a single color component" for each of two or more color components and by utilizing the similarity color components in combination with each other;

a similarity judgment unit that makes a judgment on degrees of similarity along the individual directions based upon said similarity degrees; and an interpolation quantity calculation unit that calculates an interpolation quantity for the interpolation target pixel based upon results of the judgment made by said similarity judgment unit.

37. An interpolation processing apparatus that performs interpolation to obtain color information corresponding to a first color component of a pixel, in which the first color component is missing, of an image-capturing sensor having a plurality of pixels which are arranged in a two-dimensional array and output color information corresponding to different color components, which are first~nth (n≧2) color components, each of the plurality of pixels outputting color information corresponding to a single color component, comprising:

a similarity degree calculation unit that calculates each of similarity degrees along, at least, two directions relative to an interpolation target pixel to undergo interpolation processing based upon color information at a plurality of pixels selected from the interpolation target pixel and pixels near the interpolation target pixel, by using a "different-color similarity component obtained by using color information corresponding to two different color components" and a "same-color similarity component obtained by using color information corresponding to a single color component calculated with a similarity degree element constituted of color information from two pixels";

a similarity judgment unit that makes a judgment on degrees of similarity along the individual directions based upon said similarity degrees; and an interpolation quantity calculation unit that calculates an interpolation quantity for the interpolation target pixel based upon results of the judgment made by said similarity judgment unit.

38. An interpolation processing apparatus that performs interpolation to obtain color information corresponding to a first color component of a pixel, in which the first color component is missing, of an image-capturing sensor having a plurality of pixels which are arranged in a two-dimensional array and output color information corresponding to different color components, which are first~nth ($n \geq 2$) color components, each of the plurality of pixels outputting color information corresponding to a single color component, comprising:

a similarity degree calculation unit that calculates each of similarity degrees along, at least, two directions relative to an interpolation target pixel to undergo interpolation processing based upon color information at a plurality of pixels selected from the interpolation target pixel and pixels near the interpolation target pixel, by calculating a "same-color similarity component obtained by using color information corresponding to a single color component calculated with a similarity degree element constituted of color information from two pixels" for each of two or more color components, and by performing weighted addition of said same-color similarity component;

a similarity judgment unit that makes a judgment on degrees of similarity along the individual directions based upon said similarity degrees; and an interpolation quantity calculation unit that calculates an interpolation quantity for the interpolation target pixel based upon results of the judgment made by said similarity judgment unit.

39. An interpolation processing apparatus that performs interpolation to obtain color information corresponding to a first color component of a pixel, in which the first color component is missing, of an image-capturing sensor having a plurality of pixels which are arranged in a two-dimensional array and output color information corresponding to different color components, which are first~nth ($n \geq 3$) color components, each of the plurality of pixels outputting color information corresponding to a single color component, comprising:

a similarity degree calculation unit that calculates each of similarity degrees along, at least, two directions relative to an interpolation target pixel to undergo interpolation processing based upon color information at a plurality of pixels selected from the interpolation target pixel and pixels near the interpolation target pixel, by using a "different-color similarity component obtained by using color information corresponding to a color component different from the color component of the interpolation target pixel and the first color component and color information corresponding to the first color component";

a similarity judgment unit that makes a judgment on degrees of similarity along the individual directions based upon said similarity degrees; and an interpolation quantity calculation unit that calculates an interpolation quantity for the interpolation target pixel based upon results of the judgment made by said similarity judgment unit.

40. An interpolation processing apparatus that performs interpolation to obtain color information corresponding to a first color component of a pixel, in which the first color component is missing, of an image-capturing sensor having a plurality of pixels which are arranged in a two-dimensional array and output color information corresponding to different color components, which are first~nth ($n \geq 2$) color components, each of the plurality of pixels outputting color information corresponding to a single color component, comprising:

a similarity degree calculation unit that calculates each of similarity degrees along, at least, two directions relative to an interpolation target pixel to undergo interpolation processing based upon color information at a plurality of pixels selected from the interpolation target pixel and pixels near the interpolation target pixel, for each of two types of similarity degrees, which are a "different-color similarity degree containing a different-color similarity component obtained by using color information corresponding to different color components" and a "same-color similarity degree containing a same-color similarity component obtained by using color information corresponding to a single color component", by switching to either type of similarity degrees or switching weighting ratios to be used in weighted addition of the similarity degrees in correspondence to information related to color of an image over a local area containing the interpolation target pixel, the information related to color of the image being obtained in consideration of directions within the image;

a similarity judgment unit that makes a judgment on degrees of similarity along the individual directions based upon said similarity degrees; and an interpolation quantity calculation unit that calculates an interpolation quantity for the interpolation target pixel based upon results of the judgment made by said similarity judgment unit.

41. An interpolation processing apparatus according to claim 40, wherein said similarity degree calculation unit calculates the similarity degrees manifesting at the interpolation target pixel by incorporating similarity components calculated for pixels located around the interpolation target pixel as well as the similarity components calculated for the interpolation target pixel.

42. An interpolation processing apparatus
that performs interpolation to obtain color information corresponding to a first color component of a pixel, in which the first color component is missing, of an image-capturing sensor having a plurality of pixels which are arranged in a two-dimensional array and output color information corresponding to different color components, which are first~nth ($n \geq 2$) color components, each of the plurality of pixels outputting color information corresponding to a single color component, comprising:

a similarity degree calculation unit that calculates each of similarity degrees along, at least, two directions relative to an interpolation target pixel to undergo interpolation processing based upon color information at a plurality of pixels selected from the interpolation target pixel and pixels near the interpolation target pixel, for each of two types of similarity degrees, which are a "different-color similarity degree containing a different-color similarity component obtained by using color information corresponding to different color components" and a "same-color similarity degree containing a same-color similarity component obtained by using color information corresponding to a single color component", by switching to either type of similarity degrees or switching weighting ratios to be used in weighted addition of the similarity degrees in correspondence to characteristics of an image over a local area containing the interpolation target pixel;

a similarity judgment unit that makes a judgment on degrees of similarity along the individual directions based upon said similarity degrees; and an interpolation quantity calculation unit that calculates an interpolation quantity for the interpolation target pixel based upon results of the judgment made by said similarity judgment unit, wherein when the plurality of pixels that output color information corresponding to the first~nth ($n \geq 2$) color components different from each other output color information corresponding to the first~the third color components different from each other and the first color component achieves a higher spatial frequency compared to the second color component and the third color component, said similarity degree calculation unit calculates, as the different-color similarity degrees, similarity degrees each containing at least one of (1) a different-color similarity component obtained by using color information corresponding to the first color component and color information corresponding to the second color information, and (2) a different-color similarity component obtained by using color information corresponding to the first color component and color information corresponding to the third color component, and calculates, as the same-color similarity degrees, similarity degrees each containing at least one of (1) a same-color similarity component obtained by using color information corresponding to the first color component alone, (2) a same-color similarity component obtained by using color information corresponding to the second color component alone, and (3) the same-color similarity component obtained by using color information corresponding to the third color component alone.

43. An interpolation processing apparatus according to claim 42, wherein said similarity degree calculation unit uses information related to color as characteristics of the image in the local area containing the interpolation target pixel.

44. An interpolation processing apparatus according to claim 40, wherein said similarity degree calculation unit makes a decision as to whether the image over the local area is an achromatic image or a chromatic image in reference to said information related to color, and if the image in the local area is achromatic, said similarity degree calculation unit selects said different-color similarity degree as similarity degrees along a plurality of directions relative to the interpolation target pixel or sets a weighting coefficient for said different-color similarity degree to be used in weighted addition of said different-color similarity degree and said same-color similarity degree higher than a weighting coefficient for said same-color similarity degree, whereas if the image in the local area is chromatic, said similarity degree calculation unit selects said same-color similarity degree as similarity degrees along the plurality of directions relative to the interpolation target pixel or sets the weighting coefficient for said same-color similarity degree to be used in weighted addition of said different-color similarity degree and said same-color similarity degree higher than the weighting coefficient for said different-color similarity degree.

45. An interpolation processing apparatus according to claim 40, wherein said similarity degree calculation unit uses said different-color similarity degree as the information related to color.

46. An interpolation processing apparatus according to claim 45, wherein if said different-color similarity degrees indicate pronounced similarity along, at least, one direction, said similarity degree calculation unit determines the image over the local area to be an achromatic image, and said similarity degree calculation unit determines the image in the local area to be a chromatic image otherwise.

47. An interpolation processing apparatus according to claim 40, wherein said similarity degree calculation unit calculates said different-color similarity degree by using color information from pixels present over shorter intervals compared to pixels that output the color information used to calculate said same-color similarity degree.

48. An interpolation processing apparatus according to claim 42, wherein said similarity degree calculation unit uses, as said similarity degrees along a plurality of directions relative to the interpolation target pixel, similarity degrees along a plurality of directions calculated for pixels around the interpolation target pixel as well as for the interpolation target pixel.

49. An interpolation processing apparatus according to claim 40, wherein said similarity degree calculation unit determines that essentially equal degrees of similarity manifest along a plurality of directions if differences of similarity degrees along the plurality of directions are smaller than a specific threshold value.

50. A recording medium having an interpolation processing program for performing interpolation to obtain color information corresponding to a first color component of a pixel, in which the first color component is missing, of an image-capturing sensor having a plurality of pixels which are arranged in a two-dimensional array and output color information corresponding to different color components, which are first~nth ($n \geq 2$) color components, each of the plurality of pixels outputting color information corresponding to a single color component, said interpolation processing program comprising:

a similarity degree calculation step in which each of similarity degrees along, at least, two directions relative to an interpolation target pixel to undergo interpolation processing is calculated by using a "different-color similarity component obtained by using color information corresponding to different color components" calculated with a "similarity degree element constituted of color information from three or fewer pixels", based upon color information at a plurality of pixels selected from the interpolation target pixel and pixels near the interpolation target pixel;

a similarity judgment step in which a judgment is made on degrees of similarity along the individual directions based upon said similarity degrees; and an interpolation quantity calculation step in which an interpolation quantity for the interpolation target pixel is calculated based upon results of the judgment made in said similarity judgment step.

51. A recording medium having an interpolation processing program for performing interpolation to obtain color information corresponding to a first color component of a pixel, in which the first color component is missing, of an image-capturing sensor having a plurality of pixels which are arranged in a two-dimensional array and output color information corresponding to different color components, which are first~nth ($n \geq 3$) color components, each of the plurality of pixels outputting color information corresponding to a single color component, said interpolation processing program comprising:

a similarity degree calculation step in which each of similarity degrees along at least two directions relative to an interpolation target pixel to undergo interpolation processing is calculated by using color information corresponding to three or more different color components and a "similarity degree element constituted of color information from three or fewer pixels", based upon color information at a plurality of pixels selected from the interpolation target pixel and pixels near the interpolation target pixel;

a similarity judgment step in which a judgment is made on degrees of similarity along the individual directions based upon said similarity degrees; and an interpolation quantity calculation step in which an interpolation quantity for the interpolation target pixel is calculated based upon results of the judgment made in said similarity judgment step.

52. A recording medium having an interpolation processing program for performing interpolation to obtain color information corresponding to a first color component of a pixel, in which the first color component is missing, of an image-capturing sensor having a plurality of pixels which are arranged in a two-dimensional array and output color information corresponding to different color components, which are first~nth ($n \geq 3$) color components, each of the plurality of pixels outputting color information corresponding to a single color component, said interpolation processing program comprising:

a similarity degree calculation step in which each of similarity degrees along at least two directions relative to an interpolation target pixel to undergo interpolation processing is calculated by using color information corresponding to three or more different components and a "different-color similarity component obtained by using color information corresponding to two different color components", based upon color information at a plurality of pixels selected from the interpolation target pixel and pixels near the interpolation target pixel;

a similarity judgment step in which a judgment is made on degrees of similarity along the individual directions based upon said similarity degrees; and an interpolation quantity calculation step in which an interpolation quantity for the interpolation target pixel is calculated based upon results of the judgment made in said similarity judgment step.

53. A recording medium having an interpolation processing program for performing interpolation to obtain color information corresponding to a first color component of a pixel, in which the first color component is missing, of an image-capturing sensor having a plurality of pixels which are arranged in a two-dimensional array and output color information corresponding to different color components, which are first~nth ($n \geq 3$) color components, each of the plurality of pixels outputting color information corresponding to a single color component, said interpolation processing program comprising:

a similarity degree calculation step in which each of similarity degrees along, at least, two directions relative to an interpolation target pixel to undergo interpolation processing is calculated based upon color information at a plurality of pixels selected from the interpolation target pixel and pixels near the interpolation target pixel, by calculating a "same-color similarity component obtained by using color information corresponding to a single color component" for each of three or more color components, by calculating a "different-color similarity component obtained by using color information corresponding to different color components" and by utilizing the similarity components in combination with each other;

a similarity judgment step in which a judgment is made on degrees of similarity along the individual directions based upon said similarity degrees; and an interpolation quantity calculation step in which an interpolation quantity for the interpolation target pixel is calculated based upon results of the judgment made in said similarity judgment step.

54. A recording medium having an interpolation processing program for performing interpolation to obtain color information corresponding to a first color component of a pixel, in which the first color component is missing, of an image-capturing sensor having a plurality of pixels which are arranged in a two-dimensional array and output color information corresponding to different color components, which are first~nth ($n \geq 3$) color components, each of the plurality of pixels outputting color information corresponding to a single color component, said interpolation processing program comprising:

a similarity degree calculation step in which each of similarity degrees along, at least, two directions relative to an interpolation target pixel to undergo interpolation processing is calculated based upon color information at a plurality of pixels selected from the interpolation target pixel and pixels near the interpolation target pixel, by calculating a "different-color similarity component obtained by using color information corresponding to different color components" for each of three or more color components, by calculating a "same-color similarity component obtained by using color information corresponding to a single color component" for each of two or more color components and by utilizing the similarity color components in combination with each other;

a similarity judgment step in which a judgment is made on degrees of similarity along the individual directions based upon said similarity degrees; and an interpolation quantity calculation step in which an interpolation quantity for the interpolation target pixel is calculated based upon results of the judgment made in said similarity judgment step.

55. A recording medium having an interpolation processing program for performing interpolation to obtain color information corresponding to a first color component of a pixel, in which the first color component is missing, of an image-capturing sensor having a plurality of pixels which are arranged in a two-dimensional array and output color information corresponding to different color components, which are first~nth (n≧2) color components, each of the plurality of pixels outputting color information corresponding to a single color component, said interpolation processing program comprising:

a similarity degree calculation step in which each of similarity degrees along, at least, two directions relative to an interpolation target pixel to undergo interpolation processing is calculated based upon color information at a plurality of pixels selected from the interpolation target pixel and pixels near the interpolation target pixel, by using a "different-color similarity component obtained by using color information corresponding to two different color components" and a "same-color similarity component obtained by using color information corresponding to a single color component calculated with a similarity degree element constituted of color information from two pixels";

a similarity judgment step in which a judgment is made on degrees of similarity along the individual directions based upon said similarity degrees; and an interpolation quantity calculation step in which an interpolation quantity for the interpolation target pixel is calculated based upon results of the judgment made in said similarity judgment step.

56. A recording medium having an interpolation processing program for performing interpolation to obtain color information corresponding to a first color component of a pixel, in which the first color component is missing, of an image-capturing sensor having a plurality of pixels which are arranged in a two-dimensional array and output color information corresponding to different color components, which are first~nth (n≧2) color components, each of the plurality of pixels outputting color information corresponding to a single color component, said interpolation processing program comprising:

a similarity degree calculation step in which each of similarity degrees along, at least, two directions relative to an interpolation target pixel to undergo interpolation processing is calculated based upon color information at a plurality of pixels selected from the interpolation target pixel and pixels near the interpolation target pixel, by calculating a "same-color similarity component obtained by using color information corresponding to a single color component calculated with a similarity degree element constituted of color information from two pixels" for each of two or more color components, and by performing weighted addition of said same-color similarity components;

a similarity judgment step in which a judgment is made on degrees of similarity along the individual directions based upon said similarity degrees; and an interpolation quantity calculation step in which an interpolation quantity for the interpolation target pixel is calculated based upon results of the judgment made in said similarity judgment step.

57. A recording medium having an interpolation processing program for performing interpolation to obtain color information corresponding to a first color component of a pixel, in which the first color component is missing, of an image-capturing sensor having a plurality of pixels which are arranged in a two-dimensional array and output color information corresponding to different color components, which are first~nth (n≧3) color components, each of the plurality of pixels outputting color information corresponding to a single color component, said interpolation processing program comprising:

a similarity degree calculation step in which each of similarity degrees along, at least, two directions relative to an interpolation target pixel to undergo interpolation processing is calculated based upon color information at a plurality of pixels selected from the interpolation target pixel and pixels near the interpolation target pixel, by using a "different-color similarity component obtained by using color information corresponding to a color component different from the color component of the interpolation target pixel and the first color component and color information corresponding to the first color component";

a similarity judgment step in which a judgment is made on degrees of similarity along the individual directions based upon said similarity degrees; and an interpolation quantity calculation step in which an interpolation quantity for the interpolation target pixel is calculated based upon results of the judgment made in said similarity judgment step.

58. A recording medium having an interpolation processing program for performing interpolation to obtain color information corresponding to a first color component of a pixel, in which the first color component is missing, of an image-capturing sensor having a plurality of pixels which are arranged in a two-dimensional array and output color information corresponding to different color components, which are first~nth (n≧2) color components, each of the plurality of pixels outputting color information corresponding to a single color component, said interpolation processing program comprising:

a similarity degree calculation step in which each of similarity degrees along, at least, two directions relative to an interpolation target pixel to undergo interpolation processing is calculated based upon color information at a plurality of pixels selected from the interpolation target pixel and pixels near the interpolation target pixel, for each of two types of similarity degrees, which are a "different-color similarity degree containing a different-color similarity component obtained by using color information corresponding to different color components" and a same-color similarity degree containing a same-color similarity component obtained by using color information corresponding to a single color component", by switching to either type of similarity degrees or switching weighting ratios to be used in weighted addition of the similarity degrees in correspondence to information related to color of an image over a local area containing the interpolation target pixel, the information related to color of the image being obtained in consideration of directions within the image;

a similarity judgment step in which a judgment is made on degrees of similarity along the individual directions based upon said similarity degrees; and an interpolation quantity calculation step in which an interpolation quantity for the interpolation target pixel is calculated based upon results of the judgment made in said similarity judgment step.

59. An interpolation processing apparatus according to claim 28, wherein the information related to color of the image is obtained along at least two directions relative to the interpolation target pixel by using color information corresponding to different color components.

60. An interpolation processing apparatus according to claim 40, wherein the information related to color of the image is obtained along at least two directions relative to the interpolation target pixel by using color information corresponding to different color components.

61. A recording medium having an interpolation processing program for performing interpolation to obtain color information corresponding to a first color component of a pixel, in which the first color component is missing, of an image-capturing sensor having a plurality of pixels which are arranged in a two-dimensional array and output color information corresponding to different color components, which are first~nth ($n \geq 2$) color components, each of the plurality of pixels outputting color information corresponding to a single color component, said interpolation processing program comprising:

a similarity degree calculation step in which each of similarity degrees along, at least, two directions relative to an interpolation target pixel to undergo interpolation processing is calculated based upon color information at a plurality of pixels selected from the interpolation target pixel and pixels near the interpolation target pixel, for each of two types of similarity degrees, which are a "different-color similarity degree containing a different-color similarity component obtained by using color information corresponding to different color components" and a "same-color similarity degree containing a same-color similarity component obtained by using color information corresponding to a single color component", by switching to either type of similarity degrees or switching weighting ratios to be used in weighted addition of the similarity degrees in correspondence to characteristics of an image over a local area containing the interpolation target pixel;

a similarity judgment step in which a judgment is made on degrees of similarity along the individual directions based upon said similarity degrees; and an interpolation quantity calculation step in which an interpolation quantity for the interpolation target pixel is calculated based upon results of the judgment made in said similarity judgment step, wherein in said similarity degree calculation step, when the plurality of pixels that output color information corresponding to the first~nth ($n \geq 2$) color components different from each other output color information corresponding to the first~the third color components different from each other and the first color component achieves a higher spatial frequency compared to the second color component and the third color component: there are calculated, as the different-color similarity degrees, similarity degrees each containing at least one of (1) a different-color similarity component obtained by using color information corresponding to the first color component and color information corresponding to the second color information, and (2) a different-color similarity component obtained by using color information corresponding to the first color component and color information corresponding to the third color component; and there are calculated, as the same-color similarity degrees, similarity degrees each containing at least one of (1) a same-color similarity component obtained by using color information corresponding to the first color component alone, (2) a same-color similarity component obtained by using color information corresponding to the second color component alone, and (3) the same-color similarity component obtained by using color information corresponding to the third color component alone.

* * * * *